(12) United States Patent
Choi et al.

(10) Patent No.: US 11,769,893 B2
(45) Date of Patent: Sep. 26, 2023

(54) SYSTEMS AND METHODS FOR PROCESSING HYDROGEN

(71) Applicant: AMOGY INC., Brooklyn, NY (US)

(72) Inventors: Jongwon Choi, Brooklyn, NY (US); Young Suk Jo, Brooklyn, NY (US); Hyunho Kim, Brooklyn, NY (US); Gregory Robert Johnson, Annandale, NJ (US)

(73) Assignee: AMOGY Inc., Brooklyn, NY (US)

( * ) Notice: Subject to any disclaimer, the term of this patent is extended or adjusted under 35 U.S.C. 154(b) by 0 days.

(21) Appl. No.: 17/968,211

(22) Filed: Oct. 18, 2022

(65) Prior Publication Data

US 2023/0053549 A1 Feb. 23, 2023

Related U.S. Application Data

(63) Continuation of application No. PCT/US2022/040367, filed on Aug. 15, 2022, which is a continuation of application No. 17/589,287, filed on Jan. 31, 2022, now Pat. No. 11,539,063.

(60) Provisional application No. 63/234,137, filed on Aug. 17, 2021.

(51) Int. Cl.
*H01M 8/1004* (2016.01)
*H01M 4/88* (2006.01)

(52) U.S. Cl.
CPC ....... *H01M 8/1004* (2013.01); *H01M 4/8807* (2013.01)

(58) Field of Classification Search
CPC .................................................. H01M 8/1004
See application file for complete search history.

(56) References Cited

U.S. PATENT DOCUMENTS

| | | | |
|---|---|---|---|
| 3,689,042 A | 9/1972 | Pere et al. |
| 4,155,986 A | 5/1979 | Gladden |
| 5,055,282 A | 10/1991 | Shikada et al. |
| 5,912,198 A | 6/1999 | Feitelberg et al. |

(Continued)

FOREIGN PATENT DOCUMENTS

| | | | |
|---|---|---|---|
| AU | 2020267318 A1 | 6/2021 |
| CA | 2676027 A1 | 8/2008 |

(Continued)

OTHER PUBLICATIONS

Co-pending U.S. Appl. No. 17/501,090, inventor Mann; Maxwell Spencer, filed on Oct. 14, 2021.

(Continued)

*Primary Examiner* — Brian R Ohara
(74) *Attorney, Agent, or Firm* — Wilson Sonsini Goodrich & Rosati

(57) ABSTRACT

The present disclosure provides a fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode.

30 Claims, 15 Drawing Sheets

(56) References Cited

U.S. PATENT DOCUMENTS

| | | | |
|---|---|---|---|
| 6,350,540 B1* | 2/2002 | Sugita | H01M 8/0263 |
| | | | 429/514 |
| 6,555,084 B2 | 4/2003 | Ohtsuka | |
| 6,936,363 B2 | 8/2005 | Kordesch et al. | |
| 6,984,750 B2 | 1/2006 | Chaturvedi et al. | |
| 7,071,239 B2 | 7/2006 | Ortego, Jr. et al. | |
| 7,157,166 B2 | 1/2007 | Vajo | |
| 7,160,360 B2 | 1/2007 | Wu et al. | |
| 7,220,699 B2 | 5/2007 | Chellappa | |
| 7,276,214 B2 | 10/2007 | Johnston et al. | |
| 7,282,467 B2 | 10/2007 | Huisman et al. | |
| 7,294,425 B2 | 11/2007 | Hodge et al. | |
| 7,374,838 B2 | 5/2008 | Gallagher | |
| 7,439,273 B2 | 10/2008 | Woods et al. | |
| 7,569,294 B2 | 8/2009 | Graham et al. | |
| 7,662,435 B2 | 2/2010 | Chellappa et al. | |
| 7,670,587 B2 | 3/2010 | Porter et al. | |
| 7,731,918 B2 | 6/2010 | Chellappa | |
| 7,763,086 B2 | 7/2010 | Woods et al. | |
| 7,803,496 B2 | 9/2010 | Koyama et al. | |
| 7,862,631 B2 | 1/2011 | Burch et al. | |
| 8,043,767 B2 | 10/2011 | Benson | |
| 8,166,926 B2 | 5/2012 | Sasaki et al. | |
| 8,440,357 B2 | 5/2013 | Hossain et al. | |
| 8,617,265 B2 | 12/2013 | Chellappa | |
| 8,664,148 B2 | 3/2014 | Brey et al. | |
| 8,795,918 B2 | 8/2014 | Shimomura | |
| 8,877,407 B2 | 11/2014 | Akiyama | |
| 8,900,420 B2 | 12/2014 | Veeraraghavan et al. | |
| 8,916,300 B2 | 12/2014 | McElroy et al. | |
| 8,921,000 B2 | 12/2014 | Takeshita et al. | |
| 8,932,773 B2 | 1/2015 | Nakanishi et al. | |
| 8,961,923 B2 | 2/2015 | Grannell et al. | |
| 9,023,542 B2 | 5/2015 | Kaneko et al. | |
| 9,105,891 B2 | 8/2015 | Nagaosa | |
| 9,163,541 B2 | 10/2015 | Kumagai et al. | |
| 9,172,106 B2 | 10/2015 | Berning | |
| 9,187,321 B2 | 11/2015 | Fuse et al. | |
| 9,236,624 B2 | 1/2016 | Page et al. | |
| 9,341,111 B2 | 5/2016 | Hikazudani et al. | |
| 9,359,270 B2 | 6/2016 | Daly et al. | |
| 9,359,271 B2 | 6/2016 | LeViness et al. | |
| 9,506,400 B2 | 11/2016 | Tange et al. | |
| 9,670,063 B2 | 6/2017 | David et al. | |
| 9,737,869 B2 | 8/2017 | Kamata et al. | |
| 9,819,040 B2 | 11/2017 | Littau | |
| 9,861,951 B2 | 1/2018 | Vu | |
| 9,884,770 B2 | 2/2018 | Takeshima | |
| 9,896,332 B2 | 2/2018 | Hikazudani et al. | |
| 9,958,211 B2 | 5/2018 | Vernon | |
| 10,166,526 B2 | 1/2019 | Hamada et al. | |
| 10,322,940 B2 | 6/2019 | Hosono et al. | |
| 10,449,506 B2 | 10/2019 | Kamata et al. | |
| 10,450,192 B2 | 10/2019 | Finkelshtain et al. | |
| 10,478,805 B2 | 11/2019 | Hinokuma et al. | |
| 10,596,551 B2 | 3/2020 | Sharma et al. | |
| 10,830,125 B2 | 11/2020 | Pomar | |
| 10,875,002 B2 | 12/2020 | Patel et al. | |
| 10,906,804 B2 | 2/2021 | Li et al. | |
| 10,914,212 B1 | 2/2021 | Bargman et al. | |
| 10,919,025 B2 | 2/2021 | Li et al. | |
| 10,961,890 B2 | 3/2021 | Sung et al. | |
| 11,014,809 B2 | 5/2021 | Miura | |
| 11,038,181 B2 | 6/2021 | Kandlikar | |
| 11,065,591 B2 | 7/2021 | Speth et al. | |
| 11,084,012 B2 | 8/2021 | Jiang et al. | |
| 11,084,719 B2 | 8/2021 | Andersen et al. | |
| 11,110,434 B2 | 9/2021 | Jiang et al. | |
| 11,117,809 B2 | 9/2021 | Hojlund Nielsen | |
| 11,148,955 B2 | 10/2021 | Gorval et al. | |
| 11,149,662 B2 | 10/2021 | Heggen | |
| 11,156,168 B2 | 10/2021 | Nose et al. | |
| 11,161,739 B2 | 11/2021 | Gray | |
| 11,167,732 B1 | 11/2021 | Cohen et al. | |
| 11,287,089 B1 | 3/2022 | Cohen et al. | |
| 11,305,250 B2 | 4/2022 | Verykios et al. | |
| 11,309,568 B2 | 4/2022 | Achrai et al. | |
| 11,374,246 B2 | 6/2022 | Luo et al. | |
| 11,437,637 B2 | 9/2022 | Ikemoto et al. | |
| 11,465,114 B2 | 10/2022 | Jo et al. | |
| 11,539,063 B1 | 12/2022 | Choi et al. | |
| 2002/0028171 A1 | 3/2002 | Goetsch et al. | |
| 2003/0015093 A1 | 1/2003 | Wegeng et al. | |
| 2003/0189037 A1 | 10/2003 | Kochman et al. | |
| 2006/0112636 A1 | 6/2006 | Chellappa et al. | |
| 2006/0121322 A1 | 6/2006 | Haas et al. | |
| 2007/0190389 A1 | 8/2007 | Hinsenkamp et al. | |
| 2007/0221060 A1 | 9/2007 | Song | |
| 2007/0254204 A1 | 11/2007 | Shin et al. | |
| 2008/0145733 A1 | 6/2008 | Asazawa et al. | |
| 2008/0171255 A1 | 7/2008 | Brantley et al. | |
| 2009/0155644 A1 | 6/2009 | Cui et al. | |
| 2010/0060404 A1 | 3/2010 | Raiser et al. | |
| 2011/0136027 A1 | 6/2011 | Chen et al. | |
| 2012/0088168 A1 | 4/2012 | Pledger | |
| 2012/0121488 A1 | 5/2012 | Comrie | |
| 2013/0140295 A1 | 6/2013 | Yoshioka et al. | |
| 2013/0189603 A1 | 7/2013 | Sakamoto et al. | |
| 2014/0287911 A1 | 9/2014 | Wang et al. | |
| 2014/0356738 A1 | 12/2014 | Bell et al. | |
| 2016/0167962 A1 | 6/2016 | Hikazudani et al. | |
| 2016/0172702 A1 | 6/2016 | El Batawi et al. | |
| 2017/0070088 A1 | 3/2017 | Berntsen et al. | |
| 2018/0015443 A1 | 1/2018 | Finkelshtain et al. | |
| 2018/0138529 A1 | 5/2018 | Wynne et al. | |
| 2018/0261856 A1* | 9/2018 | Akashi | H01M 8/04007 |
| 2019/0393523 A1* | 12/2019 | Miura | H01M 8/0606 |
| 2020/0020965 A1* | 1/2020 | Wang | H01M 8/04955 |
| 2020/0032676 A1 | 1/2020 | Nose et al. | |
| 2020/0062590 A1 | 2/2020 | Mccullough et al. | |
| 2020/0099072 A1 | 3/2020 | Ikemoto et al. | |
| 2020/0123006 A1 | 4/2020 | Speth et al. | |
| 2020/0197889 A1 | 6/2020 | Jo et al. | |
| 2020/0266469 A1 | 8/2020 | Kojima et al. | |
| 2020/0269208 A1 | 8/2020 | Way et al. | |
| 2020/0295389 A1 | 9/2020 | Klein et al. | |
| 2020/0346937 A1 | 11/2020 | Beach et al. | |
| 2020/0388869 A1 | 12/2020 | Galbiati | |
| 2020/0398240 A1 | 12/2020 | Jiang et al. | |
| 2020/0403258 A1 | 12/2020 | Luo et al. | |
| 2021/0001311 A1 | 1/2021 | Wu et al. | |
| 2021/0036334 A1 | 2/2021 | Kon et al. | |
| 2021/0113983 A1 | 4/2021 | Mortensen et al. | |
| 2021/0178377 A1 | 6/2021 | Khatiwada et al. | |
| 2021/0178378 A1 | 6/2021 | Khatiwada et al. | |
| 2021/0234179 A1 | 7/2021 | Klein et al. | |
| 2021/0237046 A1 | 8/2021 | Gascon et al. | |
| 2021/0245139 A1 | 8/2021 | Seabaugh et al. | |
| 2021/0395082 A1 | 12/2021 | Iwai | |
| 2021/0395101 A1 | 12/2021 | Giddey et al. | |
| 2021/0395883 A1 | 12/2021 | Dip | |
| 2022/0002151 A1 | 1/2022 | Katikaneni et al. | |
| 2022/0090576 A1 | 3/2022 | Sia | |
| 2022/0119250 A1 | 4/2022 | Shin et al. | |
| 2022/0154646 A1 | 5/2022 | Araki et al. | |
| 2022/0158202 A1 | 5/2022 | Nishibayashi et al. | |
| 2022/0162490 A1 | 5/2022 | Jo et al. | |
| 2022/0162989 A1 | 5/2022 | Cocks et al. | |
| 2022/0162999 A1 | 5/2022 | Cocks et al. | |
| 2022/0163002 A1 | 5/2022 | Takeuchi | |
| 2022/0195919 A1 | 6/2022 | Akbari et al. | |
| 2022/0205415 A1 | 6/2022 | Takeuchi et al. | |
| 2022/0212172 A1 | 7/2022 | Song et al. | |
| 2022/0234886 A1 | 7/2022 | Yamazaki et al. | |
| 2022/0347644 A1 | 11/2022 | Jo et al. | |
| 2022/0362748 A1 | 11/2022 | Jo et al. | |
| 2022/0364505 A1 | 11/2022 | Kim et al. | |
| 2022/0389864 A1 | 12/2022 | Jo et al. | |
| 2022/0395810 A1 | 12/2022 | Sheludko et al. | |
| 2022/0395812 A1 | 12/2022 | Sheludko et al. | |
| 2022/0403775 A1 | 12/2022 | Jo et al. | |
| 2023/0001377 A1 | 1/2023 | Jo et al. | |
| 2023/0053230 A1 | 2/2023 | Jo et al. | |
| 2023/0055180 A1 | 2/2023 | Choi et al. | |

(56) References Cited

U.S. PATENT DOCUMENTS

| | | |
|---|---|---|
| 2023/0055949 A1 | 2/2023 | Choi et al. |
| 2023/0118083 A1 | 4/2023 | Jo et al. |
| 2023/0123946 A1 | 4/2023 | Mann |

FOREIGN PATENT DOCUMENTS

| | | |
|---|---|---|
| CA | 3132213 A1 | 9/2020 |
| CN | 101172575 A | 5/2008 |
| CN | 106517092 A | 3/2017 |
| CN | 210528460 U | 5/2020 |
| CN | 111332447 A | 6/2020 |
| CN | 210973870 U | 7/2020 |
| CN | 112901339 A | 6/2021 |
| CN | 113048469 A | 6/2021 |
| CN | 113058595 A | 7/2021 |
| CN | 113058610 A | 7/2021 |
| CN | 113074046 A | 7/2021 |
| CN | 113181957 A | 7/2021 |
| CN | 213651846 U | 7/2021 |
| CN | 213726378 U | 7/2021 |
| CN | 213738601 U | 7/2021 |
| CN | 113198476 A | 8/2021 |
| CN | 113202660 A | 8/2021 |
| CN | 113289693 A | 8/2021 |
| CN | 213943062 U | 8/2021 |
| CN | 213976966 U | 8/2021 |
| CN | 214059903 U | 8/2021 |
| CN | 214060653 U | 8/2021 |
| CN | 113332987 A | 9/2021 |
| CN | 113363545 A | 9/2021 |
| CN | 113451615 A | 9/2021 |
| CN | 113540541 A | 10/2021 |
| CN | 214399815 U | 10/2021 |
| CN | 214406970 U | 10/2021 |
| CN | 214406981 U | 10/2021 |
| CN | 214486811 U | 10/2021 |
| CN | 113604813 A | 11/2021 |
| CN | 113666334 A | 11/2021 |
| CN | 113694922 A | 11/2021 |
| CN | 214611516 U | 11/2021 |
| CN | 214716493 U | 11/2021 |
| CN | 214753865 U | 11/2021 |
| CN | 214880199 U | 11/2021 |
| CN | 214959115 U | 11/2021 |
| CN | 214959751 U | 11/2021 |
| CN | 113775924 A | 12/2021 |
| CN | 113788134 A | 12/2021 |
| CN | 113864783 A | 12/2021 |
| CN | 214990264 U | 12/2021 |
| CN | 215002336 U | 12/2021 |
| CN | 215066412 U | 12/2021 |
| CN | 215364901 U | 12/2021 |
| CN | 113896168 A | 1/2022 |
| CN | 215578650 U | 1/2022 |
| CN | 215592611 U | 1/2022 |
| DE | 102017011833 A1 | 6/2019 |
| DK | 201900097 U3 | 3/2020 |
| EP | 2070141 B1 | 12/2012 |
| EP | 2774202 B1 | 8/2015 |
| EP | 1868941 B9 | 2/2017 |
| EP | 3028990 B1 | 8/2017 |
| EP | 3059206 B1 | 8/2017 |
| EP | 3258524 A1 | 12/2017 |
| EP | 2715847 B1 | 1/2019 |
| EP | 3448803 A1 | 3/2019 |
| EP | 3632543 A1 | 4/2020 |
| EP | 2332646 B1 | 7/2020 |
| EP | 3409354 B1 | 9/2021 |
| EP | 3878806 A1 | 9/2021 |
| EP | 3015164 B1 | 2/2022 |
| EP | 3981054 A1 | 4/2022 |
| EP | 3981739 A1 | 4/2022 |
| EP | 4017947 A1 | 6/2022 |
| IN | 394309 B | 4/2022 |
| JP | 2005145748 A | 6/2005 |
| JP | 3940551 B2 | 7/2007 |
| JP | 2008153091 A | 7/2008 |
| JP | 2009035458 A | 2/2009 |
| JP | 2010195642 A | 9/2010 |
| JP | 4666301 B2 | 4/2011 |
| JP | 2012005926 A | 1/2012 |
| JP | 5263677 B2 | 8/2013 |
| JP | 5272762 B2 | 8/2013 |
| JP | 5272767 B2 | 8/2013 |
| JP | 5321230 B2 | 10/2013 |
| JP | 5346693 B2 | 11/2013 |
| JP | 5352343 B2 | 11/2013 |
| JP | 5371542 B2 | 12/2013 |
| JP | 5380233 B2 | 1/2014 |
| JP | 5389525 B2 | 1/2014 |
| JP | 5426201 B2 | 2/2014 |
| JP | 5430224 B2 | 2/2014 |
| JP | 5755160 B2 | 7/2015 |
| JP | 5810710 B2 | 11/2015 |
| JP | 5811494 B2 | 11/2015 |
| JP | 2016131065 A | 7/2016 |
| JP | 2016198720 A | 12/2016 |
| JP | 6308844 B2 | 4/2018 |
| JP | 2018076214 A | 5/2018 |
| JP | 6381131 B2 | 8/2018 |
| JP | 6482022 B2 | 3/2019 |
| JP | 2019053854 A | 4/2019 |
| JP | 2019177381 A | 10/2019 |
| JP | 6604501 B2 | 11/2019 |
| JP | 2020040860 A | 3/2020 |
| JP | JP-WO2018221701 A1 | 4/2020 |
| JP | 6706277 B2 | 6/2020 |
| JP | 6778370 B2 | 11/2020 |
| JP | 6789080 B2 | 11/2020 |
| JP | 2020183337 A | 11/2020 |
| JP | 2020196646 A | 12/2020 |
| JP | 2020197169 A | 12/2020 |
| JP | 6850449 B2 | 3/2021 |
| JP | 6866570 B2 | 4/2021 |
| JP | 2021095300 A | 6/2021 |
| JP | 2021110463 A | 8/2021 |
| JP | 6929045 B2 | 9/2021 |
| JP | 6938186 B2 | 9/2021 |
| JP | 2021127861 A | 9/2021 |
| JP | 2021128904 A | 9/2021 |
| JP | 2021130100 A | 9/2021 |
| JP | 2021161006 A | 10/2021 |
| JP | 2021161921 A | 10/2021 |
| JP | 2021173232 A | 11/2021 |
| JP | 6996181 B2 | 2/2022 |
| JP | 7036318 B2 | 3/2022 |
| JP | 7074103 B2 | 5/2022 |
| JP | 7076930 B2 | 5/2022 |
| JP | 7079068 B2 | 6/2022 |
| KR | 20040039951 A | 5/2004 |
| KR | 101173456 B1 | 8/2012 |
| KR | 101388755 B1 | 4/2014 |
| KR | 101768078 B1 | 8/2017 |
| KR | 102159237 B1 | 9/2020 |
| KR | 102174654 B1 | 11/2020 |
| KR | 102219136 B1 | 2/2021 |
| KR | 102247199 B1 | 5/2021 |
| KR | 102254196 B1 | 5/2021 |
| KR | 102256907 B1 | 5/2021 |
| KR | 102303094 B1 | 9/2021 |
| KR | 102304381 B1 | 9/2021 |
| KR | 102304406 B1 | 9/2021 |
| KR | 102309466 B1 | 10/2021 |
| KR | 102315763 B1 | 10/2021 |
| KR | 20210136381 A | 11/2021 |
| KR | 102335322 B1 | 12/2021 |
| KR | 20220005829 A | 1/2022 |
| KR | 102392578 B1 | 5/2022 |
| KR | 20220057717 A | 5/2022 |
| KR | 20220093960 A | 7/2022 |
| KR | 20220094475 A | 7/2022 |
| NL | 2017963 B1 | 6/2018 |
| TW | I274604 B | 3/2007 |
| WO | WO-9840311 A1 | 9/1998 |

(56) References Cited

FOREIGN PATENT DOCUMENTS

| | | |
|---|---|---|
| WO | WO-0183108 A1 | 11/2001 |
| WO | WO-0187770 A1 | 11/2001 |
| WO | WO-0208117 A1 | 1/2002 |
| WO | WO-02071451 A2 | 9/2002 |
| WO | WO-2005091418 A2 | 9/2005 |
| WO | WO-2005099885 A1 | 10/2005 |
| WO | WO-2006113451 A2 | 10/2006 |
| WO | WO-2006134419 A2 | 12/2006 |
| WO | WO-2007119262 A2 | 10/2007 |
| WO | WO-2008024089 A2 | 2/2008 |
| WO | WO-2008088319 A2 | 7/2008 |
| WO | WO-2009098452 A2 | 8/2009 |
| WO | WO-2009116679 A1 | 9/2009 |
| WO | WO-2010116874 A3 | 4/2011 |
| WO | WO-2011107279 A1 | 9/2011 |
| WO | WO-2012039183 A1 | 3/2012 |
| WO | WO-2013057473 A1 | 4/2013 |
| WO | WO-2013063169 A1 | 5/2013 |
| WO | WO-2013122849 A1 | 8/2013 |
| WO | WO-2013142123 A1 | 9/2013 |
| WO | WO-2014054277 A1 | 4/2014 |
| WO | WO-2015044691 A1 | 4/2015 |
| WO | WO-2015074127 A1 | 5/2015 |
| WO | WO-2016013652 A1 | 1/2016 |
| WO | WO-2016051633 A1 | 4/2016 |
| WO | WO-2017099143 A1 | 6/2017 |
| WO | WO-2017186614 A1 | 11/2017 |
| WO | WO-2018185663 A1 | 10/2018 |
| WO | WO-2018198635 A1 | 11/2018 |
| WO | WO-2019032591 A1 | 2/2019 |
| WO | WO-2019038251 A1 | 2/2019 |
| WO | WO-2021063795 A1 | 4/2021 |
| WO | WO-2021156626 A1 | 8/2021 |
| WO | WO-2021168226 A1 | 8/2021 |
| WO | WO-2021172545 A1 | 9/2021 |
| WO | WO-2021177359 A1 | 9/2021 |
| WO | WO-2021221943 A1 | 11/2021 |
| WO | WO-2021225254 A1 | 11/2021 |
| WO | WO-2021228428 A1 | 11/2021 |
| WO | WO-2021241841 A1 | 12/2021 |
| WO | WO-2021260108 A1 | 12/2021 |
| WO | WO-2022010178 A1 | 1/2022 |
| WO | WO-2022055225 A1 | 3/2022 |
| WO | WO-2021257944 A9 | 4/2022 |
| WO | WO-2022070597 A1 | 4/2022 |
| WO | WO-2022076341 A1 | 4/2022 |
| WO | WO-2022079435 A1 | 4/2022 |
| WO | WO-2022106568 A1 | 5/2022 |
| WO | WO-2022119376 A1 | 6/2022 |
| WO | WO-2022129294 A1 | 6/2022 |
| WO | WO-2022153059 A1 | 7/2022 |
| WO | WO-2022153060 A1 | 7/2022 |
| WO | WO-2022153061 A1 | 7/2022 |
| WO | WO-2022153718 A1 | 7/2022 |
| WO | WO-2022153719 A1 | 7/2022 |
| WO | WO-2022153720 A1 | 7/2022 |
| WO | WO-2022241260 A1 | 11/2022 |
| WO | WO-2022261488 A1 | 12/2022 |
| WO | WO-2023022995 A1 | 2/2023 |

OTHER PUBLICATIONS

Co-pending U.S. Appl. No. 17/974,885, inventors Jo; Young Suk et al., filed on Oct. 27, 2022.

Co-pending U.S. Appl. No. 17/974,997, inventors Jo; Young Suk et al., filed on Oct. 27, 2022.

Co-pending U.S. Appl. No. 17/975,184, inventors Jo; Young Suk et al., filed on Oct. 27, 2022.

Co-pending U.S. Appl. No. 18/065,915, inventors Sheludko; Boris et al., filed on Dec. 14, 2022.

Co-pending U.S. Appl. No. 18/066,163, inventors Sheludko; Boris et al., filed on Dec. 14, 2022.

Co-pending U.S. Appl. No. 18/081,512, inventors Jo; Young Suk et al., filed on Dec. 14, 2022.

International search report with written opinion dated Nov. 3, 2022 for PCT/US2022/040367.

Co-pending U.S. Appl. No. 17/366,633, inventors Kim; Hyunho et al., filed on Jul. 2, 2021.

Co-pending U.S. Appl. No. 17/401,993, inventors Jo; Young Suk et al., filed on Aug. 13, 2021.

Co-pending U.S. Appl. No. 17/589,287, inventors Choi; Jongwon et al., filed on Jan. 31, 2022.

Co-pending U.S. Appl. No. 17/886,219, inventors Sheludko; Boris et al., filed on Aug. 11, 2022.

Co-pending U.S. Appl. No. 17/886,307, inventors Sheludko; Boris et al., filed on Aug. 11, 2022.

Co-pending U.S. Appl. No. 17/889,256, inventors Jo; Young Suk et al., filed on Aug. 16, 2022.

Co-pending U.S. Appl. No. 17/889,260, inventors Jo; Young Suk et al., filed on Aug. 16, 2022.

Co-pending U.S. Appl. No. 17/968,109, inventors Choi; Jongwon et al., filed on Oct. 18, 2022.

Co-pending U.S. Appl. No. 17/968,125, inventors Choi; Jongwon et al., filed on Oct. 18, 2022.

Gallucci, M. The Ammonia Solution: Ammonia engines and fuel cells in cargo ships could slash their carbon emissions. IEEE Spectrum. 58(3): 44-50. Mar. 2021. doi: 10.1109/MSPEC.2021.9370109.

Hansgen, et al. Using first principles to predict bimetallic catalysts for the ammonia decomposition reaction. Nat Chem. Jun. 2010;2(6):484-489. doi: 10.1038/nchem.626. Epub Apr. 25, 2010.

International search report with written opinion dated Sep. 21, 2022 for PCT/US2022/029264.

Kumar S. Heat Exchanger—Types, Working, Construction. https://marinerspoint.in/working-of-heatexchanger/2020/11/, Nov. 4, 2020, 9 pages.

Notice of Allowance dated Aug. 11, 2022 for U.S. Appl. No. 17/589,287.

Notice of Allowance dated Sep. 14, 2022 for U.S. Appl. No. 17/589,287.

Office action dated Jun. 2, 2022 for U.S. Appl. No. 17/589,287.

Co-pending U.S. Appl. No. 18/133,388, inventors Sheludko; Boris et al., filed Apr. 11, 2023.

Office action dated Mar. 3, 2023 for U.S. Appl. No. 17/968,125.

\* cited by examiner

SYSTEMS AND METHODS FOR PROCESSING HYDROGEN

CROSS REFERENCE

This application is a continuation of International Patent Application No. PCT/US22/40367, filed Aug. 15, 2022, which claims priority to U.S. patent application Ser. No. 17/589,287, filed Jan. 31, 2022, claiming the benefit of U.S. Provisional Patent Application No. 63/234,137, filed Aug. 17, 2021, each of which are incorporated herein by reference in their entirety for all purposes.

BACKGROUND

Various systems may be powered using a fuel source. The fuel source may have a specific energy corresponding to an amount of energy stored or extractable per unit mass of fuel. The fuel source may be provided to the various systems to enable such systems to generate energy (e.g., electrical energy) and/or deliver power (e.g., for movement or transportation purposes).

SUMMARY

Hydrogen can be leveraged as a clean energy source to power various systems. Hydrogen can provide a distinct advantage over other types of fuel such as diesel, gasoline, or jet fuel, which have specific energies of about 45 megajoules per kilogram (MJ/kg) (heat), or lithium-ion batteries, which have a specific energy of about 0.95 MJ/kg (electrical). In contrast, hydrogen has a specific energy of over 140 MJ/kg (heat). As such, 1 kg of hydrogen can provide the same amount of energy as about 3 kg of gasoline or kerosene. Thus, hydrogen as a fuel source can help to reduce the amount of fuel (by mass) needed to provide a comparable amount of energy as other traditional sources of fuel. Further, systems that use hydrogen as a fuel source (e.g., as a combustion reactant) generally produce benign or nontoxic byproducts such as water while producing minimal or near zero carbon dioxide and nitrous oxide emissions, thereby reducing the environmental impacts of various systems (e.g., modes of transportation) that use hydrogen as a fuel source.

Recognized herein are various limitations with conventional systems and methods for processing hydrogen and/or mixtures of hydrogen and nitrogen to produce electrical energy. For example, commercially available fuel cells may exhibit degraded performance over time when processing source materials comprising hydrogen and other impurities (e.g., gases such as ammonia and/or nitrogen). Since hydrogen extracted from hydrogen carriers may comprise one or more other elements or compounds that can negatively impact fuel cell performance (e.g., conversion efficiency of a source material into electrical energy), commercially available fuel cells may require separation of hydrogen from other materials before the hydrogen is fed to a fuel cell, which can be time consuming and resource intensive.

The present disclosure provides systems and methods to address at least the abovementioned shortcomings of conventional systems for processing a source material to generate electrical energy. The present application relates generally to systems and methods for processing a source material (e.g., hydrogen and/or nitrogen) to produce energy (e.g., electrical energy). The energy may be used to power a system such as a vehicle. In some embodiments, the vehicle may comprise a drone, a light-duty vehicle, a heavy-duty vehicle, or a maritime vehicle. In some embodiments, the vehicle may be configured to be operated by a human or a computer. In some embodiments, the vehicle may be autonomous or semi-autonomous. The source material may comprise hydrogen and other elements or compounds. In some instances, the source material may comprise a mixture of hydrogen and nitrogen. The source material may or may not comprise other impurities. In some cases, the source material may be filtered before being provided to a fuel cell. Such filtering may be used to remove carbon monoxide and/or ammonia from the source material. The systems and methods of the present disclosure may be used to convert hydrogen mixtures into electrical energy without requiring filtration or purification of hydrogen mixtures to remove nitrogen and/or ammonia.

In one aspect, the present disclosure provides a fuel cell for processing hydrogen to generate an electrical current. The fuel cell may comprise an anode, a cathode, and a membrane between the anode and the cathode. In some embodiments, the anode may comprise an anode gas diffusion layer with one or more channels for directing a source material to the anode to facilitate processing of the source material to generate an electrical current. In some embodiments, the one or more channels may comprise one or more surface features configured to (i) enhance a diffusion and transport of the source material through the anode gas diffusion layer and (ii) facilitate a purging of select materials from the anode gas diffusion layer. In some embodiments, the source material may comprise hydrogen and/or nitrogen. In some embodiments, the select materials may comprise at least nitrogen. In some embodiments, the select materials may comprise one or more impurities or unconverted ammonia. In some embodiments, the one or more features are configured to direct a flow of nitrogen from the anode gas diffusion layer to out of the fuel cell such that nitrogen does not accumulate in the anode gas diffusion layer.

In some embodiments, processing of the source material may comprise a dissociation of one or more hydrogen molecules of the source material into one or more protons and one or more electrons. In some embodiments, the anode gas diffusion layer may comprise a felt material, a foam material, a cloth material, or a paper material. In some embodiments, the felt, foam, cloth, or paper material may be a carbon-based material (e.g., carbon fibers).

In some embodiments, the one or more surface features may comprise one or more cuts or grooves on a surface of the one or more channels. In some embodiments, the one or more cuts or grooves may extend across a portion of the surface of the one or more channels. In some embodiments, the one or more cuts or grooves may comprise two or more cuts or grooves that are parallel to each other. In some embodiments, the one or more cuts or grooves may comprise two or more cuts or grooves that are perpendicular to each other. In some embodiments, the one or more cuts or grooves may comprise two or more cuts or grooves that are disposed at an angle relative to each other. The angle may range from 0 degrees to about 90 degrees. In some embodiments, the one or more cuts or grooves may comprise two or more cuts or grooves that intersect with each other. In some embodiments, the one or more cuts or grooves may comprise two or more cuts or grooves that do not intersect. In some embodiments, the one or more surface features may comprise one or more cutouts or openings on a surface of the one or more channels. In some embodiments, the one or more cutouts or openings may extend across a portion of the surface of the one or more channels. In some embodiments, the one or more cutouts or openings may comprise two or more cutouts or openings that are parallel to each other. In some embodiments, the one or more cutouts or openings may comprise two or more cutouts or openings that are perpendicular to each other. In some embodiments, the one or more cutouts or openings may comprise two or more cutouts or openings that are disposed at an angle relative to each other. In some embodiments, the angle may range from 0 degrees to about 90 degrees. In some embodiments, the one or more cutouts or openings may comprise two or more cuts or grooves that intersect with each other. In some embodiments, the one or more cutouts or openings may comprise two or more cutouts or openings that do not intersect. In some embodiments, a feature of the one or more features has a depth ranging from about 0.01 millimeter (mm) to about 10 mm.

In some embodiments, the anode gas diffusion layer may comprise one or more layers. In some embodiments, the one or more layers may comprise two or more layers. In some embodiments, at least one layer of the two or more layers may comprise the one or more surface features. In some embodiments, the one or more surface features may comprise (i) one or more cuts or grooves or (ii) one or more cutouts or openings. In some embodiments, the two or more layers may comprise a first layer comprising a first set of surface features and a second layer comprising a second set of surface features. In some embodiments, the first set of features and the second set of features may comprise a same or similar set of features. In some embodiments, the first set of features and the second set of features may comprise different sets of features having different shapes, dimensions, positions, or orientations. In some embodiments, the first set of features and the second set of features may overlap or partially overlap. In some embodiments, the first set of features and the second set of features may not or need not overlap.

In some embodiments, the cathode may comprise one or more air flow channels. In some embodiments, the cathode may comprise a cathode current collecting layer and a cathode gas diffusion layer. In some embodiments, the one or more air flow channels or a subset thereof may be configured to function as a current collecting layer. In some embodiments, the anode may further comprise an anode current collecting layer.

In another aspect, the present disclosure provides a fuel cell system. The fuel cell system may comprise a plurality of fuel cells, disclosed herein, arranged adjacent to or stacked on top of each other. The plurality of fuel cells may comprise a fuel cell with an anode, a cathode, and an electrolyte disposed between the anode and the cathode. In some embodiments, the anode may comprise an anode gas diffusion layer with one or more channels for directing a source material through the anode to facilitate processing of the source material to generate an electrical current. In some embodiments, the one or more channels may comprise one or more surface features configured to (i) enhance a diffusion and transport of the source material through the anode gas diffusion layer and (ii) facilitate a purging of select materials from the anode gas diffusion layer. In some embodiments, the fuel cell system may comprise at least one ammonia reformer or reactor in fluid communication with the plurality of fuel cells. In some embodiments, the at least one ammonia reformer or reactor is configured to (i) generate the source material and (ii) provide the source material to the fuel cell. In some embodiments, the fuel cell system comprises a computer configured to operate the fuel cell to allow purging of nitrogen from the fuel cell while the fuel cell is generating electricity. In some embodiments, the computer configured to operate the fuel cell to allow continuous purging of nitrogen. In some embodiments, the fuel cell system further comprises one or more inlet ports configured to receive the source material, wherein ammonia concentration in the source material is less than 1 parts per million (ppm). In some embodiments, the fuel cell system further comprises one or more exit ports configured to direct unconverted hydrogen from the plurality of fuel cells to the at least one ammonia reformer or reactor for combustion heating.

In some aspects, the present disclosure provides a method for generating electricity using a fuel cell, comprising: reacting, using an ammonia reformer, ammonia to generate a first continuous stream comprising nitrogen and hydrogen, wherein the ammonia reformer is in fluid communication with the fuel cell, the fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features configured to (i) increase a hydrogen consumption rate of the fuel cell, or (ii) increase an output voltage of the fuel cell at a same hydrogen consumption rate, when the first continuous stream contacts the anode compared to an equivalent fuel cell lacking the one or more features, wherein the one or more features comprise (1) one or more cuts, (2) one or more cutouts, (3) one or more grooves, or (4) any combination thereof; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power.

In some embodiments, the one or more features increase the hydrogen consumption rate of the fuel cell when the first continuous stream contacts the anode compared to the equivalent fuel cell lacking the one or more features.

In some embodiments, the one or more features increase the hydrogen consumption rate by at least 5, 10, 20, 40, 60, 80, 100, 120, 140, 160, 180, or 200%.

In some embodiments, the one or more features increase the hydrogen consumption rate by at most 5, 10, 20, 40, 60, 80, 100, 120, 140, 160, 180, or 200%.

In some embodiments, the one or more features increase the output voltage at the same hydrogen consumption rate when the first continuous stream contacts the anode compared to the equivalent fuel cell lacking the one or more features.

In some embodiments, the one or more features increase the voltage by at least 5, 10, 20, 40, 60, 80, 100, 120, 140, 160, 180, or 200%.

In some embodiments, the one or more features increase the hydrogen consumption rate by at most 5, 10, 20, 40, 60, 80, 100, 120, 140, 160, 180, or 200%.

In some embodiments, the one or more features continuously purge nitrogen out of the fuel cell.

In some embodiments, the nitrogen is continuously purged out of the first channel by the one or more features so that nitrogen accumulation is reduced in the first channel, thereby increasing the hydrogen consumption rate compared to the equivalent fuel cell lacking the one or more features.

In some embodiments, the hydrogen consumption rate of the fuel cell when the first continuous stream contacts the anode is at least about 10, 20, 30, 40, 50, 60, 70, 80, 90, or 99% of the hydrogen in the first continuous stream.

In some embodiments, the hydrogen consumption rate of the fuel cell when the first continuous stream contacts the anode is at most about 10, 20, 30, 40, 50, 60, 70, 80, 90, or 99% of the hydrogen in the first continuous stream.

In some embodiments, the method further comprises intermittently reducing the hydrogen consumption rate to purge out at least one of hydrogen, nitrogen, or water.

In some embodiments, the method further comprises reducing the hydrogen consumption rate and directing at least a part of the first continuous stream to the ammonia reformer.

In some embodiments, the method further comprises reducing the hydrogen consumption rate of the fuel cell to zero and directing at least a part of the first continuous stream to the ammonia reformer.

In some embodiments, the method further comprises flaring the at least the part of the first continuous stream directed to the ammonia reformer at one or more combustion exhausts of one or more combustion heaters, wherein the one or more combustion heaters are in operable communication with the ammonia reformer for heating the ammonia reformer, and wherein the one or more combustion heaters are in fluidic communication with the fuel cell to receive the at least the part of the first continuous stream.

In some aspects, the present disclosure provides a method for generating electricity using a fuel cell, comprising: reacting, using an ammonia reformer, ammonia to generate a first continuous stream comprising nitrogen and hydrogen, wherein the ammonia reformer is in fluid communication with the fuel cell, the fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power; wherein the fuel cell is configured to provide a ratio of an electrical power output of the fuel cell to a projected surface area of the anode that is at least about 0.05 W/cm2 when the first continuous stream comprises about 25% nitrogen and about 75% hydrogen by moles, and the second continuous stream comprises at least 20% oxygen by moles.

In some embodiments, the ratio is at least about 0.1, 0.15, 0.2, 0.25, 0.3, 0.35, or 0.4 W/cm2.

In some embodiments, the ratio is at most about 0.1, 0.15, 0.2, 0.25, 0.3, 0.35, or 0.4 W/cm2.

In some embodiments, the ratio is based on the first continuous stream comprising a hydrogen flow rate of at least about 0.001, 0.01, 0.1, 1, 10, 100, 1000, 10000, or 100000 mole per second.

In some embodiments, the ratio is based on the second continuous stream comprising an oxygen flow rate of at least about 0.0001, 0.001, 0.01, 0.1, 1, 10, 100, 1000, 10000, 100000, 1000000 mole per second.

In some embodiments, the ratio is based on the second continuous stream comprising air.

In some embodiments, the ratio is based on the first continuous stream comprising the hydrogen and the nitrogen from the ammonia reformer.

In some embodiments, the anode projected surface area comprises the largest possible surface area of the anode projected onto a flat plane.

In some embodiments, the anode projected surface area comprises a surface area of the largest surface of the anode.

In some aspects, the present disclosure provides a method for generating electricity using a fuel cell, comprising: reacting, using an ammonia reformer, ammonia to generate a first continuous stream comprising nitrogen and hydrogen, wherein the ammonia reformer is in fluid communication with a fuel cell, the fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power that is at least 50% of a reference electrical power, wherein the reference electrical power is generated using the fuel cell receiving a stream comprising at least 99% hydrogen by moles into the first inlet, wherein the electrical power is generated at a same current or a same hydrogen consumption rate as the reference electrical power.

In some embodiments, the electrical power is at least 60, 70, 80, 90, 91, 92, 93, 94, 95, 96, 97, 98, or 99% of the reference electrical power.

In some embodiments, the electrical power is at most 60, 70, 80, 90, 91, 92, 93, 94, 95, 96, 97, 98, or 99% of the reference electrical power.

In some aspects, the present disclosure provides a method for generating electricity using a fuel cell, comprising: reacting, using an ammonia reformer, ammonia to generate a first continuous stream comprising nitrogen and hydrogen, wherein the ammonia reformer is in fluid communication with a fuel cell, wherein the fuel cell comprises: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof, wherein the one or more features comprise a depth less than 10 mm; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power.

In some embodiments, the one or more features comprises a depth less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

In some embodiments, the one or more features comprises a depth greater than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

In some embodiments, the depth is at least $1/32$, $1/16$, $1/8$, $1/4$, $1/2$, $3/4$, $7/8$, $15/16$, or $31/32$ of the thickness of the first channel.

In some embodiments, the depth is at most $1/32$, $1/16$, $1/8$, $1/4$, $1/2$, $3/4$, $7/8$, $15/16$, or $31/32$ of the thickness of the first channel.

In some embodiments, the first channel comprises a ratio of a first projected surface area of the one or more features to a second projected surface area of the first channel that is at least 0.1, 0.2, 0.3, 0.4, 0.5, 0.6, 0.7, 0.8, or 0.9.

In some embodiments, the first channel comprises a ratio of a first projected surface area of the one or more features to a second projected surface area of the first channel that is at most 0.1, 0.2, 0.3, 0.4, 0.5, 0.6, 0.7, 0.8, or 0.9.

In some embodiments, the one or more features comprise two or more features.

In some embodiments, at least a first segment of a first feature of the two or more features is substantially parallel to a second segment of a second feature of the two or more features.

In some embodiments, at least a first segment of a first feature of the two or more features is substantially perpendicular to a second segment of a second feature of the two or more features.

In some embodiments, at least a first segment of a first feature of the two or more features is at an angle to a second segment of a second feature of the two or more features, wherein the angle is between 0 and 90 degrees, between 15 and 75 degrees, between 0 and 30 degrees, or between 30 and 60 degrees.

In some embodiments, the two or more features are connected.

In some embodiments, the two or more features are disconnected.

In some embodiments, the two or more features intersect.

In some embodiments, the one or more features comprise a serpentine shape.

In some embodiments, the one or more features are substantially parallel with the longest side of the first channel.

In some embodiments, the one or more features are substantially parallel with the shortest side of the first channel.

In some embodiments, the fuel cell comprises a plurality of channels in fluid communication with the anode, wherein the plurality of channels comprise the first channel.

In some embodiments, the plurality of channels comprises a stack of layers that are adjacent to one another.

In some embodiments, at least one channel in the plurality of channels does not comprise or lacks the one or more features comprising (i) one or more cuts, (ii) one or more cutouts, (iii) one or more grooves, or (iv) any combination thereof.

In some embodiments, the one or more features are further configured to facilitate purging of a select material from the anode gas diffusion layer, wherein the select material comprises one or more of nitrogen, ammonia, water, or one or more impurities.

In some embodiments, the fuel cell further comprises one or more exit ports for discharging the select material and unconverted hydrogen from the fuel cell.

In some embodiments, the first channel comprises a felt, a foam, a cloth, or a paper material.

In some embodiments, the felt, the foam, the cloth, or the paper material is a carbon-based material.

In some embodiments, the one or more features extend across at least a portion of the surface of the first channel.

In some embodiments, the electrolyte comprises a proton-exchange membrane.

In some embodiments, the one or more features are configured to purge nitrogen from the fuel cell while the fuel cell is generating electricity.

In some embodiments, a concentration of ammonia in the first continuous stream is at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

In some embodiments, a concentration of ammonia in the first continuous stream is at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

In some embodiments, the one or more features increase a power density of the fuel cell by at least 5, 10, 20, 40, 60, 80, 100, 120, 140, 160, 180, or 200%.

In some embodiments, a power density of the fuel cell is at least about 0.1, 0.5, 1, 2, 3, 4, 5, 6, 7, 8, 9, 10, 20, or 30 kW/L.

In some embodiments, a power density of the fuel cell is at most about 0.1, 0.5, 1, 2, 3, 4, 5, 6, 7, 8, 9, 10, 20, or 30 kW/L.

In some embodiments, the method further comprises outputting a third continuous stream comprising unconverted hydrogen from the fuel cell.

In some embodiments, the method further comprises directing the third continuous stream comprising the unconverted hydrogen to the ammonia reformer.

In some embodiments, the method further comprises combusting the unconverted hydrogen to heat the ammonia reformer.

In some embodiments, the method further comprises, using one or more air supply units, providing at least oxygen to the ammonia reformer to combust the unconverted hydrogen in the third continuous stream.

In some embodiments, the method further comprises removing water in the third continuous stream prior to combusting the unconverted hydrogen.

In some embodiments, the method further comprises flaring the third continuous stream.

In some embodiments, the first continuous stream comprises at most about 50, 60, 70, 80, 90, 95, 99, 99.1, 99.2, 99.3, 99.4, 99.5, 99.6, 99.7, 99.8, or 99.9% of hydrogen by moles.

In some embodiments, first continuous stream comprises at least about 50, 60, 70, 80, 90, 95, 99, 99.1, 99.2, 99.3, 99.4, 99.5, 99.6, 99.7, 99.8, or 99.9% of hydrogen by moles.

In some embodiments, an absolute pressure of the first continuous stream is at least about 0.5, 1, 2, 3, 4, 5, 6, 7, 8, 9, 10, 15, 20, 25, 30, or 40 bar.

In some embodiments, an absolute pressure of the first continuous stream is at most about 0.5, 1, 2, 3, 4, 5, 6, 7, 8, 9, 10, 15, 20, 25, 30, or 40 bar.

In some embodiments, the method further comprises maintaining the absolute pressure of the first continuous stream within a tolerance of 1, 5, 10, 20, 30, 40, 50, 60, 70, 80, 90, 100, 110, 150, 200, 300, 400, 500, or 1000% of the absolute pressure.

In some embodiments, the method further comprises modulating the absolute pressure of the first continuous stream using one or more flow regulators, pressure regulators, control units, or any combination thereof.

In some embodiments, the one or more flow regulators, pressure regulators, control units, or any combination thereof are positioned upstream or downstream of the fuel cell.

In some embodiments, the method further comprises modulating a flow rate of the third continuous stream using one or more flow regulators, pressure regulators, control units, or any combination thereof.

In some embodiments, the one or more flow regulators, pressure regulators, control units, or any combination thereof are positioned upstream or downstream of the fuel cell.

In some embodiments, the one or more flow regulators, pressure regulators, control units, or any combination thereof are positioned downstream of the fuel cell to prevent a back flow of the unconverted hydrogen.

In some embodiments, the method further comprises using the generated electrical power to power one or more electric devices.

In some embodiments, the method further comprises using the generated electrical power to power one or more electrical grids.

In some embodiments, the fuel cell comprises a plurality of fuel cells, and the ammonia reformer provides a plurality of streams comprising hydrogen and nitrogen to the plurality of the fuel cells.

In some embodiments, the method further comprises directing unconverted hydrogen from the plurality of fuel cells to the at least one ammonia reformer or reactor for combustion heating.

In some embodiments, at least one fuel cell of the plurality of fuel cells outputs a different electrical power than other fuel cells of the plurality of fuel cells.

In some embodiments, at least one fuel cell of the plurality of fuel cells is configured to reduce an electrical power output.

In some embodiments, the method further comprises modulating the flow rates of the plurality of streams using one or more flow regulators, pressure regulators, control units, or any combination thereof.

In some embodiments, at least one fuel cell of the plurality of the fuel cells receives a stream of the plurality of streams, the stream comprising a flow rate that is different from the flow rates of other streams of the plurality of streams.

In some embodiments, each of the plurality of the fuel cells receives one of the plurality of streams at a flow rate that is about the same as or within a selected tolerance of other flow rates of others of the plurality of streams.

In some embodiments, the selected tolerance is about 10, 20, 30, 40, 50, 60, 70, 80, 90, or 100%.

In some embodiments, the plurality of fuel cells comprises at least one fuel cell that is different in size, power output, hydrogen consumption rate, power density, or operating temperature from the other fuel cells.

In some aspects, the present disclosure provides a system comprising: an ammonia reformer configured to react ammonia to generate a first continuous stream comprising nitrogen and hydrogen; a fuel cell in fluid communication with the ammonia reformer, wherein the fuel cell comprises: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features configured to (i) increase a hydrogen consumption rate, or (ii) increase an output voltage at the same hydrogen consumption rate, when the first continuous stream contacts the anode compared to an equivalent fuel cell lacking the one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; and a controller comprising at least one processor configured to perform executable instructions, wherein instructions executable by the controller are configured to: react the ammonia, using the ammonia reformer, to generate the first continuous stream comprising hydrogen and nitrogen; direct a second continuous stream comprising oxygen to the cathode of the fuel cell; and direct the first continuous stream to the anode of the fuel cell to react the hydrogen and oxygen to generate electricity.

In some embodiments, the one or more features increase a hydrogen consumption rate of the fuel cell when the first continuous stream contacts the anode compared to the equivalent fuel cell lacking the one or more features.

In some embodiments, the one or more features increase the hydrogen consumption rate by at least 20, 40, 60, 80, 100, 120, 140, 160, 180, or 200%.

In some embodiments, the one or more features increase the hydrogen consumption rate by at most 20, 40, 60, 80, 100, 120, 140, 160, 180, or 200%.

In some embodiments, the one or more features increase the output voltage at the same hydrogen consumption rate when the first continuous stream contacts the anode compared to the equivalent fuel cell lacking the one or more features.

In some embodiments, the one or more features increase the output voltage at the same hydrogen consumption rate by at least 20, 40, 60, 80, 100, 120, 140, 160, 180, or 200%.

In some embodiments, the one or more features increase the hydrogen consumption rate by at most 20, 40, 60, 80, 100, 120, 140, 160, 180, or 200%.

In some embodiments, the one or more features continuously purge nitrogen out of the fuel cell.

In some embodiments, the nitrogen is continuously directed out of the first channel by the one or more features so that nitrogen accumulation is reduced in the first channel, thereby increasing the hydrogen consumption rate compared to the equivalent fuel cell lacking the one or more features.

In some embodiments, the hydrogen consumption rate of the fuel cell when contacting the first continuous stream with the anode is at least about 10, 20, 30, 40, 50, 60, 70, 80, 90, or 99% of the hydrogen in the first continuous stream.

In some embodiments, the hydrogen consumption rate of the fuel cell when contacting the first continuous stream with the anode is at most about 10, 20, 30, 40, 50, 60, 70, 80, 90, or 99% of the hydrogen in the first continuous stream.

In some embodiments, the instructions executable by the controller are further configured to intermittently reduce the hydrogen consumption rate to purge out at least one of hydrogen, nitrogen, or water.

In some embodiments, the instructions executable by the controller are further configured to reduce the hydrogen consumption rate and direct at least a part of the first continuous stream to the ammonia reformer.

In some embodiments, the instructions executable by the controller are further configured to reduce the hydrogen consumption rate of the fuel cell to zero and direct at least a part of the first continuous stream to the ammonia reformer.

In some embodiments, the instructions executable by the controller are further configured to flare the at least the part of the first continuous stream directed to the ammonia reformer at one or more combustion exhausts of one or more combustion heaters, wherein the one or more combustion heaters are in operable communication with the ammonia reformer for heating the ammonia reformer, and wherein the one or more combustion heaters are in fluidic communication with the fuel to receive the at least the part of the first continuous stream.

In some aspects, the present disclosure provides a fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; wherein the fuel cell is configured to provide a ratio of an electrical power output of the fuel cell to a projected surface area of the anode that is at least about 0.05 W/cm2 when the first inlet is supplied with a first continuous stream comprising about 25% nitrogen and about 75% hydrogen by moles, and the second inlet is supplied with a second continuous stream comprising at least 20% oxygen by moles.

In some embodiments, the ratio is at least about 0.1, 0.15, 0.2, 0.25, 0.3, 0.35, or 0.4 W/cm2.

In some embodiments, the ratio is at most about 0.1, 0.15, 0.2, 0.25, 0.3, 0.35, or 0.4 W/cm2.

In some embodiments, the ratio is based on the first continuous stream comprising a hydrogen flow rate of at least about 0.001, 0.01, 0.1, 1, 10, 100, 1000, 10000, 100000 mole per second.

In some embodiments, the ratio is based on the second continuous stream comprising an oxygen flow rate of at least about 0.0001, 0.001, 0.01, 0.1, 1, 10, 100, 1000, 10000, 100000, 1000000 mole per second.

In some embodiments, the ratio is based on the second continuous stream comprising air.

In some embodiments, the ratio is based on the first continuous stream comprising the hydrogen and the nitrogen from the ammonia reformer.

In some embodiments, the projected surface area of the anode comprises the largest possible surface area of the anode projected onto a flat plane.

In some embodiments, the projected surface area of the anode comprises a surface area of the largest surface of the anode.

In some aspects, the present disclosure provides a fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features; and a second channel comprising a second inlet and a second outlet, wherein the second channel is in fluid communication with the cathode; wherein the fuel cell is in fluid communication with an ammonia reformer configured to provide nitrogen and hydrogen to the fuel cell; and wherein the fuel cell is configured to generate an electrical power at least 80% of a reference electrical power, wherein the reference electrical power is generated using the fuel cell receiving a continuous stream comprising at least 99% hydrogen by moles into the first inlet, wherein the electrical power is generated at a same current or a same hydrogen consumption rate as the reference electrical power.

In some embodiments, the electrical power is at least 60, 70, 80, 90, 91, 92, 93, 94, 95, 96, 97, 98, or 99% of the reference electrical power.

In some embodiments, the electrical power is at most 60, 70, 80, 90, 91, 92, 93, 94, 95, 96, 97, 98, or 99% of the reference electrical power.

In some aspects, the present disclosure provides a system comprising: an ammonia reformer; a fuel cell in fluid communication with the ammonia reformer, wherein the fuel cell comprises: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof, wherein the one or more features comprise a depth less than 10 mm; and a second channel comprising a second inlet and a second outlet, wherein the second channel is in fluid communication with the cathode; and a controller comprising at least one processor configured to perform executable instructions, wherein instructions executable by the controller are configured to: direct ammonia to the ammonia reformer to generate a first continuous stream comprising hydrogen and nitrogen; direct a second continuous stream comprising oxygen to the cathode of the fuel cell; and direct the first continuous stream to the anode of the fuel cell to react the hydrogen and oxygen to generate electricity.

In some embodiments, the one or more features comprises a depth less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

In some embodiments, the one or more features comprises a depth greater than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

In some embodiments, the depth is at least $1/32$, $1/16$, $1/8$, $1/4$, or $1/2$ of the thickness of the first channel.

In some embodiments, the depth is at most $1/32$, $1/16$, $1/8$, $1/4$, or $1/2$ of the thickness of the first channel.

In some embodiments, a ratio of a first projected surface area of the one or more features to a second projected surface area of the first channel is at least 0.1, 0.2, 0.3, 0.4, 0.5, 0.6, 0.7, 0.8, or 0.9.

In some embodiments, a ratio of a first projected surface area of the one or more features to a second projected surface area of the first channel is at most 0.1, 0.2, 0.3, 0.4, 0.5, 0.6, 0.7, 0.8, or 0.9.

In some embodiments, the ammonia reformer generates the first continuous stream additionally comprising at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of ammonia.

In some embodiments, the ammonia reformer generates the first continuous stream additionally comprising at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of ammonia.

In some embodiments, the one or more features comprises two or more features.

In some embodiments, at least a first segment of a first feature of the two or more features is substantially parallel to a second segment of a second feature of the two or more features.

In some embodiments, at least a first segment of a first feature of the two or more features is substantially perpendicular to a second segment of a second feature of the two or more features.

In some embodiments, at least a first segment of a first feature of the two or more features is at an angle to a second segment of a second feature of the two or more features, wherein the angle is between 0 and 90 degrees, between 15 and 75 degrees, between 0 and 30 degrees, or between 30 and 60 degrees.

In some embodiments, the two or more features are connected.

In some embodiments, the two or more features are disconnected.

In some embodiments, the two or more features intersect.

In some embodiments, the one or more features are fully enclosed by the first channel.

In some embodiments, the one or more features are partially enclosed by the first channel.

In some embodiments, the one or more features comprise a serpentine shape.

In some embodiments, the one or more features are substantially parallel with the longest side of the first channel.

In some embodiments, the one or more features are substantially parallel with the shortest side of the first channel.

In some embodiments, the fuel cell comprises a plurality of channels in fluid communication with the anode, wherein the plurality of channels comprises the first channel.

In some embodiments, the plurality of channels comprises a stack of layers that are adjacent to one another.

In some embodiments, at least one channel in the plurality of channels does not comprise or lacks the one or more features comprising (i) one or more cuts, (ii) one or more cutouts, (iii) one or more grooves, or (iv) any combination thereof.

In some embodiments, the one or more features are further configured to facilitate purging of a select material from the anode gas diffusion layer, wherein the select material comprises one or more of nitrogen, ammonia, water, or one or more impurities.

In some embodiments, the fuel cell further comprises one or more exit ports for discharging the select material and unconverted hydrogen from the fuel cell.

In some embodiments, the first channel comprises a felt, a foam, a cloth, or a paper material.

In some embodiments, the felt, the foam, the cloth, or the paper material is a carbon-based material.

In some embodiments, the one or more features extend across at least a portion of the surface of the first channel.

In some embodiments, the electrolyte comprises a proton-exchange membrane.

In some embodiments, the fuel cell is configured to allow purging of nitrogen from the fuel cell while the fuel cell is generating electricity.

In some embodiments, the first channel is supplied with a stream comprising a concentration of ammonia of at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

In some embodiments, the first channel is supplied with a stream comprising a concentration of ammonia of at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

In some embodiments, the one or more features increase a power density of the fuel cell by at least 5, 10, 20, 40, 60, 80, 100, 120, 140, 160, 180, or 200%.

In some embodiments, a power density of the fuel cell is at least about 0.1, 0.5, 1, 2, 3, 4, 5, 6, 7, 8, 9, 10, 20, or 30 kW/L.

In some embodiments, a power density of the fuel cell is at most about 0.1, 0.5, 1, 2, 3, 4, 5, 6, 7, 8, 9, 10, 20, or 30 kW/L.

In some embodiments, the system or the fuel cell further comprises one or more combustion heaters for combusting an exit stream output by the fuel cell to heat the ammonia reformer, wherein the exit stream comprises unconverted hydrogen.

In some embodiments, the system or the fuel cell further comprises one or more air supply units for providing at least oxygen to the one or more combustion heaters.

In some embodiments, the system or the fuel cell further comprises one or more dehydrators for removing water in the exit stream in prior to combusting the unconverted hydrogen.

In some embodiments, the system is configured to flare the unconverted hydrogen at a combustion exhaust of the one or more combustion heaters.

In some embodiments, the system or the fuel cell further comprises g one or more flow regulators, pressure regulators, control units, or any combination thereof for modulating an absolute pressure of an input stream or an output stream of the fuel cell.

In some embodiments, the one or more flow regulators, pressure regulators, control units, or any combination thereof are positioned upstream or downstream of the fuel cell.

In some embodiments, the one or more flow regulators, pressure regulators, control units, or any combination thereof are positioned downstream of the fuel cell to reduce or prevent a back flow of the unconverted hydrogen.

In some embodiments, the system or the fuel cell further comprises an electrical load connected to the electrochemical circuit.

In some embodiments, the electrical load comprises one or more electric devices.

In some embodiments, the electrical load comprises one or more electrical grids.

In some embodiments, the electrical load comprises an engine or a motor.

In some embodiments, the fuel cell comprises a plurality of fuel cells in operable communication with the ammonia reformer, the ammonia reformer configured to provide a plurality of streams comprising hydrogen and nitrogen to the plurality of the fuel cells.

In some embodiments, the system is configured to direct unconverted hydrogen from the plurality of fuel cells to one or more combustors in thermal communication with the ammonia reformer.

In some embodiments, at least one fuel cell of the plurality of fuel cells comprises a different electrical power output than other fuel cells of the plurality of fuel cells.

In some embodiments, at least one fuel cell of the plurality of fuel cells is configured to reduce an electrical power output.

In some embodiments, one or more ammonia reformers in fluid communication with the plurality of fuel cells provide to at least one fuel cell of the plurality of the fuel cells a stream that comprises a flow rate that is different from the flow rate of another stream provided to another fuel cell.

In some embodiments, one or more ammonia reformers in fluid communication with the plurality of fuel cells are configured to provide a plurality of streams to the plurality of fuel cells, wherein the flow rates of the plurality of streams is about the same as or within a selected tolerance of other flow rates of others of the plurality of streams.

In some embodiments, the selected tolerance is about 10, 20, 30, 40, 50, 60, 70, 80, 90, or 100%.

In some embodiments, the plurality of fuel cells comprises at least one fuel cell that is different in size, power output, hydrogen consumption rate, power density, or operating temperature from the other fuel cells.

In some aspects, the present disclosure provides a fuel cell, comprising: an anode; a cathode; and a membrane between the anode and the cathode, wherein the anode comprises an anode gas diffusion layer with one or more channels for directing a source material comprising hydrogen and nitrogen to the anode for processing of the source material to generate an electrical current, wherein the one or more channels comprise one or more features comprising (i) one or more cuts, (ii) one or more cutouts, or (iii) one or more grooves configured to enhance diffusion and transport of the source material through the anode gas diffusion layer, and wherein the one or more features are configured to direct a flow of nitrogen from the anode gas diffusion layer to out of the fuel cell so that nitrogen does not accumulate in the anode gas diffusion layer.

In some embodiments, the one or more features comprise two or more features.

In some embodiments, the one or more features are further configured to facilitate purging of a select material from the anode gas diffusion layer, wherein the select material comprises one or more of nitrogen, ammonia, water, or one or more impurities.

In some embodiments, the fuel cell further comprises one or more exit ports for discharging the select material and unconverted hydrogen from the fuel cell.

In some embodiments, the processing of the source material comprises a dissociation of one or more hydrogen molecules of the source material into one or more protons and one or more electrons.

In some embodiments, the anode gas diffusion layer comprises a felt, a foam, a cloth, or a paper material.

In some embodiments, the felt, the foam, the cloth, or the paper material is a carbon-based material.

In some embodiments, the one or more features extend across at least a portion of the surface of the one or more channels.

In some embodiments, the two or more features are parallel to each other.

In some embodiments, the two or more features are perpendicular to each other.

In some embodiments, the two or more features are disposed at an angle relative to each other, wherein the angle ranges from 0 degrees to 90 degrees.

In some embodiments, the two or more features intersect with each other.

In some embodiments, the two or more features do not intersect.

In some embodiments, the anode gas diffusion layer comprises a plurality of layers.

In some embodiments, at least one layer of the plurality of layers comprises the one or more channels comprising the one or more features.

In some embodiments, the plurality of layers comprises a first layer comprising a first set of features and a second layer comprising a second set of features.

In some embodiments, the first set of features and the second set of features comprise a same or similar set of features.

In some embodiments, the first set of features and the second set of features comprise different sets of features having different shapes, dimensions, positions, or orientations.

In some embodiments, the first set of features and the second set of features overlap or partially overlap.

In some embodiments, the first set of features and the second set of features do not overlap.

In some embodiments, at least one feature of the one or more features has a depth ranging from about 0.01 millimeter (mm) to about 10 mm.

In some aspects, the present disclosure provides a fuel cell system, comprising: a plurality of fuel cells comprising a fuel cell disclosed herein, at least one ammonia reformer or reactor in fluid communication with the plurality of fuel cells, wherein the at least one ammonia reformer or reactor is configured to (i) generate the source material and (ii) provide the source material to the fuel cell.

In some embodiments, the plurality of fuel cells are arranged (i) adjacent to each other in a lateral configuration or (ii) on top of each other in a stacked configuration.

In some embodiments, the plurality of fuel cells comprises at least one proton-exchange membrane fuel cell (PEMFC).

In some aspects, the present disclosure provides a fuel cell system comprising a fuel cell disclosed herein, wherein the fuel cell system comprises a controller configured to operate the fuel cell to allow purging of nitrogen from the fuel cell while the fuel cell is generating electricity.

In some embodiments, the fuel cell system further comprises a controller configured to operate the fuel cell to allow purging of nitrogen from the fuel cell while the fuel cell is generating electricity.

In some embodiments, at least one feature of the one or more features has a depth ranging from about 0.01 millimeter (mm) to about 10 mm.

In some embodiments, the fuel cell system further comprises one or more inlet ports configured to receive the source material, wherein ammonia concentration in the source material is less than 1 ppm.

In some embodiments, the fuel cell system further comprises one or more exit ports configured to direct unconverted hydrogen from the plurality of fuel cells to the at least one ammonia reformer or reactor, wherein the unconverted hydrogen is combusted to heat the ammonia reformer or reactor.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

The term "at least one of A and B" and "at least one of A or B" may be understood to mean only A, only B, or both A and B. The term "A and/or B" may be understood to mean only A, only B, or both A and B.

Fuel Cell

Figure 1:
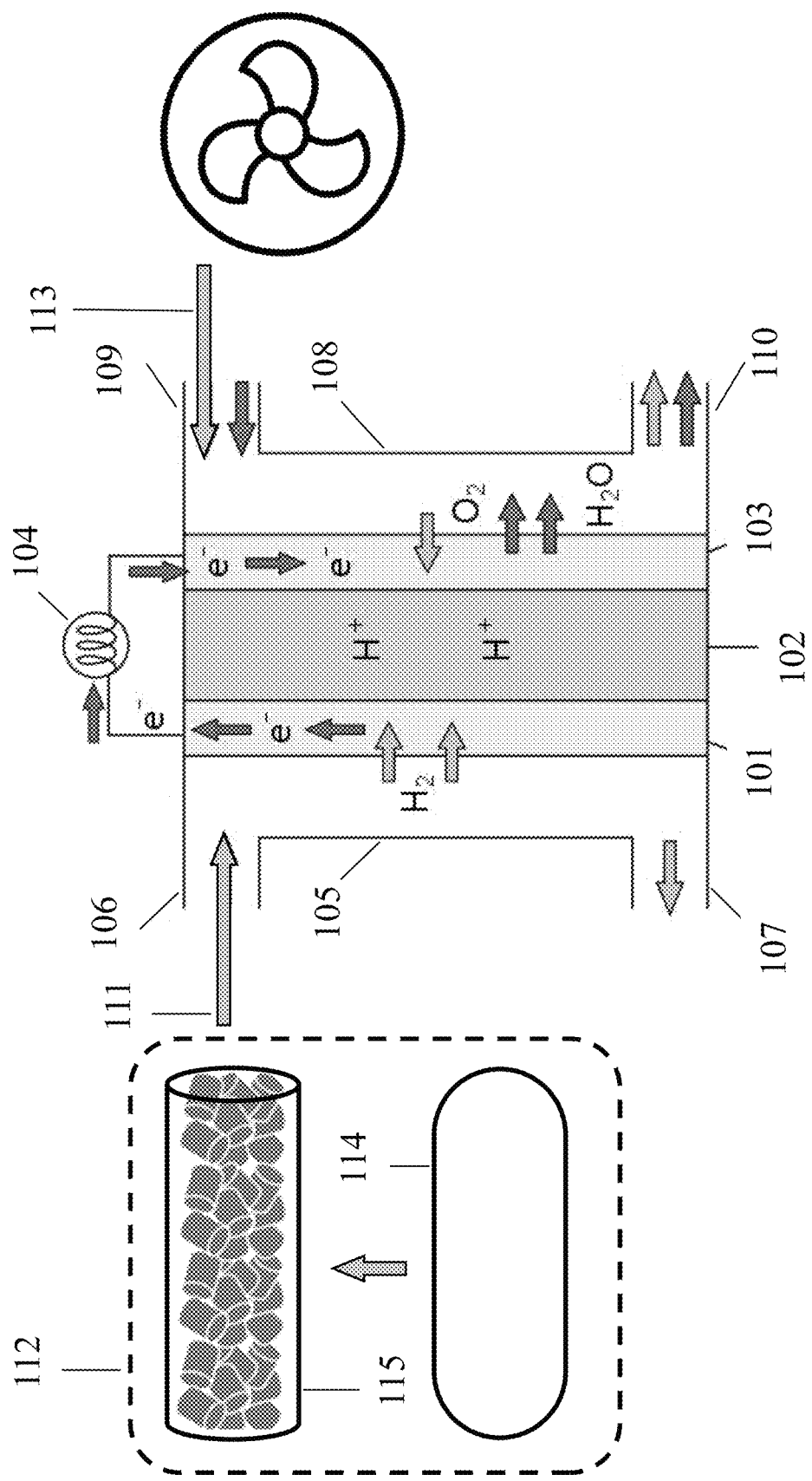
FIG. 1 schematically illustrates a fuel cell system, in accordance with some embodiments.

In an aspect, the present disclosure provides one or more fuel cells for processing a source material. FIG. 1 schematically illustrates a fuel cell, in accordance with some embodiments. A fuel cell can comprise an electrochemical circuit comprising an anode (101), a cathode (103), and an electrolyte (102) between the anode and the cathode. The electrochemical circuit can comprise an electrical load (104) configured to receive electrical energy generated by the fuel cell. The fuel cell can comprise a first channel (105; "the anode channel") comprising a first inlet (106) and a first outlet (107), wherein the first channel is in fluid communication with the anode. The anode channel can comprise a gas diffusion layer (GDL) for the anode, which can be referred to as the anode diffusion layer. The fuel cell can comprise a second channel (108; "the cathode channel") comprising a second inlet (109) and a second outlet (110), wherein the second channel is in fluid communication with the cathode. The cathode channel can comprise a GDL for the cathode, which can be referred to as the cathode diffusion layer.

The source material (111) can comprise hydrogen. The source material can be provided to the first inlet (106), such that the source material contacts the anode. The source material may diffuse to the anode catalyst where it dissociates into protons and electrons. Using the anode, the fuel cell can carry out a first half reaction comprising $H_2 \rightarrow 2H^+ + 2e^-$. The protons ($H^+$) may be conducted through the electrolyte to the cathode, while the electrons (e) are directed to travel along an external circuit through the electrical load to the cathode. A stream comprising oxidizing material (113; e.g., oxygen) can be provided to the second inlet (109), such that the stream contacts the cathode. Using the cathode, the fuel cell can carry out a second half reaction comprising $2H^+ + 2e^- + \frac{1}{2}O_2 \rightarrow H_2O$. Oxygen can react with the protons and the electrons (both of which have traveled from the anode through the electrolyte and the external circuit, respectively) to form a byproduct (e.g., water). As a whole, the fuel cell can carry out an electrochemical reaction comprising $2H_2 + O_2 \rightarrow 2H_2O$. The standard potential of the electrochemical reaction is about 1.23 Volts. The output voltage of the fuel cell can be lower than the standard potential, due to electrical potential losses during operation of the fuel cell (e.g., due to kinetic losses, Ohmic losses, and/or mass transfer losses).

The source material (111) can be processed by the one or more fuel cells to generate energy (e.g., electrical energy). In some embodiments, the source material may be provided or be received from one or more components or subcomponents of an ammonia reforming system (112; e.g., a system for cracking or decomposing ammonia into hydrogen and nitrogen). The source material from the ammonia reforming system can comprise, for example, a storage (114) for storing fuel (e.g., hydrogen, nitrogen, and/or ammonia) and optionally a reactor (115) for reacting the fuel to generate hydrogen and nitrogen (e.g., in a volume ratio of $H_2$ to $N_2$ of about 3:1).

Figures 2A, 2B:
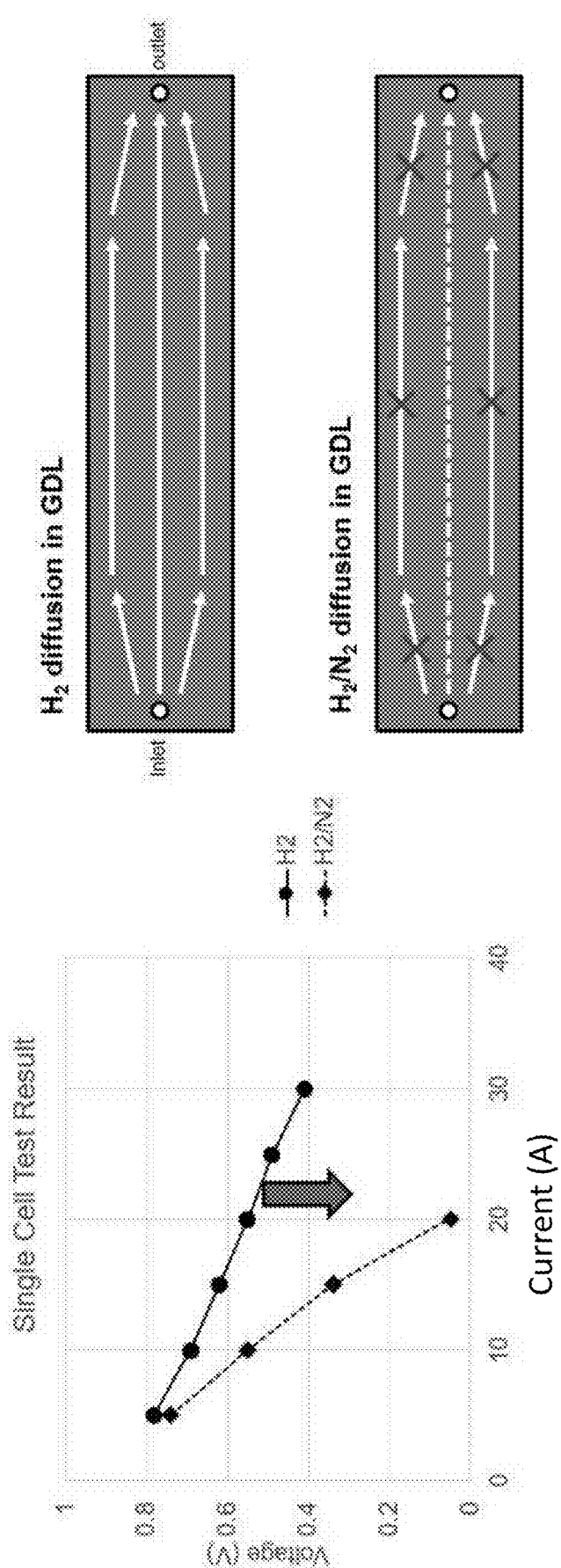
FIGS. 2A-2B schematically illustrate $H_2/N_2$ diffusion in a gas diffusion layer of a conventional fuel cell.

In some cases, processing a source material comprising hydrogen and nitrogen can reduce the electrical power of a fuel cell, compared to processing high purity hydrogen (e.g., greater than 99% purity). FIG. 2A shows the current-voltage characteristic plot of a fuel cell when the fuel cell is processing a source material comprising high purity hydrogen (e.g., about 99.999% purity hydrogen by volume) versus a source material comprising a mixture of about 75% hydrogen and about 25% nitrogen. The fuel cell receiving the mixture of hydrogen and nitrogen showed significantly lower electrical energy generation. FIG. 2B schematically illustrates $H_2$ versus $H_2/N_2$ diffusion and transport in a GDL of an example fuel cell. In cases where the GDL is used for diffusion and transport of a source material comprising mostly hydrogen, the hydrogen can flow from an inlet of the GDL to an outlet of the GDL. As the hydrogen flows through the GDL, it may also diffuse to the proton-exchange membrane (PEM) where the dissociation or transfer of ions takes place. Without being bound to a particular theory, in cases where the GDL is used for transport of a source material comprising both hydrogen and nitrogen (e.g., a hydrogen/nitrogen mixture), the transport of hydrogen to the PEM may be restricted, in part due to the buildup or accumulation of nitrogen in the GDL (the nitrogen may dilute the stream). This accumulation can lead to greater electrical potential losses associated with mass transfer of the hydrogen in the GDL. In some cases, this accumulation can lead to non-uniform dispersion of hydrogen through the GDL (e.g., some portions of the GDL may receive less hydrogen compared to other portions of the GDL). In some cases, this accumulation can lead to non-uniform dispersion of hydrogen to the anode (e.g., some portion of the anode may receive less hydrogen compared to other portions of the anode). In some cases, this accumulation can lead to insufficient hydrogen ion transport through the PEM. This accumulation can lead to reduced fuel cell performance and/or fuel cell starvation.

In some embodiments, an anode channel can comprise one or more features configured to improve processing a source material comprising hydrogen and nitrogen by the fuel cell. In some embodiments, the one or more features can comprise one or more cuts, one or more cutouts, and/or one or more grooves. The one or more features can be configured to continuously purge nitrogen out of the fuel cell. Reducing the nitrogen accumulation in at least part of the anode can increase a hydrogen consumption rate of the fuel cell, increase an output voltage of the fuel cell, or both. In some cases, reducing the nitrogen accumulation in at least a part adjacent to the anode can increase a hydrogen consumption rate of the fuel cell, increase an output voltage of the fuel cell, or both. The one or more features can be configured to purge nitrogen from the fuel cell while the fuel cell is generating electricity. The anode channel comprising the one or more features can comprise a GDL comprising the one or more features.

Figure 3:
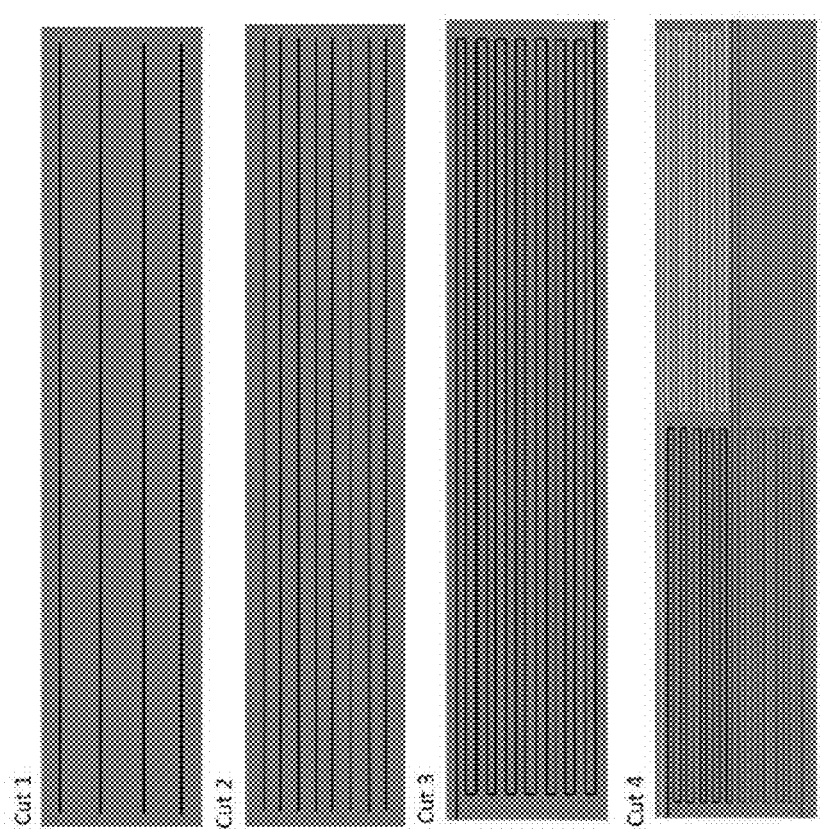
FIG. 3 schematically illustrates performance improvements for anode channels comprising one or more cuts, in accordance with some embodiments.
Figure 3:
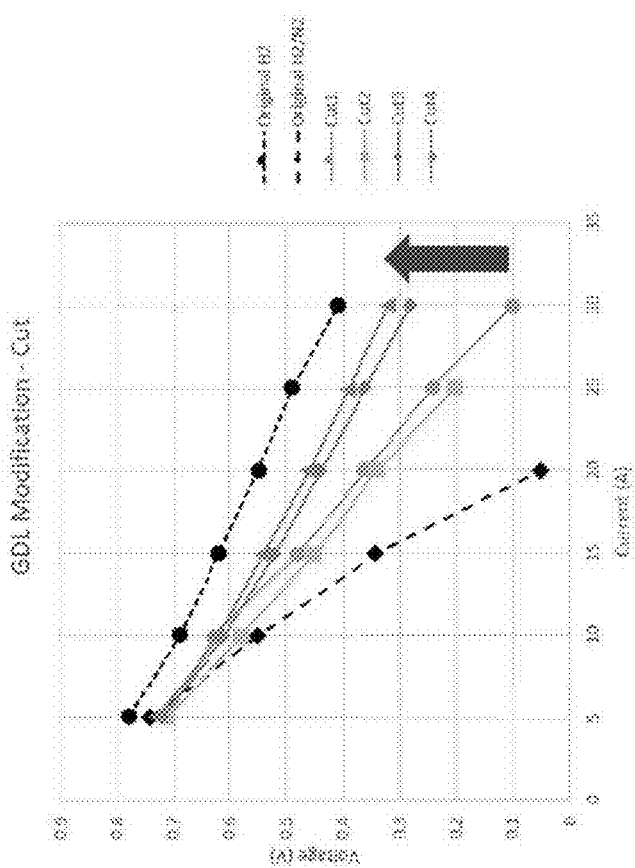

FIG. 3 schematically illustrates performance improvements for anode channels comprising one or more cuts. In instances where a mixture of hydrogen and nitrogen (e.g., about 3:1 volume ratio) is provided to a fuel cell for processing to generate electrical energy, the output voltage of a fuel cell comprising one or more cut configurations in the anode channel may be significantly greater than that of a fuel cell without any cuts in the anode channels. In some cases, a fuel cell comprising a higher density of cuts on the surface of the anode channel may exhibit better performance (e.g., a higher output voltage when processing a hydrogen/nitrogen mixture to generate electrical energy) compared to a fuel cell with a lower density of cuts on the surface of the anode channel.

Figure 4:
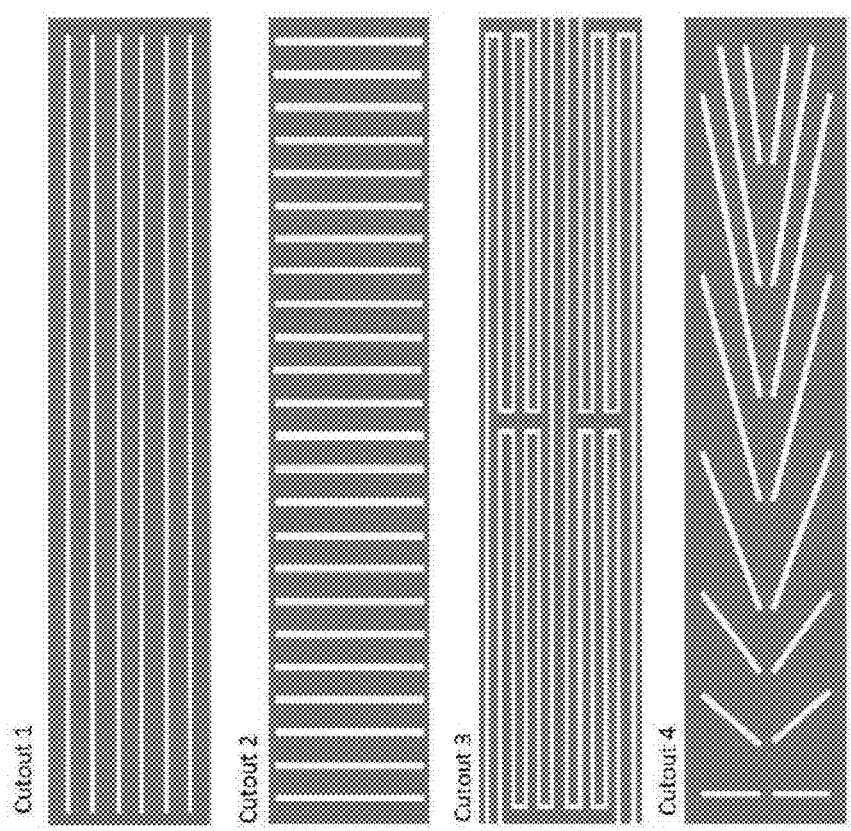
FIG. 4 schematically illustrates performance improvements for anode channels comprising one or more cutouts, in accordance with some embodiments.
Figure 4:
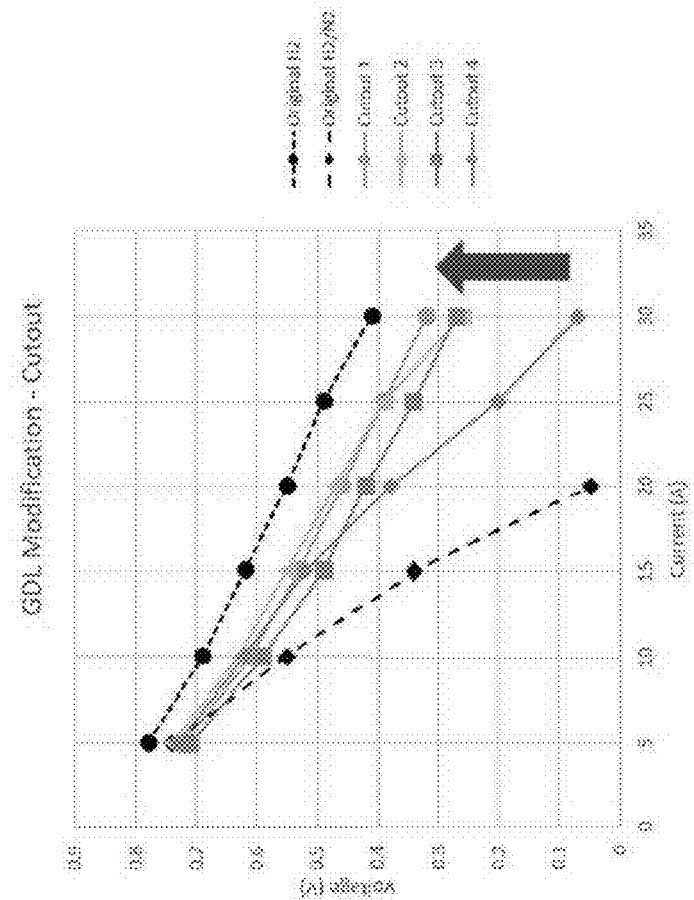

FIG. 4 schematically illustrates performance improvements for anode channels comprising one or more cutouts. In instances where a mixture of hydrogen and nitrogen (about 3:1 volume ratio) is provided to a fuel cell for processing to generate electrical energy, the output voltage of a fuel cell comprising one or more cutout configurations in the anode channel may be significantly greater than that of a fuel cell without any cutouts in the anode channels. In some cases, a fuel cell comprising a higher density of cutouts on the surface of the anode channel may exhibit better performance (e.g., a higher output voltage when processing a hydrogen/nitrogen mixture to generate electrical energy) compared to a fuel cell with a lower density of cutouts on the surface of the anode channel. In some cases, a fuel cell comprising a density of cutouts on the surface of the anode channel that is too high may reduce the performance compared to a fuel cell with a lower density of cutouts on the surface of the anode channel.

Figure 5:
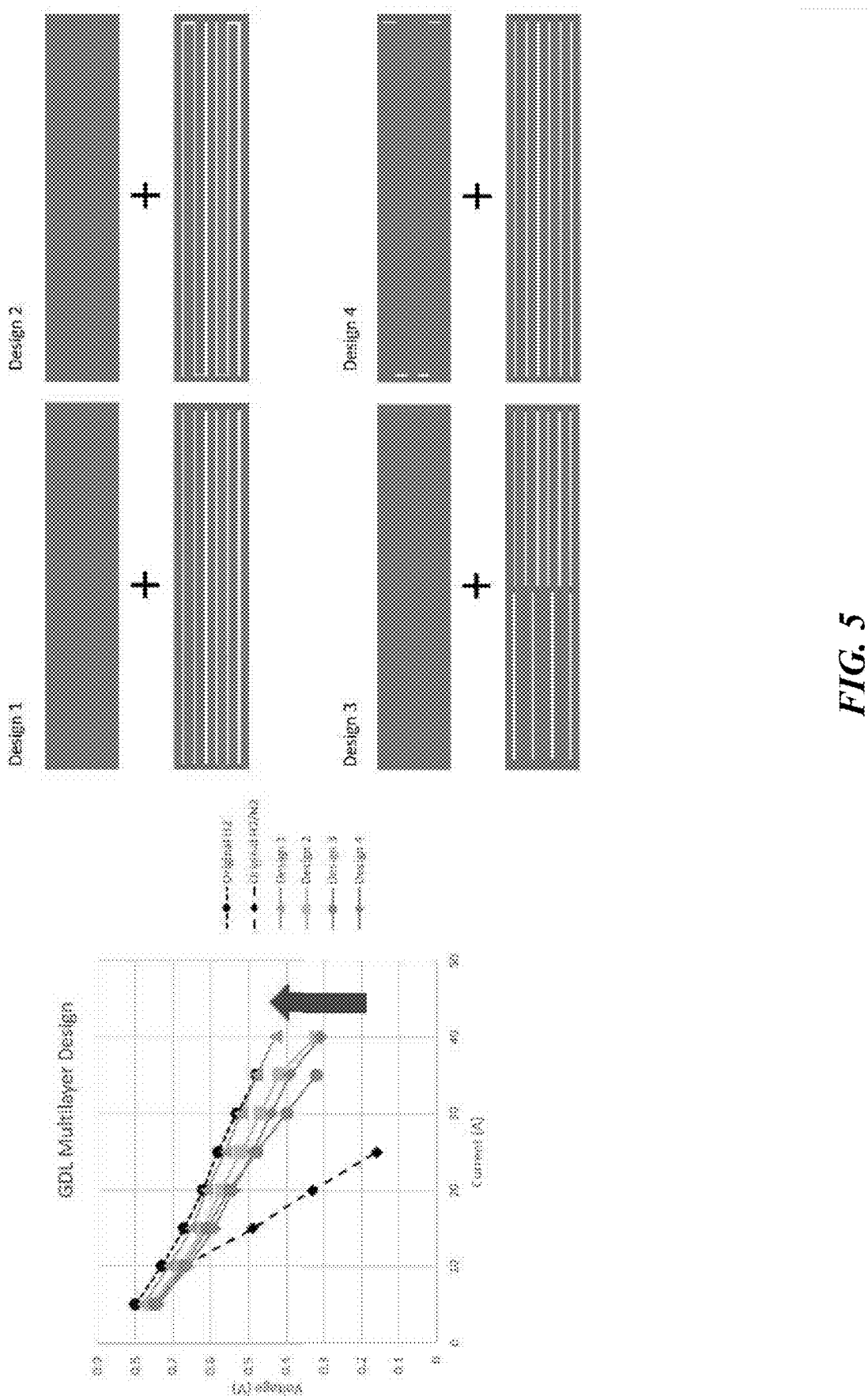
FIG. 5 schematically illustrates performance improvements for anode channels comprising various multilayer designs, in accordance with some embodiments.

FIG. 5 schematically illustrates performance improvements for anode channels comprising various multilayer anode channel designs. The multilayer anode channel designs can comprise a plurality of layers comprising one or more cuts, cutouts, grooves, or any combination thereof. In instances where a mixture of hydrogen and nitrogen is provided to a fuel cell for processing to generate electrical energy, the output voltage of a fuel cell comprising a multilayer anode channel design may be significantly greater than that of a fuel cell without a multilayer anode channel design.

As shown in FIG. 3, FIG. 4, and FIG. 5, the one or more features of the anode channels can allow generation electrical power that is at least 50% of a reference electrical power, wherein the reference electrical power is generated using the fuel cell receiving a stream comprising at least 99% hydrogen by moles into the first inlet. For instance, the "Cut 2" design shown in FIG. 3 exhibits about 60% of voltage of the reference electrical power at a current of about 20 Amps. Some designs show nearly 100% of the voltage of the reference electrical power, e.g., "Design 1" shown in FIG. 5. The electrical power and the reference electrical power of the fuel cell can be generated at a same current or a same hydrogen consumption rate. In some cases, the electrical power is at least 60, 70, 80, 90, 91, 92, 93, 94, 95, 96, 97, 98, or 99% of the reference electrical power. In some cases, the electrical power is at most 60, 70, 80, 90, 91, 92, 93, 94, 95, 96, 97, 98, or 99% of the reference electrical power.

The one or more features can increase the hydrogen consumption rate of the fuel cell. The increase in the hydrogen consumption rate of the fuel cell may be in comparison to an equivalent fuel cell without the one or more features. In some cases, the one or more features increase the hydrogen consumption rate by at least 5, 10, 20, 40, 60, 80, 100, 120, 140, 160, 180, or 200%. In some cases, the one or more features increase the hydrogen consumption rate by at most 5, 10, 20, 40, 60, 80, 100, 120, 140, 160, 180, or 200%. In some cases, the hydrogen consumption rate can be at least about 10, 20, 30, 40, 50, 60, 70, 80, 90, or 99% of the hydrogen provided to the fuel cell. In some cases, the hydrogen consumption rate can be at most about 10, 20, 30, 40, 50, 60, 70, 80, 90, or 99% of the hydrogen provided to the fuel cell.

In some cases, the hydrogen consumption rate of the fuel cell can be adjusted to maintain an autothermal reforming process of the ammonia reformer. An autothermal reforming process may be construed as a process in which the ammonia reforming process of the ammonia reformer generates a net positive production of hydrogen by combusting or consuming at least part of the hydrogen produced by the ammonia reformer. In some cases, an autothermal reforming process of the ammonia reformer is maintained by combusting at least part of hydrogen provided to the fuel cell that is not consumed by the fuel cell (e.g., unconverted hydrogen). For example, the unconverted hydrogen may be directed to one or more combustion heaters of the ammonia reformer, and combusted in the one or more combustion heaters to heat the ammonia reformer. In some cases, an autothermal reforming process of the ammonia reformer is maintained by combusting at least part of hydrogen provided to the fuel cell that is not consumed by the fuel cell, and additionally by electrical heating provided by at least part of the electricity generated from the fuel cell. In some cases, an autothermal reforming process of the ammonia reformer is maintained by combusting at least part of the hydrogen produced by the ammonia reformer, and additionally by electrical heating provided by at least part of the electricity generated from the fuel cell.

The hydrogen consumption rate may be adjusted by modulating a load power of the fuel cell (e.g., the power required by a device in electrical communication with the fuel cell). In some cases, the hydrogen consumption rate of the fuel cell is about 20% to 40% of the hydrogen provided to the fuel cell to maintain the autothermal reforming process of the ammonia reformer. In some cases, the hydrogen consumption rate is about 30% to 50% of the hydrogen provided to the fuel cell to maintain the autothermal reforming process of the ammonia reformer. In some cases, the hydrogen consumption rate is about 40% to 60% of the hydrogen provided to the fuel cell to maintain the autothermal reforming process of the ammonia reformer. In some cases, the hydrogen consumption rate is about 50% to 70% of the hydrogen provided to the fuel cell to maintain the autothermal reforming process of the ammonia reformer. In some cases, the hydrogen consumption rate is about 60% to 80% of the hydrogen provided to the fuel cell to maintain the autothermal reforming process of the ammonia reformer. In some cases, the hydrogen consumption rate is about 70% to 90% of the hydrogen provided to the fuel cell to maintain the autothermal reforming process of the ammonia reformer. In some cases, the hydrogen consumption rate is about 55% to 75% of the hydrogen provided to the fuel cell to maintain the autothermal reforming process of the ammonia reformer. In some cases, the hydrogen consumption rate is at least about 20, 30, 40, 50, 60, 70, 80, or 90% to maintain the autothermal reforming process of the ammonia reformer. In some cases, the hydrogen consumption rate is at most about 20, 30, 40, 50, 60, 70, 80, or 90% to maintain the autothermal reforming process of the ammonia reformer.

In some cases, the hydrogen consumption rate is maintained within a selected tolerance of a target hydrogen consumption rate to maintain the autothermal reforming process of the ammonia reformer. For example, for a target hydrogen consumption rate of 50% with a selected tolerance of 10%, the hydrogen consumption rate may be maintained in the range of from 45% to 55%. In some cases, the selected tolerance of a target hydrogen consumption rate is at least about 1%, 5%, 10%, 15%, 20%, 30%, 40%, 50%, 60%, 70%, 80%, 90%, or 100% of the target consumption rate. In some cases, the selected tolerance of a target hydrogen consumption rate is at most about 1%, 5%, 10%, 15%, 20%, 30%, 40%, 50%, 60%, 70%, 80%, 90%, or 100% of the target consumption rate. In some cases, the hydrogen consumption rate is adjusted at least in part based on the temperature of the ammonia reformer. In some cases, the hydrogen consumption rate is reduced when the temperature of the one or more combustion heaters of the ammonia reformer or the ammonia reformer starts to decrease, so that more hydrogen is provided to the one or more combustion heaters. In some cases, the hydrogen consumption rate is increased when the temperature of the one or more combustion heaters of the ammonia reformer or the ammonia reformer starts to increase, so that less hydrogen is provided to the one or more combustion heaters.

In some cases, the hydrogen consumption rate of the fuel cell is maintained within the selected tolerance of a target hydrogen consumption rate and one or more air flow rates comprising at least oxygen provided by one or more air supply units is adjusted to maintain the auto-thermal reforming process of the ammonia reformer. In some cases, the one or more air flow rates are reduced when the temperature of the one or more combustion heaters of the ammonia reformer, or the temperature of the ammonia reformer, starts to increase (so that less oxygen is provided to the one or more combustion heaters). In some cases, the one or more air flow rates are increased when the temperature of the one or more combustion heaters of the ammonia reformer or the ammonia reformer starts to decrease (so that more oxygen is provided to the one or more combustion heaters).

In some cases, both the hydrogen consumption rate of the fuel cell and the one or more air flow rates are adjusted simultaneously based at least in part on the temperature of the one or more combustion heaters of the ammonia reformer and/or the temperature of the ammonia reformer.

The one or more features may increase the output voltage of the fuel cell. The increase in the output voltage of the fuel cell may be in comparison to an equivalent fuel cell without the one or more features. In some cases, the one or more features increase the output voltage by at least 5, 10, 20, 40, 60, 80, 100, 120, 140, 160, 180, or 200%. In some cases, the one or more features increase the output voltage by at most 5, 10, 20, 40, 60, 80, 100, 120, 140, 160, 180, or 200%.

The one or more features may increase a power density of the fuel cell. The increase in the power density of the fuel cell may be in comparison to an equivalent fuel cell without the one or more features. In some cases, the one or more features may increase the power density by at least 5, 10, 20, 40, 60, 80, 100, 120, 140, 160, 180, or 200%. In some cases, the one or more features may increase the power density by at most 5, 10, 20, 40, 60, 80, 100, 120, 140, 160, 180, or 200%. The power density of the fuel cell can be at least about 0.1, 0.5, 1, 2, 3, 4, 5, 6, 7, 8, 9, 10, 20, or 30 kW/L (i.e., a ratio of an electrical power output to a volume of one or more fuel cells or one or more fuel cell stacks). The power density of the fuel cell can be at most about 0.1, 0.5, 1, 2, 3, 4, 5, 6, 7, 8, 9, 10, 20, or 30 kW/L.

The one or more features may reduce a physical footprint (e.g., size/volume, weight, etc.) of a fuel cell. The reduced footprint may enable the fuel cell to be integrated into applications where a lighter weight and/or smaller volume is desirable (e.g., aerial vehicles), or into applications where the size is limited and power requirements are high (e.g., some industrial vehicles). In some embodiments, the fuel cell comprising the one or more features can be configured to provide a ratio of an electrical power output of the fuel cell to a projected surface area of the anode that is at least about 0.05 W/cm$^2$. In some embodiments, the ratio can be at least about 0.1, 0.15, 0.2, 0.25, 0.3, 0.35, or 0.4 W/cm$^2$. In some embodiments, the ratio can be at most about 0.1, 0.15, 0.2, 0.25, 0.3, 0.35, or 0.4 W/cm$^2$. The ratio may be based on the anode channel receiving a first continuous stream comprising about 25% nitrogen and about 75% hydrogen by moles, and the cathode channel receiving a second continuous stream comprising at least 20% oxygen by moles (e.g., air). In some cases, the ratio can be based on the first continuous stream comprising a hydrogen flow rate of at least about 0.001, 0.01, 0.1, 1, 10, 100, 1000, 10000, or 100000 mole per second. In some cases, the ratio can be based on the second continuous stream comprising an oxygen flow rate of at least about 0.0001, 0.001, 0.01, 0.1, 1, 10, 100, 1000, 10000, 100000, 1000000 mole per second. In some cases, the ratio can be based on the first continuous stream comprising hydrogen and nitrogen from the ammonia reformer. The projected surface area may be construed as the largest possible surface area of the anode projected onto a flat plane. The projected surface area can be a surface area of the largest surface of the anode. The largest surface can be defined at the largest flat surface of the anode.

Figure 6:
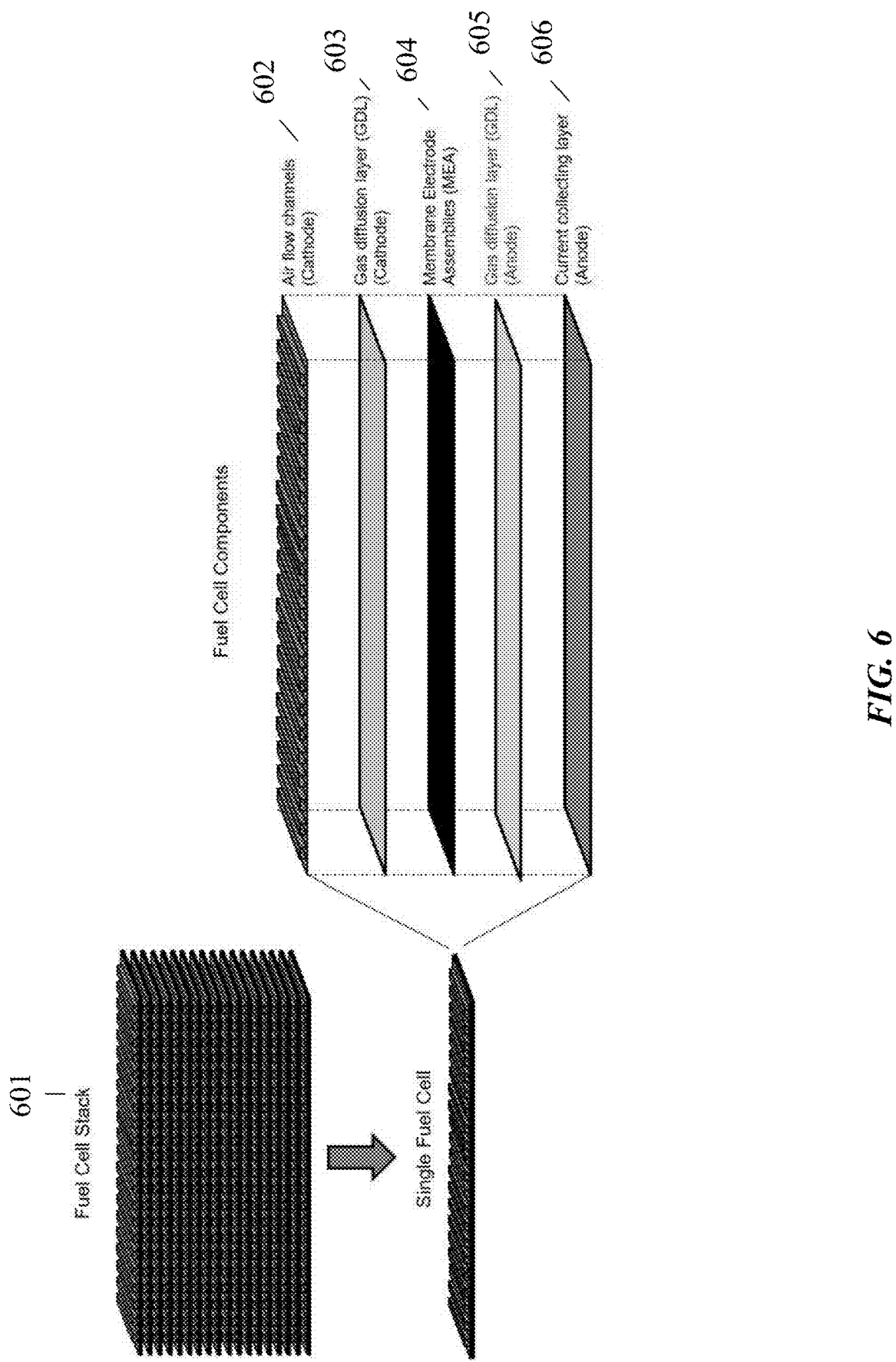
FIG. 6 schematically illustrates a stack of fuel cells comprising a plurality of fuel cells, in accordance with some embodiments.

FIG. 6 schematically illustrates a stack or module of fuel cells (601) comprising a plurality of fuel cells, in accordance with some embodiments. Each fuel cell of the plurality of fuel cells may comprise one or more components. The one or more components may comprise one or more channels for a cathode (e.g., for flowing air), a current collecting layer for the cathode, and a gas diffusion layer (603; GDL) for the cathode. In some embodiments, the one or more components may further comprise a gas diffusion layer (605; GDL) for an anode and a current collecting layer for the anode (606). In some cases, the one or more components may further comprise an electrolyte (604) disposed between the GDL (603) of the cathode and the GDL (605) of the anode. The plurality of fuel cells can be adjacently coupled with one another.

The fuel cell design may be adapted for use in one or more fuel cell stacks or modules comprising one or more fuel cells. The fuel cell module may comprise a stack of fuel cells or multiple stacks of fuel cells. The fuel cells may be arranged in a lateral configuration or a circular configuration. The fuel cells in the fuel cell stack may be arranged on top of each other and/or next to each other. Each of the fuel cells may comprise one or more inlets for receiving a source material. The fuel cell stack or the one or more fuel cells of the fuel cell stack may be in fluid communication with the ammonia reformer or reactor in order to receive the source materials to generate electricity. The fuel cells may be coupled in sequence or in parallel. In some cases, the one or more fuel cell stacks or modules may be in series or in parallel fluid communication with each other. The fuel cells may be configured to process the source material to generate electrical energy. The fuel cells stack or module (e.g., 601) can comprise any number of fuel cells. For instance, the fuel cells can comprise at least 2, 3, 4, 5, 6, 7, 8, 9, 10, 100, 200, 300, 400, 500, 600, 700, 800, 900, 1000, 2000, 3000, 4000, 5000, 6000, 7000, 8000, 9000, 10,000 fuel cells. The fuel cells can comprise at most 2, 3, 4, 5, 6, 7, 8, 9, 10, 100, 200, 300, 400, 500, 600, 700, 800, 900, 1000, 2000, 3000, 4000, 5000, 6000, 7000, 8000, 9000, 10,000 fuel cells.

Figure 7:
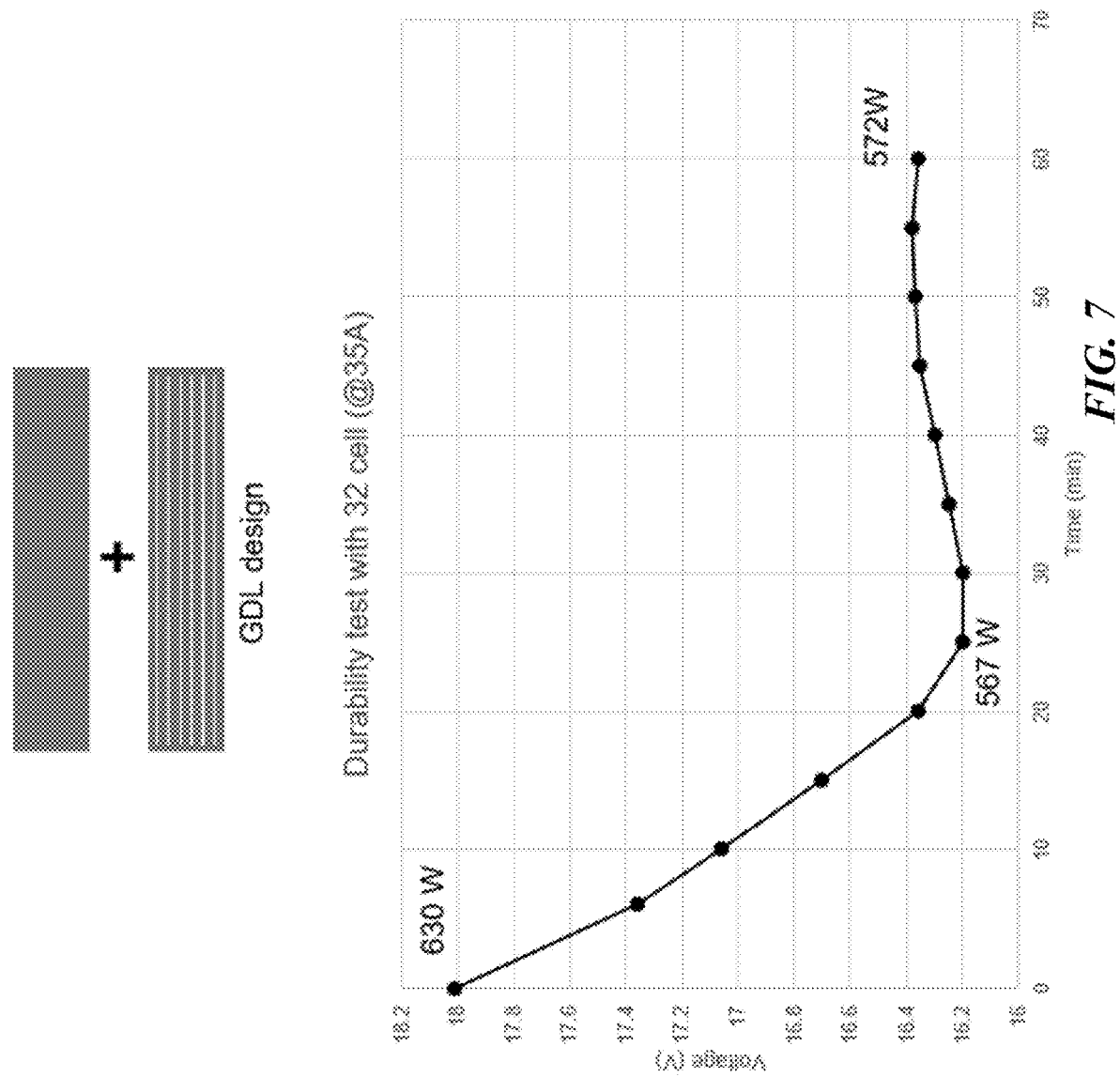
FIG. 7 schematically illustrates durability testing results for a stack of fuel cells with a multi-layer gas diffusion layer design when nitrogen is present in a hydrogen gas mixture (3:1 hydrogen and nitrogen volume ratio), in accordance with some embodiments.

FIG. 7 schematically illustrates durability testing results for a stack of fuel cells with a multi-layer gas diffusion layer design provided with a mixture of hydrogen and nitrogen, in accordance with some embodiments. The durability testing was conducted using a fuel cell stack comprising 32 fuel cells and a gas diffusion layer comprising a double layer design. A gaseous mixture of hydrogen and nitrogen (comprising a hydrogen to nitrogen volume ratio of 3:1) was provided to the fuel cell stack for a one-hour endurance test. The gaseous hydrogen was provided at a volumetric flow rate of 15 standard liters per minute and the gaseous nitrogen was provided at a volumetric flow rate of 5 standard liters per minute. As shown in the plot in FIG. 7, the power output of the fuel cell stack stabilized at about 572 Watts.

Figure 8:
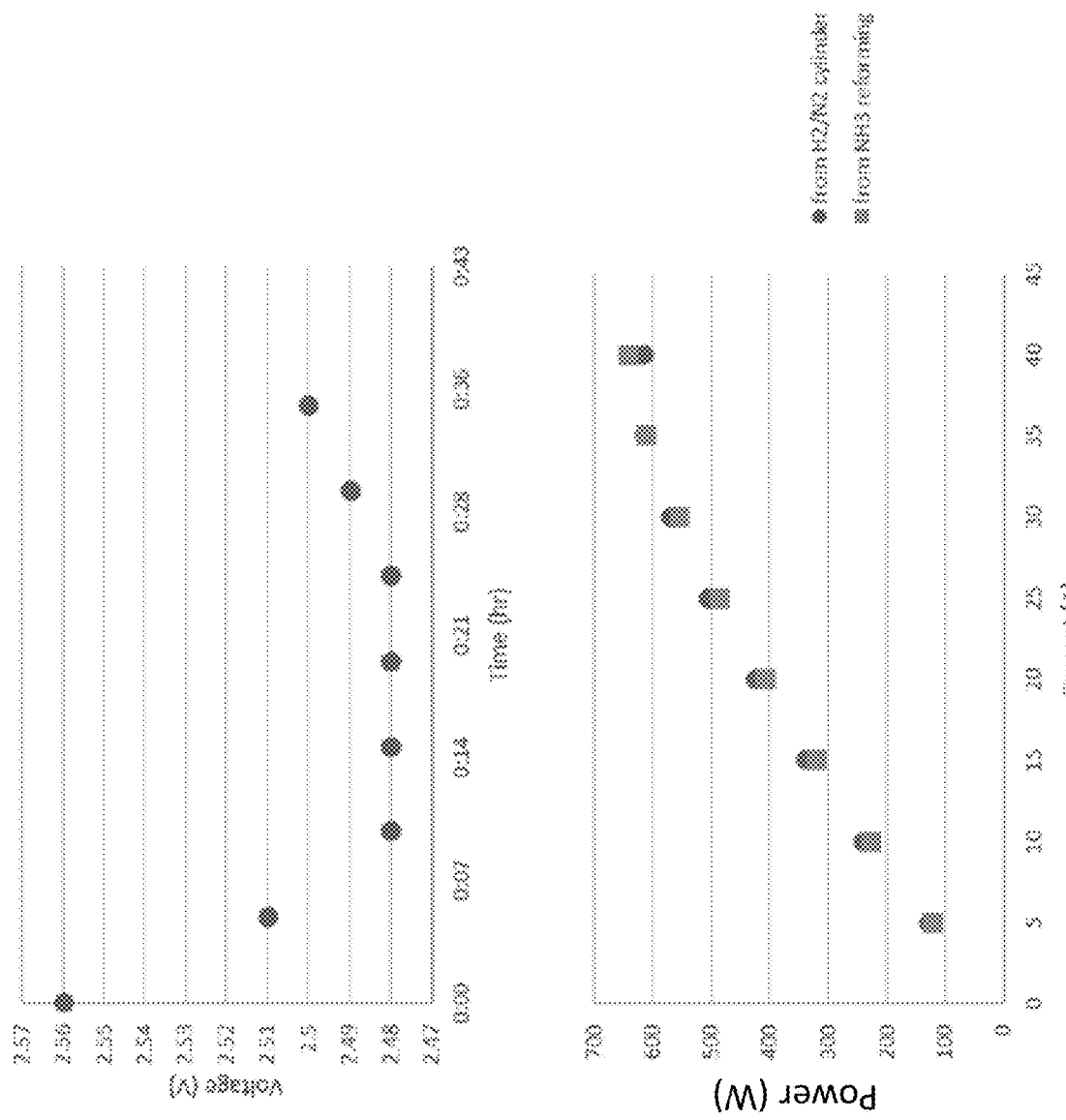
FIG. 8 schematically illustrates durability testing results for a stack of fuel cells with a multi-layer gas diffusion layer design with a hydrogen and nitrogen gas mixture stream produced from an ammonia reforming process, in accordance with some embodiments.

FIG. 8 schematically illustrates durability testing results for a stack of fuel cells with a multi-layer gas diffusion layer design provided with a mixture of hydrogen and nitrogen produced from an ammonia reforming process (3:1 hydrogen to nitrogen volume ratio), in accordance with some embodiments. An ammonia concentration in the hydrogen mixture may be maintained at less than 1 ppm. A stack of five fuel cells was tested using the gas mixture produced during an ammonia reforming process. No appreciable differences in fuel cell performance were observed between a first test scenario involving the processing of reformate gases produced during ammonia reforming, and a second test scenario involving the processing of a mixture of hydrogen and nitrogen from a gas tank. Further, no major degradations in fuel cell performance were observed over the operational time period.

The fuel cells in a stack can be electrically coupled. The fuel cells can be electrically coupled in series to provide higher voltage. In some cases, a fuel cell can provide at least about 0.1, 0.2, 0.3, 0.4, 0.5, 0.6, 0.7, 0.8, 0.9, 1.0, 1.1, or 1.2

V in output voltage. In some cases, a fuel cell can provide at most about 0.1, 0.2, 0.3, 0.4, 0.5, 0.6, 0.7, 0.8, 0.9, 1.0, 1.1, or 1.2 in output voltage. Fuel cells electrically coupled in series can provide a total output voltage that is equal to about the sum of the output voltage of each of the fuel cells coupled in series. For instance, a plurality of fuel cells can provide at least about 1, 2, 3, 4, 5, 6, 7, 8, 9, 10, 20, 30, 40, 50, 60, 70, 80, 90, 100, 200, 300, 400, 500, 600, 700, 800, or 900 V. A plurality of fuel cells can provide at least about 1, 2, 3, 4, 5, 6, 7, 8, 9, 10, 20, 30, 40, 50, 60, 70, 80, 90, 100, 200, 300, 400, 500, 600, 700, 800, or 900 kV. A plurality of fuel cells can provide at least about 1, 2, 3, 4, 5, 6, 7, 8, 9, 10, 20, 30, 40, 50, 60, 70, 80, 90, 100, 200, 300, 400, 500, 600, 700, 800, or 900 MV. A plurality of fuel cells can provide at most about 1, 2, 3, 4, 5, 6, 7, 8, 9, 10, 20, 30, 40, 50, 60, 70, 80, 90, 100, 200, 300, 400, 500, 600, 700, 800, or 900 V. A plurality of fuel cells can provide at most about 1, 2, 3, 4, 5, 6, 7, 8, 9, 10, 20, 30, 40, 50, 60, 70, 80, 90, 100, 200, 300, 400, 500, 600, 700, 800, or 900 kV. A plurality of fuel cells can provide at most about 1, 2, 3, 4, 5, 6, 7, 8, 9, 10, 20, 30, 40, 50, 60, 70, 80, 90, 100, 200, 300, 400, 500, 600, 700, 800, or 900 MV.

The fuel cells can be electrically coupled in parallel to provide a higher current. A fuel cell can provide at least about 1, 2, 3, 4, 5, 6, 7, 8, 9, 10, 20, 30, 40, 50, 60, 70, 80, 90, or 100 A. A fuel cell can provide at most about 1, 2, 3, 4, 5, 6, 7, 8, 9, 10, 20, 30, 40, 50, 60, 70, 80, 90, or 100 A. Fuel cells electrically coupled in parallel can provide a total output current that is equal to the sum of the output current of each of the fuel cells coupled in parallel. For instance, a plurality of fuel cells can provide at least about 1, 2, 3, 4, 5, 6, 7, 8, 9, 10, 20, 30, 40, 50, 60, 70, 80, 90, 100, 200, 300, 400, 500, 600, 700, 800, or 900 A. A plurality of fuel cells can provide at least about 1, 2, 3, 4, 5, 6, 7, 8, 9, 10, 20, 30, 40, 50, 60, 70, 80, 90, 100, 200, 300, 400, 500, 600, 700, 800, or 900 kA. A plurality of fuel cells can provide at least about 1, 2, 3, 4, 5, 6, 7, 8, 9, 10, 20, 30, 40, 50, 60, 70, 80, 90, 100, 200, 300, 400, 500, 600, 700, 800, or 900 MA. A plurality of fuel cells can provide at most about 1, 2, 3, 4, 5, 6, 7, 8, 9, 10, 20, 30, 40, 50, 60, 70, 80, 90, 100, 200, 300, 400, 500, 600, 700, 800, or 900 A. A plurality of fuel cells can provide at most about 1, 2, 3, 4, 5, 6, 7, 8, 9, 10, 20, 30, 40, 50, 60, 70, 80, 90, 100, 200, 300, 400, 500, 600, 700, 800, or 900 kA. A plurality of fuel cells can provide at most about 1, 2, 3, 4, 5, 6, 7, 8, 9, 10, 20, 30, 40, 50, 60, 70, 80, 90, 100, 200, 300, 400, 500, 600, 700, 800, or 900 MA.

One or more ammonia reformers can be configured to provide a plurality of streams comprising hydrogen and nitrogen to the plurality of the fuel cells. In some embodiments, the one or more ammonia reformers comprise one ammonia reformer. In some embodiments, the one or more ammonia reformers comprise at least 2, 3, 4, 5, 6, 7, 8, 9, or 10 ammonia reformers.

In some embodiments, at least one fuel cell of the plurality of fuel cells outputs a different electrical power than other fuel cells of the plurality of fuel cells. In some cases, at least one fuel cell of the plurality of fuel cells is configured to reduce an electrical power output while others of the plurality of fuel cells maintain their respective power outputs. For example, one or more fuel cells of the plurality of fuel cells can operationally or intermittently reduce power output to about 0% to 50% of a first power level, while the other fuel cells of the plurality of fuel cells output about 50% to 100% of the first power level. In some cases, at least one fuel cell of the plurality of fuel cells is configured increase an electrical power output while others of the plurality of fuel cells maintain their electrical power outputs.

In some cases, a system comprising the plurality of fuel cells can be configured to detect a fault in at least one fuel cell of the plurality of fuel cell. The fault can be detected via, for example, a temperature sensor, a voltage sensor, a current sensor, a pressure sensor, a flow sensor, etc., that is operatively coupled to the at least one fuel cell and a controller. In some cases, after detecting a fault, at least one fuel cell of the plurality of fuel cells is configured to shut down or reduce power generation based on the fault, and/or an inlet flow of the at least one fuel cell is configured to be reduced or shut down based on the fault, while the other fuel cells of the plurality of fuel cells can continue to output electrical power. The controller can operate the at least one fuel cell to reduce or shut down the inlet flow. In some cases, the fault may comprise a temperature of the inlet flow being greater than a threshold temperature, an ammonia concentration being greater than a threshold concentration, a pressure of the inlet flow being greater than a threshold pressure, a decrease in voltage below a threshold voltage, an inlet flow rate less than or greater than threshold flow rates, etc. In some cases, after the fault is at least partly resolved, the controller can operate the at least one fuel cell to increase the inlet flow or power generation. In some cases, the fault is at least partly resolved when at least one of: a temperature of the inlet flow returns to a target temperature range, an ammonia concentration returns to below a threshold concentration, a pressure of the inlet flow returns to a target pressure range, voltage level returns to a target voltage range, or an inlet flow returns to a target flow rate range.

In some embodiments, the plurality of fuel cells comprises at least one fuel cell that is different in size, power output, hydrogen consumption rate, power density, or operating temperature from others of the plurality of fuel cells. In some embodiments, the plurality of fuel cell stacks or modules comprises at least one fuel cell stack or module that is different in size, power output, hydrogen consumption rate, power density, or operating temperature from others of the plurality of fuel cell stacks or modules.

In some embodiments, at least one fuel cell of the plurality of the fuel cells is in serial fluid communication with at least one other fuel cell of the plurality of the fuel cells. For example, exit flows of one or more fuel cells of the plurality of fuel cells can provide the inlet flows of one or more other fuel cells of the plurality of fuel cells. In some cases, at least one fuel cell of the plurality of the fuel cells is different in size, power output, hydrogen consumption rate, power density, or operating temperature from at least one other fuel cell of the plurality of the fuel cells that are in serial fluid communication.

In some embodiments, at least one fuel cell of the plurality of the fuel cells is in parallel fluid communication to at least one other fuel cell of the plurality of the fuel cells. In some cases, at least one fuel cell of the plurality of the fuel cells is different in size, power output, hydrogen consumption rate, power density, or operating temperature from at least one other fuel cell of the plurality of the fuel cells that are in parallel fluid communication.

In some embodiments, at least one fuel cell stack or module of the plurality of fuel cell stacks or modules is in serial fluid communication to at least one other fuel cell stack or module of the plurality of fuel cell stacks or modules. For example, exit flows of one or more fuel cell stacks or modules of the plurality of fuel cell stacks or modules can provide the inlet flows of one or more other fuel cell stacks or modules of the plurality of fuel cell stacks or modules. In some cases, at least one fuel cell stack or module of the plurality of the fuel cell stacks or modules is different in size, power output, hydrogen consumption rate, power density, or operating temperature from at least one other fuel cell stack or module of the plurality of the fuel cell stacks or modules that are in serial fluid communication. For example, a first fuel cell stack that outputs an exit flow to an inlet flow of a second fuel cell stack may be in larger in size or may output a higher power.

In some embodiments, at least one fuel cell stack or module of the plurality of fuel cell stacks or modules is in parallel fluid communication to at least one other fuel cell stack or module of the plurality of the fuel cell stacks or modules. In some cases, a flow comprising the source material may be distributed between two or more fuel cell stacks or modules of the plurality of fuel cell stacks or modules within at least about 1%, 10%, 20%, 30%, 40%, 50%, 60%, 70%, 80%, 90%, or 100% of a target flow rate (e.g., target inlet flow rate of a single fuel cell stack). In some cases, a flow comprising the source material may be distributed between two or more fuel cell stacks or modules of the plurality of fuel cell stacks or modules within at most about 1%, 10%, 20%, 30%, 40%, 50%, 60%, 70%, 80%, 90%, or 100% of a target flow rate. In some cases, a flow comprising the source material may be distributed between two or more fuel cell stacks or modules of the plurality of fuel cell stacks or modules by a distribution factor. For example, when the distribution factor is about 4 to 5, a first fuel cell stack may receive a flow comprising the source material that is about 4 to 5 times higher (e.g., by weight, volume, moles, or concentration of the source material) than a second fuel cell stack. In some cases, the distribution factor may be at least about 0.1, 0.5, 1, 2, 3, 4, 5, 6, 7, 8, 9, or 10. In some cases, the distribution factor may be at most about 0.1, 0.5, 1, 2, 3, 4, 5, 6, 7, 8, 9, or 10. In some cases, at least one fuel cell stack or module is different in size, power output, hydrogen consumption rate, power density, or operating temperature from at least one other fuel cell stack or module of the plurality of the fuel cell stacks or modules that are in parallel fluid communication.

In some cases, the fuel cell may be operated to intermittently reduce the hydrogen consumption rate (thus increasing the flow rate of unconverted hydrogen exiting the fuel cell) to purge out at least one of hydrogen, nitrogen, or water. The hydrogen consumption rate can be reduced by directing at least a part of a first continuous stream of hydrogen and nitrogen to the ammonia reformer. In some cases, the first continuous stream can be in direct fluidic communication with the one or more combustion heaters of the ammonia reformer. In some cases, at least the part of the first continuous stream can be flared at one or more combustion exhausts of one or more combustion heaters. In some cases, at least the part of the first continuous stream comprising hydrogen is vented out of one or more combustion exhausts of the one or more combustion heaters.

The one or more combustion heaters can be in operable communication with the ammonia reformer for heating the ammonia reformer. The one or more combustion heaters can be in fluidic communication with the fuel cell to receive the at least the part of the first continuous stream.

The one or more features can be configured to facilitate purging of a select material from the anode gas diffusion layer. The select material can comprise one or more of nitrogen, ammonia, water, or one or more impurities. In some cases, the fuel cell can comprise one or more exit ports for discharging the select material and unconverted hydrogen from the fuel cell. In some cases, unconverted hydrogen from the plurality of fuel cells can be directed to the at least one ammonia reformer or reactor for combustion heating.

One or more air supply units can provide at least oxygen to the ammonia reformer for combustion of the unconverted hydrogen. In some cases, unconverted oxygen from the plurality of fuel cells (e.g., one or more cathode exit flows) can provide at least oxygen to the ammonia reformer for combustion of the unconverted hydrogen. In some cases, water may be removed from the stream comprising the unconverted hydrogen prior to combusting the unconverted hydrogen. In some cases, the stream comprising the unconverted hydrogen can be flared. The systems and the methods disclosed herein may be implemented using one or more fuel cells. The one or more fuel cells may be arranged in a fuel cell stack as disclosed elsewhere herein. In some non-limiting embodiments, the one or more fuel cells may comprise an anode, a cathode, and an electrolyte disposed between the anode and the cathode. In some cases, the anode may comprise a gas diffusion layer with one or more channels for directing a source material through the gas diffusion layer of the anode to facilitate processing of the source material to generate an electrical current. In some cases, the one or more channels may comprise one or more surface features configured to enhance a diffusion of the source material through the gas diffusion layer of the anode. The source material may comprise, for example, a gaseous mixture of hydrogen and nitrogen. In some cases, processing the source material may comprise dissociating one or more hydrogen molecules of the source material into one or more protons and one or more electrons.

In some embodiments, the one or more fuel cells may be in fluid communication with one or more reactor modules for catalytically decomposing ammonia. The one or more fuel cells may be configured to receive hydrogen and/or nitrogen produced or extracted using the one or more reactor modules, and to process the hydrogen/nitrogen mixture to generate electrical energy.

In some cases, the fuel cells may be in fluid communication with one or more reactors. The one or more reactors may be configured to catalytically decompose ammonia to generate hydrogen. The exit flow from the one or more reactors may comprise hydrogen, nitrogen, and/or unconverted ammonia. The exit flow from the one or more reactors may be directed to the one or more fuel cells, which may be configured to use (i.e., process) the exit flow or any portion thereof to generate electrical energy.

In an aspect, the present disclosure provides a method for processing hydrogen. The method may comprise providing a reactor exit flow comprising hydrogen and/or nitrogen to one or more fuel cells. The reactor exit flow may be from a reactor or a reformer for catalytically decomposing ammonia. In some cases, the reactor exit flow may be from various components or subcomponents of a reformer for catalytically decomposing ammonia. The various components or subcomponents may comprise, for example, a reactor, an adsorbent tower, or a heat exchanger of the reformer. The method may further comprise using the one or more fuel cells to process the reactor exit flow to generate electricity (i.e., an electrical current).

In some cases, the exit flow from the one or more reactors may be directed to one or more adsorbents to remove excess or trace ammonia before the reactor exit flow is directed to the one or more fuel cells. The adsorbents may help to preserve a performance and/or a longevity of the one or more fuel cells since ammonia can be detrimental to the fuel cells. The adsorbents may be replaceable (e.g., as cartridges) after a certain number of cycles or operations. In some embodiments, a concentration of ammonia in the exit flow from the one or more adsorbents may be further reduced (before supplying the exit flow from the one or more adsorbents to the one or more fuel cells) using an additional ammonia filtration system in series fluidic communication with the one or more adsorbents. The additional ammonia filtration system may be an adsorbent-based, membrane-based, absorbent-based, a solvent-based, a water-based, or an acidic-based ammonia filtration system. In some cases, the additional ammonia filtration system comprises one or more ammonia filtration cartridges, so that when one or more cartridges are fully or at least partially spent, the one or more fully or at least partially spent cartridges can be replaced with one or more new ammonia filtration cartridges.

In some cases, the fuel cells may be in fluid communication with a plurality of adsorption towers. The plurality of adsorption towers may comprise at least a first adsorption tower and a second adsorption tower. The first and/or second adsorption tower may be used to remove any traces of ammonia from the reactor exit flow before the reactor exit flow is directed to the one or more fuel cells. While the first adsorption tower is being used, the second adsorption tower may be regenerated (e.g., such that ammonia is desorbed from the second adsorption tower). Once the first adsorption tower is fully saturated (e.g., when the first adsorption tower is not able to adsorb additional ammonia), the second adsorption tower may be partially or fully regenerated and ready for use in another cycle or operation. In any of the embodiments described herein, two, three, four, five, six, seven, eight, nine, ten, or more adsorption towers may be used to filter the reactor exit flow before the reactor exit flow reaches the one or more fuel cells.

Proton-Exchange Membrane Fuel Cells

The fuel cells disclosed herein may comprise various types of fuel cells. In some cases, the electrolyte can comprise a membrane. In some cases, the membrane can comprise a proton-exchange membrane. In some cases, the fuel cells may comprise one or more proton-exchange membrane fuel cells (PEMFCs) having a proton-conducting polymer electrolyte membrane. A proton exchange membrane fuel cell can be used to transform chemical energy into electrical energy by electrochemically reacting hydrogen and oxygen. In some cases, the PEMFC may comprise a proton-conducting polymer membrane that separates the anode and cathode sides of the PEMFC. In some cases, the fuel cells may comprise one or more PEMFCs, one or more solid oxide fuel cells (SOFCs), one or more molten carbonate fuel cells (MCFCs), one or more alkaline fuel cells (AFCs), one or more alkaline membrane fuel cells (AMFCs), or one or more phosphoric acid fuel cells (PAFCs).

The fuel cells of the present disclosure may comprise one or more PEMFCs that are adapted for use with a mixture of hydrogen and/or nitrogen. In some cases, the fuel cells of the present disclosure may be used to generate electrical energy from hydrogen gas mixtures containing impurities that would otherwise degrade the performance of conventional fuel cells (some of which may require up to about 99.7% pure hydrogen as a source material). The fuel cells of the present disclosure may provide better performance compared to fuel cells with a dead-end type design (e.g., a fuel cell without an outlet at the anode channel configured to direct unconverted hydrogen and/or nitrogen out of the fuel cell). The dead-end type design does not allow efficient processing of $H_2/N_2$ mixtures since $N_2$ concentrations may build up without appropriate purging. The fuel cells of the present disclosure may provide better performance compared to fuel cells with an intermittent purging operation that does not allow efficient processing of $H_2/N_2$ mixtures (since $N_2$ concentrations may build up without continuous purging). In some cases, the continuous purging may be defined based on purging time ratio (a ratio of total purging time to total operational time while electricity is being generated by the one or more fuel cells). In some cases, one or more fuel cells are continuously purged when the purging time ratio is at least about 0.5 (i.e., purging of $N_2$ occurs during at least about 50% of the total operational time). In some cases, one or more fuel cells are continuously purged when the purging time ratio is at least about 0.2, 0.3, 0.4, 0.5, 0.6, 0.7, 0.8, or 0.9. In some cases, the purging time ratio is about 1 (i.e., the purging of $N_2$ occurs during about 100% of the total operational time). The fuel cells disclosed herein may also provide enhanced performance compared to fuel cells with a flow-through design (e.g., a fuel cell with an outlet at the anode channel configured to direct unconverted hydrogen and/or nitrogen out of the fuel cell) that allows $H_2/N_2$ mixtures, since the fuel cells in such flow-through designs can experience fuel starvation if excess $H_2/N_2$ mixture is not provided or $H_2$ from $H_2/N_2$ mixture is not distributed well in the anode. The presently disclosed fuel cells may be configured to utilize and process a $H_2/N_2$ mixture without experiencing similar degradations in performance that can be attributed to a buildup of $N_2$ concentrations. Such advantages may be realized using, for example, optimally configured anode channels for the fuel cells (e.g., such as anode channels including cuts, cutouts, or grooves).

Source Material

In an aspect, the present disclosure provides a fuel cell design that can be compatible with various gas mixtures containing hydrogen, nitrogen, ammonia, and/or other reformate gases. Such gas mixtures may be provided by an ammonia reformer or a reactor configured to process (i.e., catalytically decompose) ammonia. Although hydrogen has a relatively high gravimetric density (measured in MJ/kg), fuel storage systems for compressed and liquefied hydrogen are often complex due to the need to provide and maintain specialized storage conditions. For example, storage of hydrogen as a gas may require high-pressure tanks (e.g., 350-700 bar or 5,000-10,000 psi). Storage of hydrogen as a liquid may require cryogenic temperatures because the boiling point of hydrogen at a pressure of 1 atm is $-252.8°$ C. Using ammonia as a hydrogen carrier may provide several benefits over storing and transporting pure hydrogen, including easy storage at relatively standard conditions (0.8 MPa, 20° C. in liquid form), and convenient transportation. Ammonia also has a relatively high hydrogen content (17.7 wt. % or 120 grams of $H_2$ per liter of liquid ammonia). Further, the production of ammonia using the Haber-Bosch process can be powered by renewable energy sources (e.g., solar photovoltaic, solar-thermal, wind turbines, geothermal, and/or hydroelectricity), which makes the production process environmentally safe and friendly, as $N_2$ is the only byproduct and there is no further emission of $CO_2$. Once the ammonia is produced, the ammonia may be processed to release the hydrogen through a dehydrogenation process (i.e., by dissociating, decomposing, reforming, or cracking the ammonia).

The source material can comprise various concentrations of hydrogen, nitrogen, and ammonia. When the source material is provided directly from an ammonia reformer, the ratio of nitrogen to hydrogen can be about 1 part nitrogen to 3 parts hydrogen by moles. There can be some ammonia in the source material, depending on the extent of conversion of the ammonia by the reformer. In some cases, the source material can be mixed with another gas before being provided to the one or more fuel cells. For instance, the source material can be mixed with a stream of high purity hydrogen gas (e.g., greater than 99% purity). The source material can be mixed with a stream of high purity nitrogen gas (e.g., greater than 99% purity). The source material can be purified before being provided to the one or more fuel cells. For instance, the source material can be contacted with an adsorbent or an absorbent to reduce ammonia concentration in the source material. In some cases, the source material can be provided by mixing high purity nitrogen and high purity hydrogen streams. Therefore, the concentrations and the amounts of hydrogen, nitrogen, and ammonia that is supplied to the one or more fuel cells can be varied.

Figure 15:
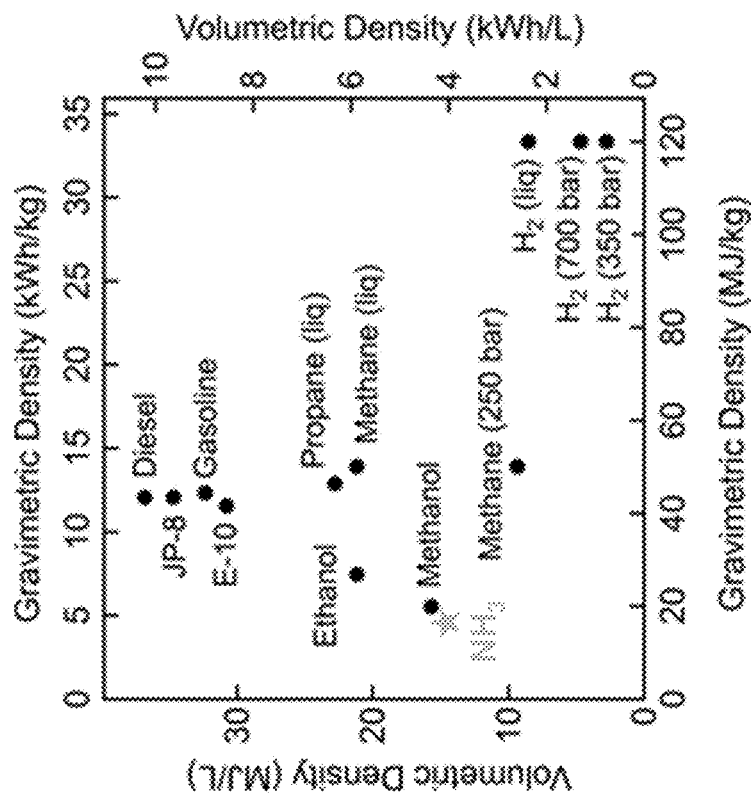
FIG. 15 shows energy density of ammonia compared with other fuels, in accordance with some embodiments.

FIG. 15 schematically illustrates ammonia as an energy carrier and various density characteristics of ammonia in comparison to other types of fuel. The $H_2$ storage capacity of $NH_3$ is about 17.7 wt. % and 120 grams of $H_2$ per liter of ammonia. Compared to other fuel types such as hydrogen, ammonia exhibits a favorable volumetric density in view of its gravimetric density. Further, in comparison to other types of fuel (including carbon-based fuels such as methane, propane, methanol, ethanol, gasoline, E-10 gasoline, JP-8 jet fuel, or diesel), the use of ammonia as a fuel may not produce harmful emissions such as $CO_2$, CO, or black carbon (soot), and may produce zero or negligible $NO_x$ (e.g., $NO_2$ or $N_2O$) emissions (especially in combination with a selective catalytic reduction [SCR] catalyst). Thus, the use of ammonia as an energy carrier allows some embodiments of the presently disclosed systems and methods to leverage the benefits of hydrogen fuel (e.g., environmentally safe and high gravimetric energy density) once the ammonia is decomposed into hydrogen, while taking advantage of (a) ammonia's greater volumetric density compared to hydrogen and (b) the ability to transport ammonia at standard temperatures and pressures without requiring the complex and highly pressurized storage vessels typically used for storing and transporting hydrogen.

In some embodiments, the source material comprises a volume fraction of $H_2$ of about 30% to about 99.7%. In some embodiments, the source material comprises a volume fraction of $H_2$ of from about 30% to about 99.99%. In some embodiments, the source material comprises a volume fraction of $H_2$ of from about 70% to about 99.999%. In some embodiments, the source material comprises a volume fraction $H_2$ of from about 70% to about 80% when provided by ammonia reforming. In some embodiments, one or more hydrogen separation systems (e.g., pressure swing adsorption (PSA) or membrane separation) can be used to increase the volume fraction of hydrogen in the source material.

In some embodiments, the source material comprises a volume fraction of $H_2$ of about 30%, about 35%, about 40%, about 45%, about 50%, about 55%, about 60%, about 65%, about 70%, about 75%, about 80%, about 85%, about 90%, about 95%, about 99.7%, or any value therebetween. In some embodiments, the source material comprises a volume fraction of $H_2$ of at least about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99.7%, or any value therebetween. In some embodiments, the source material comprises a volume fraction of $H_2$ of at most about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99.7%, or any value therebetween. In some embodiments, the source material comprises a volume fraction of $H_2$ of about 30% to about 99.7%, about 35% to about 95%, about 40% to about 90%, about 45% to about 85%, about 50% to about 80%, about 55% to about 75%, about 60% to about 70%, about 65% to about 95%.

In some embodiments, the source material comprises a molar fraction of $H_2$ of at least about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99.7%, or any value therebetween. In some embodiments, the source material comprises a molar fraction of $H_2$ of at most about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99.7%, or any value therebetween.

In some embodiments, the source material comprises a partial pressure fraction of $H_2$ of at least about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99.7%, or any value therebetween. In some embodiments, the source material comprises a partial pressure fraction of $H_2$ of at most about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99.7%, or any value therebetween.

The source material can comprise various concentrations of nitrogen. In some cases, the source material comprises comprise a volume fraction of nitrogen of at least 10%. In some cases, the source material comprises a volume fraction of nitrogen of at least 20%. In some cases, the source material comprises a volume fraction of nitrogen ranging from about 20% to about 30%. In some cases, the source material comprises a volume fraction of nitrogen ranging from about 30% to about 50%. In some cases, the source material comprises a volume fraction of nitrogen ranging from about 40% to about 70%. In some embodiments, the source material comprises a volume fraction of nitrogen of about 10%, about 15%, about 20%, about 25%, about 30%, about 35%, about 40%, about 45%, about 50%, about 55%, about 60%, about 65%, about 70%, or any value therebetween. In some embodiments, the source material comprises a volume fraction of nitrogen of at least about 10%, about 15%, about 20%, about 25%, about 30%, about 35%, about 40%, about 45%, about 50%, about 55%, about 60%, about 65%, about 70%, or any value therebetween. In some embodiments, the source material comprises a volume fraction of nitrogen of at most about 10%, about 15%, about 20%, about 25%, about 30%, about 35%, about 40%, about 45%, about 50%, about 55%, about 60%, about 65%, about 70%, or any value therebetween. In some embodiments, the source material comprises a volume fraction of nitrogen of about 10% to about 70%, about 15% to about 65%, about 20% to about 60%, about 25% to about 55%, about 30% to about 50%, about 35% to about 45%, about 40% to about 70%, or any value therebetween.

In some embodiments, the source material comprises a partial pressure fraction of $N_2$ of at least about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99%, or any value therebetween. In some embodiments, the source material comprises a partial pressure fraction of $N_2$ of at most about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99%, or any value therebetween.

In some embodiments, the source material comprises a molar fraction of $N_2$ of at least about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99%, or any value therebetween. In some embodiments, the source material comprises a molar fraction of $N_2$ of at most about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 99%, or any value therebetween.

The source material can comprise various concentrations of ammonia. In some embodiments, the source material comprises an ammonia concentration that is less than about 0.1 ppm, about 0.2 ppm, about 0.3 ppm, about 0.4 ppm, about 0.5 ppm, about 0.6 ppm, about 0.7 ppm, about 0.8 ppm, about 0.9 ppm, about 1 ppm, about 1.2 ppm, about 1.4 ppm, about 1.6 ppm, about 1.8 ppm, about 2 ppm, or any value therebetween. In some embodiments, the source material comprises an ammonia concentration that is at most about 0.1 ppm, about 0.2 ppm, about 0.3 ppm, about 0.4 ppm, about 0.5 ppm, about 0.6 ppm, about 0.7 ppm, about 0.8 ppm, about 0.9 ppm, about 1 ppm, about 1.2 ppm, about 1.4 ppm, about 1.6 ppm, about 1.8 ppm, about 2 ppm, or any value therebetween. In some embodiments, the source material comprises an ammonia concentration that is between about 0.1 ppm and about 2 ppm, between about 0.2 ppm and about 1.8 ppm, between about 0.3 ppm and about 1.6 ppm, between about 0.4 ppm and about 1.4 ppm, between about 0.5 ppm and about 1.2 ppm, between about 0.6 ppm and about 1 ppm, between about 0.7 ppm and about 0.9 ppm, or between about 0.8 ppm and about 2 ppm. In some embodiments, an ammonia concentration in the first continuous stream is at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm. In some embodiments, an ammonia concentration in the first continuous stream is at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

The source material can be provided to one or more fuel cells at various pressures. The source material can be provided to one or more fuel cells at an absolute pressure of at least about 0.5, 1, 2, 3, 4, 5, 6, 7, 8, 9, 10, 15, 20, 25, 30, or 40 bar. The source material can be provided to one or more fuel cells at an absolute pressure of at most about 0.5, 1, 2, 3, 4, 5, 6, 7, 8, 9, 10, 15, 20, 25, 30, or 40 bar. The source material can be provided to one or more fuel cells at an absolute pressure of about 1 to 5 bar. The pressure of the source material can be maintained within a selected tolerance while the source material is being provided to the one or more fuel cells. The selected tolerance can be 1, 5, 10, 20, 30, 40, 50, 60, 70, 80, 90, 100, 110, 150, 200, 300, 400, 500, or 1000 percent of the absolute pressure. The pressure or the flow rate of the source material can be modulated while the source material is being provided to the one or more fuel cells. One or more flow regulators, pressure regulators, control units, or any combination thereof can be used to modulate the pressure or the flow rate. For example, one or more pressure regulators can reduce the pressure of the source material provided to the one or more fuel cells from an absolute pressure of about 5 to 10 bar to about 1.5 to 3 bar. The one or more flow regulators, pressure regulators, control units, or any combination thereof can be positioned upstream or downstream of the fuel cell. The one or more flow regulators, pressure regulators, control units, or any combination thereof can be positioned downstream of the fuel cell to prevent or reduce a back flow of the unconverted hydrogen or any other flows.

In some cases, the source material can be provided to a plurality of fuel cells, fuel cell stacks, or fuel cell modules as a plurality of streams. The flow rates or the pressures of the plurality of streams can be maintained or modulated. One or more flow regulators, pressure regulators, control units, or any combination thereof can be used to modulate the pressures or the flow rates. In some cases, at least one fuel cell of the plurality of the fuel cells can receive a stream at a flow rate that is different from the flow rates of other streams of the plurality of streams. In some cases, each of the plurality of the fuel cells can receive one of the plurality of streams at a flow rate that is about the same as or within a selected tolerance of other flow rates of others of the plurality of streams. In some cases, the selected tolerance is about 10, 20, 30, 40, 50, 60, 70, 80, 90, or 100%. In some cases, the selected tolerance is at most about 10, 20, 30, 40, 50, 60, 70, 80, 90, or 100%.

Reformer

Figure 9:
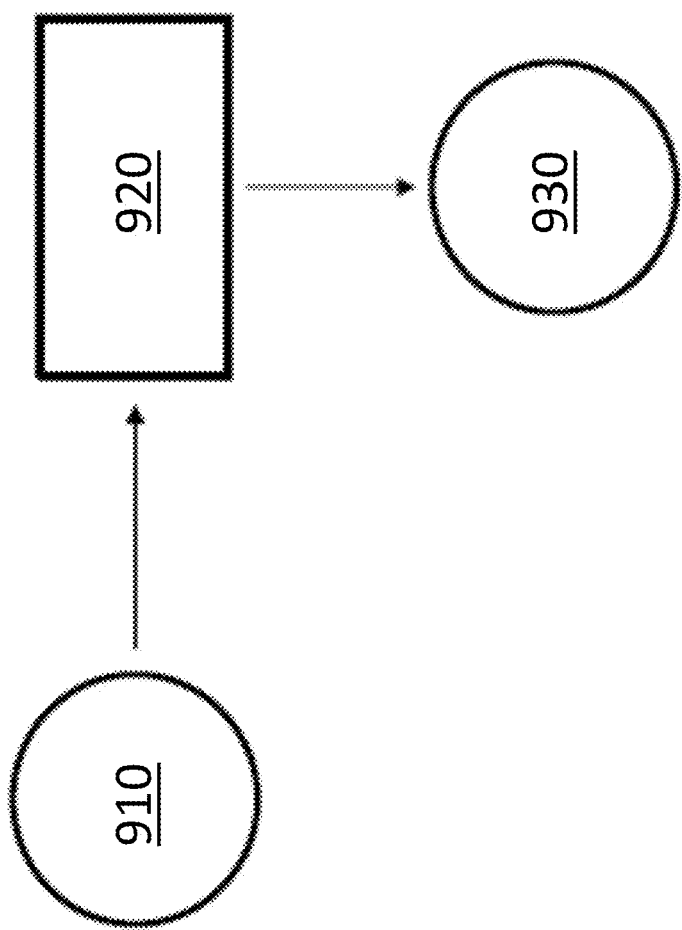
FIG. 9 schematically illustrates a system for processing a source material comprising hydrogen and nitrogen, in accordance with some embodiments.

FIG. 9 schematically illustrates a block diagram of an exemplary system for processing a source material 910 to produce electrical energy. The source material 910 may comprise hydrogen. In some cases, the source material 910 may further comprise one or more other gases, such as, for example, oxygen ($O_2$), nitrogen ($N_2$) and/or ammonia ($NH_3$). The source material 910 may comprise one or more reformate gases that are generated by an ammonia processing system. The system can be configured to crack or decompose a hydrogen carrier (e.g., ammonia, a liquid organic hydrogen carrier (LOHC), formic acid (HCOOH), or methanol ($CH_3OH$)) to extract or produce hydrogen. In some cases, the source material 910 may comprise various impurities, such as unconverted ammonia that has passed through the ammonia processing system, nitrogen that has mixed with the hydrogen extracted using the ammonia processing system, and/or other trace materials within the ammonia processing system.

The source material 910 may be provided to a fuel cell 920. The fuel cell 920 may be designed or configured to process the hydrogen to produce electrical energy 930. The electrical energy 930 may be used to power various system, vehicles, and/or devices, including, for example, terrestrial, aerial, aquatic, marine, submarine, or amphibious vehicles, mobile or stationary electric devices, or a stationary electrical grid. In some cases, the electrical energy 930 may be used as back-up power for the various systems, vehicles, and/or devices.

As described above, the one or more fuel cells 920 may be used to generate electrical energy 930 (e.g., an electrical current or a flow of electrons) using the source material 910, which may comprise hydrogen and/or nitrogen. In some cases, the one or more fuel cells may generate the electrical energy 930 through an electrochemical reaction of a fuel. The fuel may comprise the hydrogen in the source material 910. The electricity generated by the fuel cells may be used to power one or more systems, vehicles, or devices. In some embodiments, excess electricity generated by the fuel cells may be stored in one or more energy storage units (e.g., batteries) for future use. In some embodiments, the fuel cells may be provided as part of a larger fuel cell system.

In some non-limiting examples, the fuel cell system may comprise an electrolysis module. Electrolysis of a byproduct of the one or more fuel cells (e.g., water) may allow the byproduct to be removed through decomposition of the byproduct into one or more constituent elements (e.g., oxygen and/or hydrogen). Electrolysis of the byproduct can also generate additional fuel (e.g., hydrogen) for the fuel cell. The energy required to run the electrolysis module can, in part, come from excess electricity sources including, but not limited to, solar power, wind power, hydro power, nuclear power, combustion engines, combustion turbines, steam turbines, etc. In some cases, the fuel cell may receive the source material from one or more reformers. The one or more reformers may be configured to perform a catalytic decomposition or cracking of ammonia to extract and/or produce hydrogen. The exit flow from the reformers may comprise the extracted hydrogen and/or other gases (e.g., nitrogen and/or ammonia). The exit flow may correspond to the source material usable by the fuel cells to generate electrical energy. In some cases, the reformers may be operated using heat energy. In some cases, the reformers may be heated using a combustor that generates heat energy to drive the operation of the reformers. In some cases, the heat energy may be generated from the combustion of a chemical compound (e.g., hydrogen or a hydrocarbon). The hydrogen that is generated and/or extracted using the reformers may be provided to the one or more fuel cells, which may produce electrical energy to power one or more systems, sub-systems, or devices requiring electrical energy to operate. In some cases, the hydrogen generated and/or extracted using the reformers may be provided to one or more other reactors or reformers. In such cases, the one or more other reactors or reformers may be configured to combust the hydrogen to generate thermal energy. Such thermal energy may be used to heat the one or more other reactors or reformers to facilitate a further catalytic decomposition or cracking of ammonia to extract and/or produce additional hydrogen. In some cases, the reformers or reactors may be heated using electrical heating, resistive heating, or Joule heating. In some cases, the reformers or reactors may be heated using the combustion heating and electrical heating, resistive heating, or Joule heating. In such cases, a current may be passed through an electrical heater, a catalyst, or a catalyst bed of the reformer to heat the catalyst directly.

Figure 10:
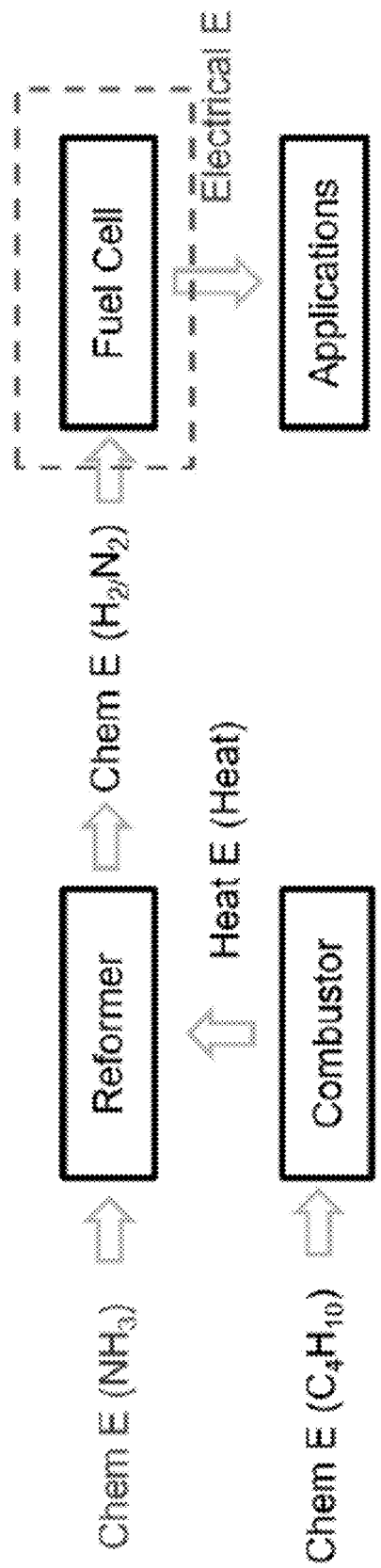
FIG. 10 schematically illustrates a process for feeding reformate gas to a fuel cell, in accordance with some embodiments.

FIG. 10 schematically illustrates a process for feeding reformate gas to a fuel cell, in accordance with some embodiments. The reformate gas may comprise a mixture of hydrogen and nitrogen. The mixture may comprise a ratio of hydrogen gas to nitrogen gas by weight or volume. The ratio may be, for example, X:Y, where X corresponds to hydrogen (e.g., 3 for ammonia reforming) and Y corresponds to nitrogen (e.g., 1 for ammonia reforming) in volume, mole, or partial pressure basis ratio, and where X and Y are any integer greater than or equal to 1. The reformate gases may comprise one or more gases constituting the exit flow from a reformer (or any components or subcomponents thereof). The reformer may comprise an ammonia reformer for catalytically decomposing ammonia. The catalytic decomposition of ammonia may be driven using a heat source. The heat source may comprise one or more combustors and/or one or more electrical heaters. The one or more combustors may be configured to combust hydrogen, ammonia, one or more hydrocarbons, or any combination thereof to generate thermal energy. The one or more electrical heaters may be configured to covert electrical energy to thermal energy via joule heating mechanism. The thermal energy may be used to drive the catalytic decomposition of ammonia.

Channel Features

The one or more features can comprise various dimensions, shapes, and orientations. In some cases, the one or more features can comprise one or more cuts, one or more cutouts, one or more grooves, or any combination thereof. In some cases, a cut can be an incision or slit in an anode channel. In some cases, a cut may comprise removal of a substantially minor amount of material (e.g., zero material or close to zero material by weight, for example, less than about 1 to 3% by weight) from the anode channel. A cutout can be an opening in an anode channel. A cutout can comprise removal of a substantial amount of material from the anode channel. A groove can be a recess or trench in the anode channel comprising a depth that does not extend through the entire thickness of the anode channel. A groove can comprise removal of a substantial amount of material from the anode channel. A groove can comprise removal of a substantially minor amount of material from the anode channel.

The one or more features can comprise various depths. The one or more features can comprise a depth less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm. The one or more features can comprise a depth greater than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm. The depth of the one or more features may be construed with respect to a thickness of the GDL. In some cases, the depth is at least $\frac{1}{32}$, $\frac{1}{16}$, $\frac{1}{8}$, $\frac{1}{4}$, $\frac{1}{2}$, $\frac{3}{4}$, $\frac{7}{8}$, $\frac{15}{16}$, or $\frac{31}{32}$ of the thickness of the GDL. In some cases, the depth is at most $\frac{1}{32}$, $\frac{1}{16}$, $\frac{1}{8}$, $\frac{1}{4}$, $\frac{1}{2}$, $\frac{3}{4}$, $\frac{7}{8}$, $\frac{15}{16}$, or $\frac{31}{32}$ of the thickness of the GDL.

The one or more features can comprise various surface areas. The one or more features can extend across a portion of the surface of the anode channel. In some cases, a ratio of a projected surface area of the one or more features to a projected surface area of the anode channel is at least 0.1, 0.2, 0.3, 0.4, 0.5, 0.6, 0.7, 0.8, or 0.9. In some cases, the ratio of a projected surface area of the one or more features to a projected surface area of the anode channel is at most 0.1, 0.2, 0.3, 0.4, 0.5, 0.6, 0.7, 0.8, or 0.9.

The one or more features can comprise any number of features. In some cases, the one or more features can comprise two or more features. The one or more features can comprise at least 1, 2, 3, 4, 5, 6, 7, 8, 9, 10, 20, 30, 40, 50, 60, 70, 80, 90, or 100 features. The one or more features can comprise at most 1, 2, 3, 4, 5, 6, 7, 8, 9, 10, 20, 30, 40, 50, 60, 70, 80, 90, or 100 features.

The one or more features can comprise various orientations. In some cases, at least a first segment of a first feature in two or more features is substantially parallel to a second segment of a second feature of the two or more features. In some cases, at least a first segment of a first feature in two or more features is substantially perpendicular to a second segment of a second feature of the two or more features. In some cases, at least a first segment of a first feature in two or more features is at an angle to a second segment of a second feature of the two or more features, wherein the angle is between 0 and 90 degrees, between 0 and 30 degrees, between 15 and 75 degrees, or between 30 and 60 degrees. In some cases, two or more features can be connected or disconnected. In some cases, two or more features can intersect. A feature can be substantially parallel with the longest side of the anode channel. A feature can be substantially parallel with the shortest side of the anode channel.

The one or more features can comprise various shapes. For example, the one or more features can comprise a substantially straight shape, a curved shape, a serpentine shape, or another shape.

Figure 11:
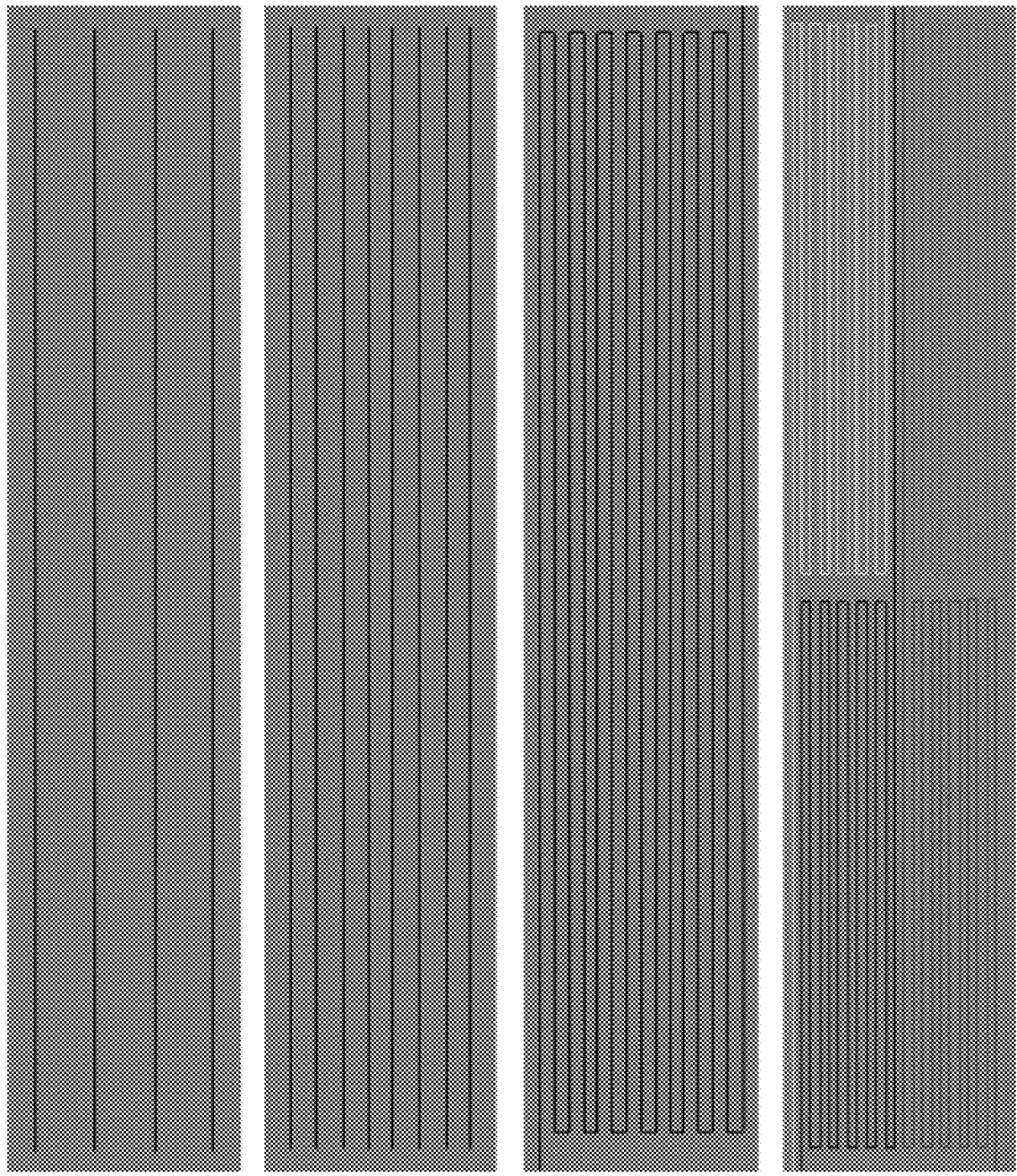
FIG. 11 schematically illustrates various examples of cut configurations that may be utilized for an anode channel of a fuel cell, in accordance with some embodiments.

FIG. 11 schematically illustrates various examples of cut configurations that may be utilized for an anode channel of a fuel cell. The cut configurations may comprise a plurality of cuts across a surface of the anode channel of the fuel cell. The plurality of cuts may comprise one or more cuts into the surface of the anode channel to reduce the buildup of nitrogen in the anode and facilitate the outflow of nitrogen from the fuel cell so that the nitrogen does not accumulate in the gas diffusion layer of the anode. It is noted herein that the expression "anode channel" may be construed as an "anode gas diffusion layer channel," an "anode current collecting layer channel," or a combination of both.

The cuts may comprise a depth extending into the anode channel ranging from about 0.01 millimeters to about 10 mm. In some embodiments, the depth is at least about 0.01 mm, about 0.05 mm, about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 2 mm, about 3 mm, about 4 mm, about 5 mm, about 6 mm, about 7 mm, about 8 mm, about 9 mm, about 10 mm, or any value therebetween. In some embodiments, the depth is at most about 0.01 mm, about 0.05 mm, about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 2 mm, about 3 mm, about 4 mm, about 5 mm, about 6 mm, about 7 mm, about 8 mm, about 9 mm, about 10 mm, or any value therebetween. In some embodiments, the depth is between 0.01 mm and about 10 mm, between about 0.05 mm and about 9 mm, between about 0.1 mm and about 8 mm, between 0.2 mm and about 7 mm, between about 0.3 mm and about 6 mm, between about 0.4 mm and about 5 mm, between 0.5 mm and about 4 mm, between about 0.6 mm and about 3 mm, between about 0.7 mm and about 2 mm, between 0.8 mm and about 1 mm, or between about 0.9 mm and about 10 mm. In some embodiments, the one or more cuts may comprise depths extending into the anode channel equal to the thickness of the anode channel.

In some embodiments, the one or more cuts may extend into the anode channel at a depth ranging from about $\frac{1}{8}$ to about $\frac{1}{2}$ of the thickness of the anode channel. In some embodiments, the depth is at least about $\frac{1}{8}$, about $\frac{1}{7}$, about $\frac{1}{6}$, about $\frac{1}{5}$, about $\frac{1}{4}$, about $\frac{1}{3}$, about $\frac{1}{2}$, of the thickness of the anode channel, or any value therebetween. In some embodiments, the depth is at most about $\frac{1}{8}$, about $\frac{1}{7}$, about $\frac{1}{6}$, about $\frac{1}{5}$, about $\frac{1}{4}$, about $\frac{1}{3}$, about $\frac{1}{2}$, of the thickness of the anode channel, or any value therebetween. In some embodiments, the depth is between $\frac{1}{8}$ and about $\frac{1}{2}$, between about $\frac{1}{7}$ and about $\frac{1}{3}$, between about $\frac{1}{6}$ and about $\frac{1}{4}$, or between $\frac{1}{5}$ and about $\frac{1}{2}$ of the thickness of the anode channel. For example, in an anode channel comprising a thickness of 2 mm, the cuts may comprise a depth ranging from about 0.25 mm to about 1 mm.

In some embodiments, the one or more cuts may extend into the anode channel at a depth ranging from about $\frac{1}{2}$ to about $\frac{4}{5}$ of the thickness of the anode channel. In some embodiments, the depth is at least about $\frac{1}{2}$, about $\frac{2}{3}$, about $\frac{3}{4}$, about $\frac{4}{5}$, of the thickness of the anode channel, or any value therebetween. In some embodiments, the depth is at most about $\frac{1}{2}$, about $\frac{2}{3}$, about $\frac{3}{4}$, about $\frac{4}{5}$, of the thickness of the anode channel, or any value therebetween. In some embodiments, the depth is between $\frac{1}{2}$ and about $\frac{4}{5}$, between about $\frac{2}{3}$ and about $\frac{3}{4}$, or between about $\frac{3}{4}$ and about $\frac{4}{5}$ of the thickness of the anode channel. For example, in an anode channel comprising a thickness of 2 mm, the cuts may comprise a depth ranging from about 1 mm to about 1.6 mm.

In some cases, some of the one or more cuts may extend into the anode channel at a different depth than others of the one or more cuts (e.g., a first set of cuts may comprise a depth of 0.25 mm and a second set of cuts may comprise a depth of 0.5 mm). In some cases, each of the one or more cuts may extend into the anode channel at the same depth.

In some cases, the fuel cell comprises an anode gas diffusion layer with one or more anode channels. In some embodiments, the one or more anode channels comprise one or more features. In some embodiments, the one or more features comprise (i) one or more cuts or grooves or (ii) one or more cutouts or openings configured to enhance diffusion and transport of the source material through the anode gas diffusion layer. In some embodiments, the one or more features are configured to direct a flow of nitrogen from the anode gas diffusion layer to out of the fuel cell so that nitrogen does not accumulate in the anode gas diffusion layer.

In some embodiments, a feature of the one or more features has a depth that is at least about 0.01 mm, about 0.05 mm, about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 2 mm, about 3 mm, about 4 mm, about 5 mm, about 6 mm, about 7 mm, about 8 mm, about 9 mm, about 10 mm, or any value therebetween. In some embodiments, the depth is at most about 0.01 mm, about 0.05 mm, about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 2 mm, about 3 mm, about 4 mm, about 5 mm, about 6 mm, about 7 mm, about 8 mm, about 9 mm, about 10 mm, or any value therebetween. In some embodiments, the depth is between 0.01 mm and about 10 mm, between about 0.05 mm and about 9 mm, between about 0.1 mm and about 8 mm, between 0.2 mm and about 7 mm, between about 0.3 mm and about 6 mm, between about 0.4 mm and about 5 mm, between 0.5 mm and about 4 mm, between about 0.6 mm and about 3 mm, between about 0.7 mm and about 2 mm, between 0.8 mm and about 1 mm, or between about 0.9 mm and about 10 mm.

In some cases, the cut configurations may comprise one or more cuts extending across at least a portion of the surface of the anode channel. In some cases, the one or more cuts may be parallel to each other. In other cases, the one or more cuts may not or need not be parallel to each other. In some cases, the cuts may comprise one or more horizontal cuts extending along a width of the anode channel and/or one or more vertical cuts extending along a length of the anode channel. The one or more horizontal cuts and the one or more vertical cuts may or may not intersect with each other. In some cases, the surface of the anode channel may comprise one or more sets of cut configurations. The one or more sets of cut configurations may be located on different portions or regions of the surface of the anode channel. In some cases, the one or more sets of cut configurations may be distributed across different quadrants of the surface of the anode channel. In some cases, the one or more cuts may be disposed at an angle relative to each other. In some cases, the one or more cuts may be disposed at a plurality of different angles relative to each other.

Figure 12:
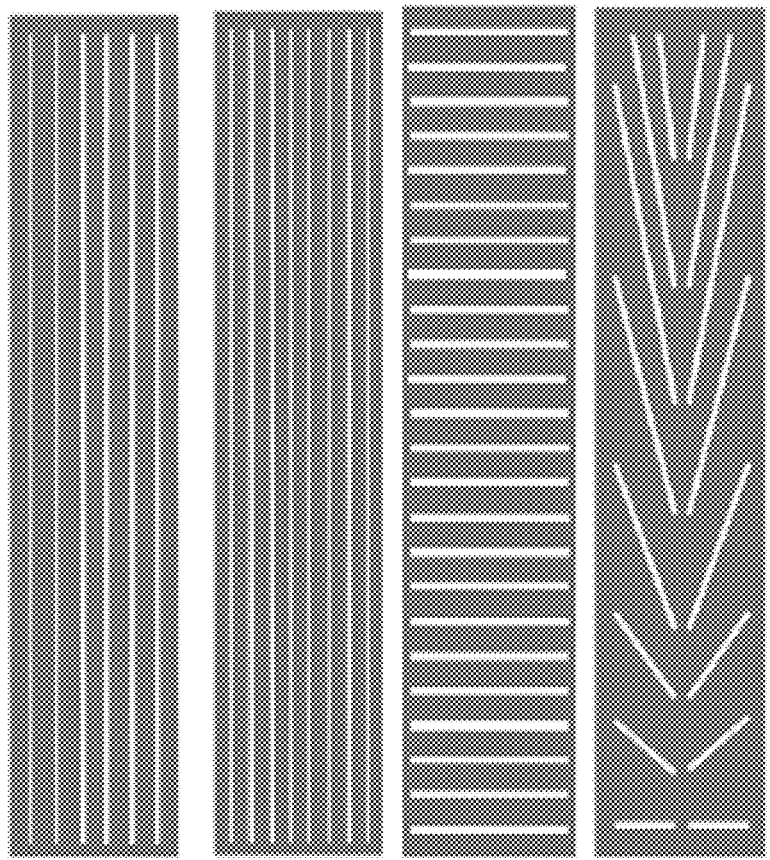
FIG. 12 schematically illustrates various examples of cutout configurations that may be utilized for an anode channel of a fuel cell, in accordance with some embodiments.
Figure 12:
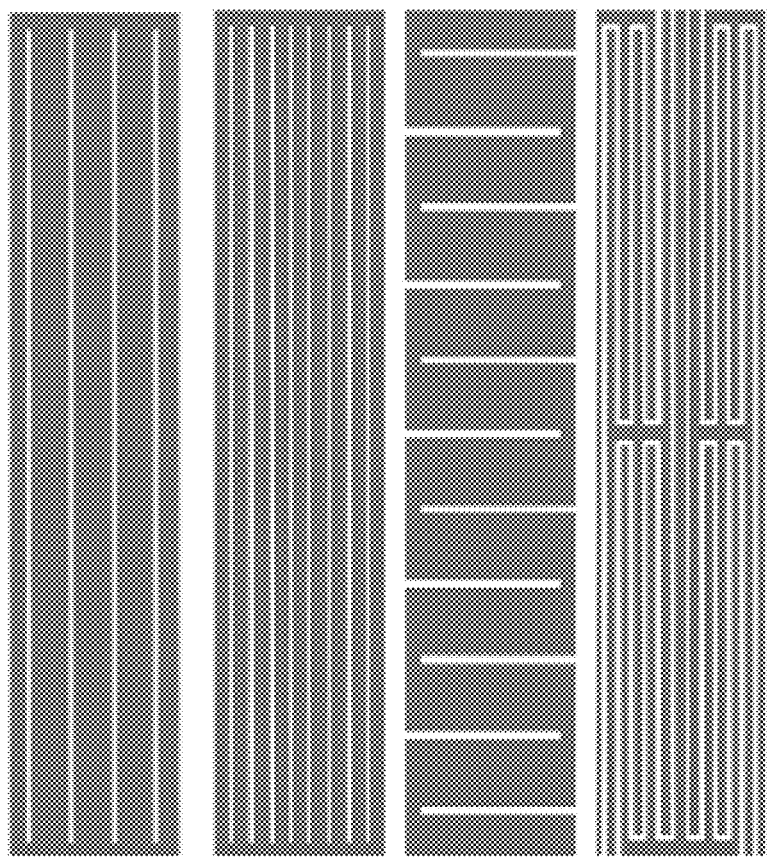
Figure 13:
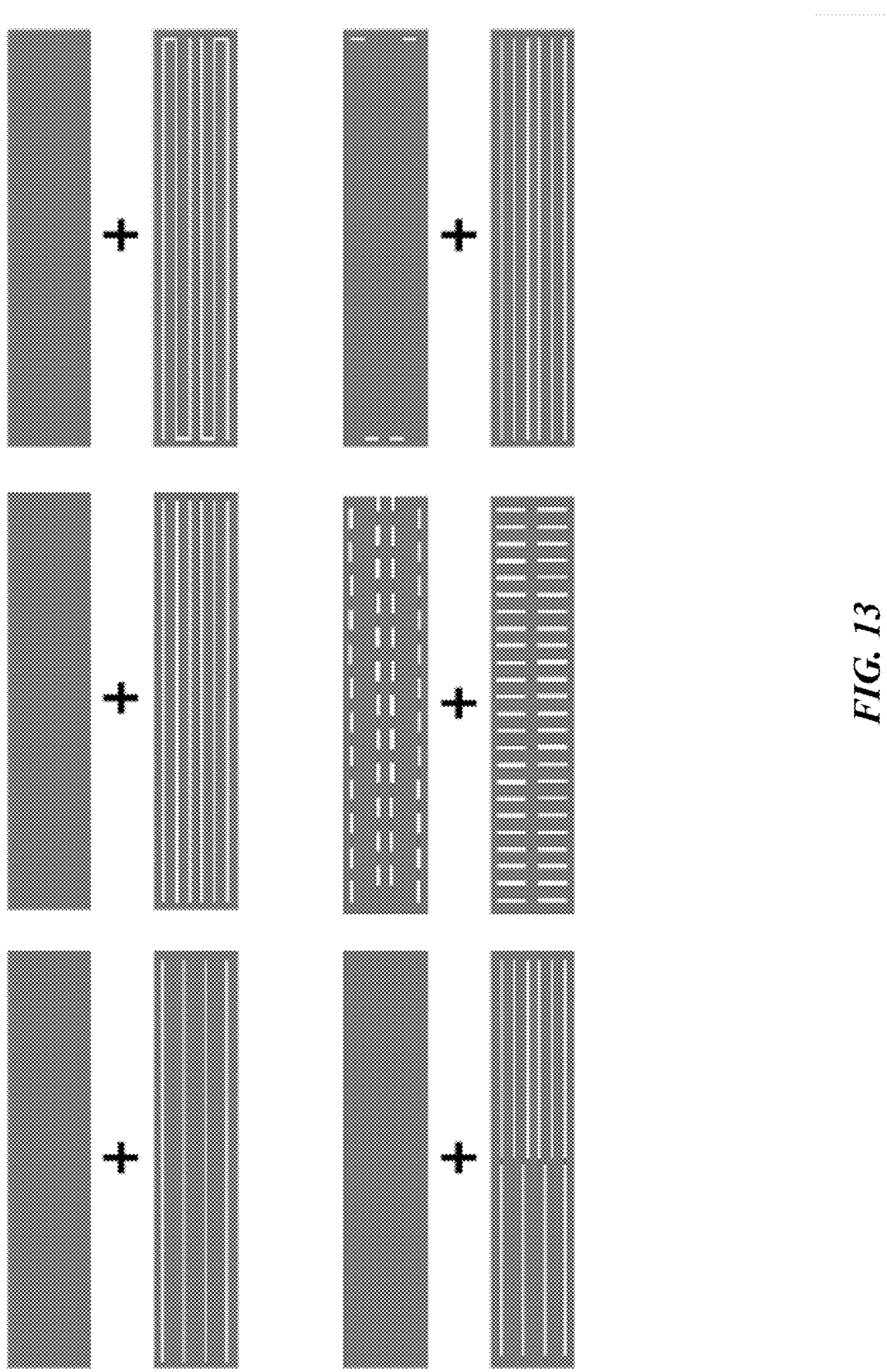
FIG. 13 schematically illustrates various examples of multi-layer anode channel designs, in accordance with some embodiments.

FIG. 12 schematically illustrates various examples of cutout configurations that may be utilized for an anode channel of a fuel cell. The cutout configurations may comprise a plurality of cutouts (e.g., openings) across a surface of the anode channel of the fuel cell. The plurality of cutouts may comprise one or more cutouts in the surface of the anode channel to reduce the buildup of nitrogen in the anode and facilitate the outflow of nitrogen from the fuel cell so that the nitrogen does not accumulate in the gas diffusion layer of the anode. In some cases, a cutout area ratio (a ratio of (i) the removed area of the cutout to (ii) the original area of the surface of the anode channel; e.g., if 20% of the original area of the surface is removed, the cutout area ratio may be 0.2) may range from about 0.01 to about 0.5. In some cases, the cutout area ratio may range from about 0.3 to about 0.7. In some cases, the cutout area ratio may range from about 0.5 to about 0.9. In some embodiments, the cutout area ratio is at least about 0.01, about 0.05, about 0.1, about 0.2, about 0.3, about 0.4, about 0.5, about 0.6, about 0.7, about 0.8, about 0.9, or any value therebetween. In some embodiments, the cutout area ratio is at most about 0.01, about 0.05, about 0.1, about 0.2, about 0.3, about 0.4, about 0.5, about 0.6, about 0.7, about 0.8, about 0.9, or any value therebetween. In some embodiments, the cutout area ratio is between 0.01 and about 0.9, between about 0.05 and about 0.8, between about 0.1 and about 0.7, between 0.2 and about 0.6, between about 0.3 and about 0.5, or between about 0.4 and about 0.9.

In some cases, the cutout configurations may comprise one or more cutouts extending across at least a portion of the surface of the anode channel. In some cases, the one or more cutouts may be parallel to each other. In other cases, the one or more cutouts may not or need not be parallel to each other. In some cases, the cutouts may comprise one or more horizontal cutouts extending along a width of the anode channel and/or one or more vertical cutouts extending along a length of the anode channel. The one or more horizontal cutouts and the one or more vertical cutouts may or may not intersect with each other. In some cases, the surface of the anode channel may comprise one or more sets of cutout configurations. The one or more sets of cutout configurations may be located on different portions or regions of the surface of the anode channel. In some cases, the one or more sets of cutout configurations may be distributed across different quadrants of the surface of the anode channel. In some cases, the one or more cutouts may be disposed at an angle relative to each other. In some cases, the one or more cutouts may be disposed at a plurality of different angles relative to each other.

In some embodiments, one or more grooves may extend into the anode channel at a depth ranging from about ⅛ to about ½ of the thickness of the anode channel. In some embodiments, the depth is at least about ⅛, about ⅐, about ⅙, about ⅕, about ¼, about ⅓, about ½, of the thickness of the anode channel, or any value therebetween. In some embodiments, the depth is at most about ⅛, about ⅐, about ⅙, about ⅕, about ¼, about ⅓, about ½, of the thickness of the anode channel, or any value therebetween. In some embodiments, the depth is between ⅛ and about ½, between about ⅐ and about ⅓, between about ⅙ and about ¼, or between ⅕ and about ½ of the thickness of the anode channel. For example, in an anode channel comprising a depth of 2 mm, the grooves may comprise a depth ranging from about 0.25 mm to about 1 mm. In some embodiments the one or more grooves may extend into the anode channel at a depth ranging from about ½ to about ⅘ of the thickness of the anode channel. In some embodiments, the depth is at least about ½, about ⅔, about ¾, about ⅘, of the thickness of the anode channel, or any value therebetween. In some embodiments, the depth is at most about ½, about ⅔, about ¾, about ⅘, of the thickness of the anode channel, or any value therebetween. In some embodiments, the depth is between ½ and about ⅘, between about ⅔ and about ¾, or between about ¾ and about ⅘ of the thickness of the anode channel.

In some cases, the one or more grooves may extend into the anode channel at a depth that is different from the thickness of the anode channel. For example, in an anode channel comprising a depth of 2 mm, the grooves may comprise a depth ranging from about 1 mm to about 1.6 mm. In some cases, the one or more grooves may extend into the anode channel at a depth that is equal to the thickness of the anode channel. In some cases, a groove area ratio (the ratio of the area of the groove to the original area of the surface of the anode channel; e.g., if 20% of the original area comprises grooves, the groove area ratio may be 0.2) may range from about 0.01 to about 0.5. In some cases, the groove area ratio may range from about 0.3 to about 0.7. In some cases, the groove area ratio may range from about 0.5 to about 0.9. In some embodiments, the groove area ratio is at least about 0.01, about 0.05, about 0.1, about 0.2, about 0.3, about 0.4, about 0.5, about 0.6, about 0.7, about 0.8, about 0.9, or any value therebetween. In some embodiments, the groove area ratio is at most about 0.01, about 0.05, about 0.1, about 0.2, about 0.3, about 0.4, about 0.5, about 0.6, about 0.7, about 0.8, about 0.9, or any value therebetween. In some embodiments, the groove area ratio is between 0.01 and about 0.9, between about 0.05 and about 0.8, between about 0.1 and about 0.7, between 0.2 and about 0.6, between about 0.3 and about 0.5, or between about 0.4 and about 0.9.

In some cases, the anode channel may comprise one or more cuts extending across at least a portion of the surface of the anode channel, one or more cutouts extending across at least a portion of the surface of the anode channel, one or more grooves extending across at least a portion of the surface of the anode channel, or any combination of cuts, cutouts and grooves.

In some cases, cuts may be preferred when a minimal cutout area ratio is preferred. In some cases, cutouts or grooves, or a combination thereof, may be preferred to achieve a higher rate of nitrogen purging (e.g., in comparison to cuts alone, which may achieve a relatively lower rate of nitrogen purging).

In some cases, combinations of one or more cuts, one or more cutouts, or one or more grooves may be employed when minimal cutout area ratios or minimal groove area ratios are preferred. In some cases, the minimal cutout area ratio or groove area ratio may be less than 0.1. In some cases, the minimal cutout or groove area ratio may be less than 0.2. In some cases, the minimal cutout or groove area ratio may be less than 0.5.

In some cases, the anode channel may include both cuts and cutouts that extend into the anode channel at the same depth. In some cases, the anode channel may include both cuts and cutouts that extend into the anode channel at different depths.

In some cases, the cuts, cutouts, and grooves may be manufactured using one or more methods comprising at least one of stamping, laser cutting, engraving, chemical etching, and embossing. In some cases, the material removed by the cutouts may be recycled and used to form one or more channels in the one or more fuel cells.

In some cases, the fuel cell comprises a plurality of channels in fluid communication with the anode. The plurality of channels can be stacked in layers that are adjacent to one another. FIG. 6 schematically illustrates various examples of multi-layer anode channel designs that can be implemented to enhance fuel cell performance when the fuel cell is used to process a gaseous mixture of hydrogen and nitrogen to generate electrical energy. The multi-layer anode channel may comprise a plurality of layers. The plurality of layers may comprise at least a first layer and a second layer. At least one of the first layer and the second layer may comprise one or more cuts and/or one or more cutouts. In some cases, a first layer of the plurality of layers may not have any cuts or cutouts. In such cases, a second layer of the plurality of layers may comprise one or more cuts and/or one or more cutouts. In some cases, each of the first layer and the second layer may comprise one or more cuts and/or one or more cutouts. The cuts or cutouts of the first layer may or may not be aligned with the cuts or cutouts of the second layer. In some cases, the first layer may comprise a first set of cuts or cutouts and the second layer may comprise a second set of cuts or cutouts. The first and second sets of cuts or cutouts may or may not overlap each other. In some cases, the first and second sets of cuts or cutouts may comprise different patterns of cuts or cutouts. In some cases, the first and second sets of cuts or cutouts may comprise a combination of horizontal and vertical cuts or cutouts. In some cases, the first set of cuts or cutouts may comprise a plurality of horizontal cuts or cutouts, and the second set of cuts or cutouts may comprise a plurality of vertical cuts or cutouts. In some cases, the first set of cuts or cutouts may comprise a plurality of vertical cuts or cutouts, and the second set of cuts or cutouts may comprise a plurality of horizontal cuts or cutouts. At least one channel of the plurality of channels may not comprise (i.e., may lack) the one or more features comprising cuts, cutouts, and/or grooves.

As described above, in some cases, the one or more cuts and/or the one or more cutouts may extend across at least a portion of the surface of the anode channel. In some cases, the one or more cuts and/or the one or more cutouts may be parallel to each other. In other cases, the one or more cuts and/or the one or more cutouts may not or need not be parallel to each other. In some cases, the one or more cuts and/or the one or more cutouts may comprise one or more horizontal cuts or cutouts extending along a width of the anode channel and/or one or more vertical cuts or cutouts extending along a length of the anode channel. The one or more horizontal cuts or cutouts and the one or more vertical cuts or cutouts may or may not intersect with each other. In some cases, the surface of the anode channel may comprise one or more sets of cut configurations or cutout configurations. The one or more sets of cut configurations or cutout configurations may be located on different portions or regions of the surface of the anode channel. In some cases, the one or more sets of cut configurations or cutout configurations may be distributed across different quadrants of the surface of the anode channel. In some cases, the one or more cuts or cutouts may be disposed at an angle relative to each other. In some cases, the one or more cuts or cutouts may be disposed at a plurality of different angles relative to each other. In some cases, the one or more surface features may comprise one or more cuts or grooves on a surface of the one or more anode channels. The one or more cuts or grooves may extend across a portion of the surface of the one or more anode channels. In some cases, the one or more cuts or grooves may comprise two or more cuts or grooves that are parallel to each other. In other cases, the one or more cuts or grooves may comprise two or more cuts or grooves that are perpendicular to each other. In some cases, the one or more cuts or grooves may comprise two or more cuts or grooves that are disposed at an angle relative to each other. The angle may range from 0 degrees to about 90 degrees. In some cases, the angle may range from 0 degrees to about 45 degrees. In some cases, the angle may range from 0 degrees to about 30 degrees. In some cases, the angle may range from 0 degrees to about 15 degrees. In some cases, the one or more cuts or grooves may comprise two or more cuts or grooves that intersect with each other. In other cases, the one or more cuts or grooves may comprise two or more cuts or grooves that do not intersect.

In some cases, the one or more surface features may comprise one or more cutouts or openings on a surface of the one or more channels. The one or more cutouts or openings may extend across a portion of the surface of the one or more channels. In some cases, the one or more cutouts or openings may comprise two or more cutouts or openings that are parallel to each other. In other cases, the one or more cutouts or openings may comprise two or more cutouts or openings that are perpendicular to each other. In some cases, the one or more cutouts or openings may comprise two or more cutouts or openings that are disposed at an angle relative to each other. The angle may range from 0 degrees to about 90 degrees. In some cases, the angle may range from 0 degrees to about 45 degrees. In some cases, the angle may range from 0 degrees to about 30 degrees. In some cases, the angle may range from 0 degrees to about 15 degrees. In some cases, the one or more cutouts or openings may comprise two or more cuts or grooves that intersect with each other. In other cases, the one or more cutouts or openings may comprise two or more cutouts or openings that do not intersect.

In some embodiments, the gas diffusion layer of the anode may comprise one or more layers. In some cases, the one or more layers may comprise two or more layers. At least one layer of the two or more layers may comprise the one or more surface features. The one or more surface features may comprise (i) one or more cuts or grooves and/or (ii) one or more cutouts or openings. In some cases, the two or more layers may comprise a first layer comprising a first set of surface features and a second layer comprising a second set of surface features. In some cases, the first set of features and the second set of features may comprise a same or similar set of features. In other cases, the first set of features and the second set of features may comprise different sets of features. In some cases, the first set of features and the second set of features may overlap or partially overlap. In other cases, the first set of features and the second set of features may not or need not overlap.

In some cases, the anode gas diffusion layer may comprise a felt, a foam, a cloth, or a paper material. The felt, the foam, cloth, or the paper material may comprise, for example, graphite or another carbon-based material (e.g., carbon fibers). In some cases, the felt, the foam, the cloth, or the paper material may comprise a carbon felt, which may have similar features, properties, or characteristics with a cotton material. Alternatively, the felt, the foam, the cloth, or the paper material may comprise a carbon paper, which may have similar features, properties, or characteristics to with a sheet of paper. In some cases, the felt, the foam, the cloth, or the paper material may comprise polytetrafluoroethylene (PTFE)-based material. In some cases, the felt, the foam, the cloth, or the paper material may comprise both carbon-based material and PTFE-based material. In some cases, the felt, the foam, the cloth, or the paper material may comprise hydrophobic properties with a water contact angle greater than about 90 degrees. In some cases, the felt, the foam, the cloth, or the paper material may comprise hydrophilic properties with a water contact angle less than about 90 degrees. In some cases, at least one part of the felt, the foam, the cloth, or the paper material may comprise hydrophobic properties and at least one other part of the felt, the foam, the cloth, or the paper material may comprise hydrophilic properties. The felt, foam, cloth, or paper materials may be porous, and may comprise different properties such as porosity, pore sizes, density, brittleness, and flexibility. In some cases, the felt, the foam, the cloth, or the paper material may conduct electrical currents. In some cases, the felt, the foam, the cloth, or the paper material may comprise at least one of surface texture, porosity, or pore size that is different between a first side and a second side. In some cases, the first side is front or top side and the second side is bottom or back side. In some cases, the first side faces the electrolyte and the second side faces the outside of the fuel cell. In some instances, a denser material may provide better performance for the anode gas diffusion layer. In some instances, a material that is too dense may increase gas diffusion or transport resistance. In some instances, a thinner material may provide better performance for the anode gas diffusion layer by decreasing gas diffusion or transport resistance. In some instances, a thinner material is preferred to increase the power density of the fuel cell. In some instances, a material that is too thin may increase gas diffusion or transport resistances. It is noted herein that the anode diffusion layer may comprise materials that are not felt, foam, paper, cloth, carbon-based materials, or PTFE-based material.

In cases where a single layer design is utilized, the material for the gas diffusion layer may need to be porous in order to diffuse hydrogen through the gas diffusion layer. In cases where a multi-layer design is utilized, the membrane side of the gas diffusion layer may comprise a porous sheet material and the current collecting side (where the channels are placed) may comprise any current conducting sheet material, such as a metal, copper, nickel, zinc, platinum, aluminum, steel, titanium, gold, or carbon-based material. In some cases, current conducting sheet may comprise any current conducting sheet material with one or more coatings of different current conducting materials.

In some cases, the felt, the foam, the cloth, or the paper material may comprise a carbon paper. The carbon paper may be manufactured by burning a carbon-based polymer sheet. The carbon felt, foam, cloth, or paper material may not or need not comprise a crystalline structure.

Fuel Cell Exit Flow

In some cases, exit flows may exit one or more fuel cells. The exit flow from the fuel cells may comprise $H_2$, $N_2$, $O_2$, and/or one or more reaction byproducts (e.g., water). An exit flow from the anode channel can comprise $H_2$, $N_2$, ammonia (e.g., trace ammonia from ammonia reforming), water, or any combination thereof. An exit flow from the cathode channel can comprise $O_2$, $N_2$, water, or any combination thereof. In some cases, the fuel cell exit flow may comprise unconverted hydrogen from the fuel cells (hydrogen that is not consumed by the fuel cell and that is not converted into protons and electrons at the electrolyte membrane). In some cases, the fuel cell exit flow may comprise unconverted hydrogen from the exit flow of the anode channel of the fuel cells (an anode offgas). In some cases, the unconverted hydrogen may be directed back to the one or more reactors for combustion heating to heat the reactors for further ammonia decomposition. In some cases, the fuel cell exit flow may comprise unconverted hydrogen from the fuel cells, unconverted ammonia from the reactors, or unadsorbed ammonia from the adsorption towers. In some cases, the unconverted hydrogen from the fuel cells and the unconverted or unadsorbed ammonia from the reactors or the adsorption towers may be directed back to the one or more reactors for combustion heating to heat the reactors for further ammonia decomposition. In some cases, the unconverted $O_2$ from the exit flow of the cathode channel may be directed to the one or more reactors for combustion heating to heat the reactors for ammonia decomposition.

In some cases, a stream exiting one or more fuel cells may comprise a volume fraction, a molar fraction, or a partial pressure fraction of hydrogen at most about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, or 0.9. In some cases, a stream exiting one or more fuel cells may comprise a volume fraction, a molar fraction, or a partial pressure fraction of hydrogen ranging from at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, or 0.9. In some cases, a stream exiting one or more fuel cells may comprise a volume fraction, a molar fraction, or a partial pressure fraction of hydrogen ranging from 0.5 to 0.8. In some cases, a stream exiting one or more fuel cells may comprise a volume fraction, a molar fraction, or a partial pressure fraction of hydrogen ranging from 0.4 to 0.7. In some cases, a stream exiting one or more fuel cells may comprise a volume fraction, a molar fraction, or a partial pressure fraction of hydrogen ranging from 0.3 to 0.6. In some cases, a stream exiting one or more fuel cells may comprise a volume fraction, a molar fraction, or a partial pressure fraction of hydrogen ranging from 0.2 to 0.5. In some cases, a stream exiting one or more fuel cells may comprise a volume fraction, a molar fraction, or a partial pressure fraction of hydrogen ranging from 0.1 to 0.4. In some cases, a stream exiting one or more fuel cells may comprise a volume fraction, a molar fraction, or a partial pressure fraction of hydrogen ranging from 0.05 to 0.3. In some cases, a stream exiting one or more fuel cells may comprise a volume fraction, a molar fraction, or a partial pressure fraction of hydrogen ranging from 0.3 to 0.4.

In some cases, a stream exiting one or more fuel cells may comprise a volume fraction, a molar fraction, or a partial pressure fraction of nitrogen ranging from at most about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 0.91, 0.92, 0.93, 0.94, 0.95, 0.96, 0.97, 0.98, 0.99, 0.991, 0.992, 0.993, 0.994, 0.995, 0.996, 0.997, 0.998, or 0.999. In some cases, a stream exiting one or more fuel cells may comprise a volume fraction, a molar fraction, or a partial pressure fraction of nitrogen ranging from at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 0.91, 0.92, 0.93, 0.94, 0.95, 0.96, 0.97, 0.98, 0.99, 0.991, 0.992, 0.993, 0.994, 0.995, 0.996, 0.997, 0.998, or 0.999. In some cases, a stream exiting one or more fuel cells may comprise a volume fraction, a molar fraction, or a partial pressure fraction of nitrogen ranging from 0.1 to 0.4. In some cases, a stream exiting one or more fuel cells may comprise a volume fraction, a molar fraction, or a partial pressure fraction of nitrogen ranging from 0.3 to 0.6. In some cases, a stream exiting one or more fuel cells may comprise a volume fraction, a molar fraction, or a partial pressure fraction of nitrogen ranging from 0.5 to 0.8. In some cases, a stream exiting one or more fuel cells may comprise a volume fraction, a molar fraction, or a partial pressure fraction of nitrogen ranging from 0.6 to 0.9. In some cases, a stream exiting one or more fuel cells may comprise a volume fraction, a molar fraction, or a partial pressure fraction of nitrogen ranging from 0.4 to 0.6. In some cases, a stream exiting one or more fuel cells may comprise at least two of hydrogen, nitrogen, water, or oxygen.

In some cases, a stream exiting one or more fuel cells may comprise a volume fraction, a molar fraction, or a partial pressure fraction of ammonia ranging from at most about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, or 0.9. In some cases, a stream exiting one or more fuel cells may comprise a volume fraction, a molar fraction, or a partial pressure fraction of ammonia ranging from at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, or 0.9.

In some cases, a plurality of streams comprising unconverted hydrogen may exit from the one or more fuel cells, one or more fuel cell stacks, or one or more fuel cell modules. In some cases, the plurality of streams exiting from the one or more fuel cells, one or more fuel cell stacks, or one or more fuel cell modules may be directed to the one or more combustion heaters of the ammonia reformer. In some cases, the plurality of streams exiting from the one or more fuel cells, one or more fuel cell stacks, or one or more fuel cell modules have at least one stream that is different in flow rate, hydrogen mole fraction, nitrogen mole fraction, or water mole fraction from the other exit streams. In some cases, a plurality of streams exit from the one or more fuel cells, one or more fuel cell stacks, one or more fuel cell modules comprise flow rates within a selected tolerance based on a target flow rate (e.g., target flow rate to a single fuel cell, fuel cell stack, or fuel cell module). In some cases, the selected tolerance is at least about 10, 20, 30, 40, 50, 60, 70, 80, 90, 100, 200, 300, 400, or 500%. In some cases, the selected tolerance is at most about 10, 20, 30, 40, 50, 60, 70, 80, 90, 100, 200, 300, 400, or 500%.

In some cases, one or more streams exiting the one or more fuel cells, one or more fuel cell stacks, or one or more fuel cell modules may pass through one or more water collectors or condensers. In some cases, the one or more water collectors or condensers remove at least portion of water in the one or more streams exiting the one or more fuel cells, one or more fuel cell stacks, or one or more fuel cell modules. In some cases, the one or more water collectors or condensers remove at least portion of water in the one or more streams exiting the one or more fuel cells, one or more fuel cell stacks, or one or more fuel cell modules before providing the one or more streams exiting the one or more fuel cells, one or more fuel cell stacks, or one or more fuel cell modules to the one or more combustion heaters of the ammonia reformer. In some cases, the one or more streams exiting the one or more fuel cells, one or more fuel cell stacks, or one or more fuel cell modules comprise $H_2$, $N_2$, water, or $O_2$.

Computer Systems

Figure 14:
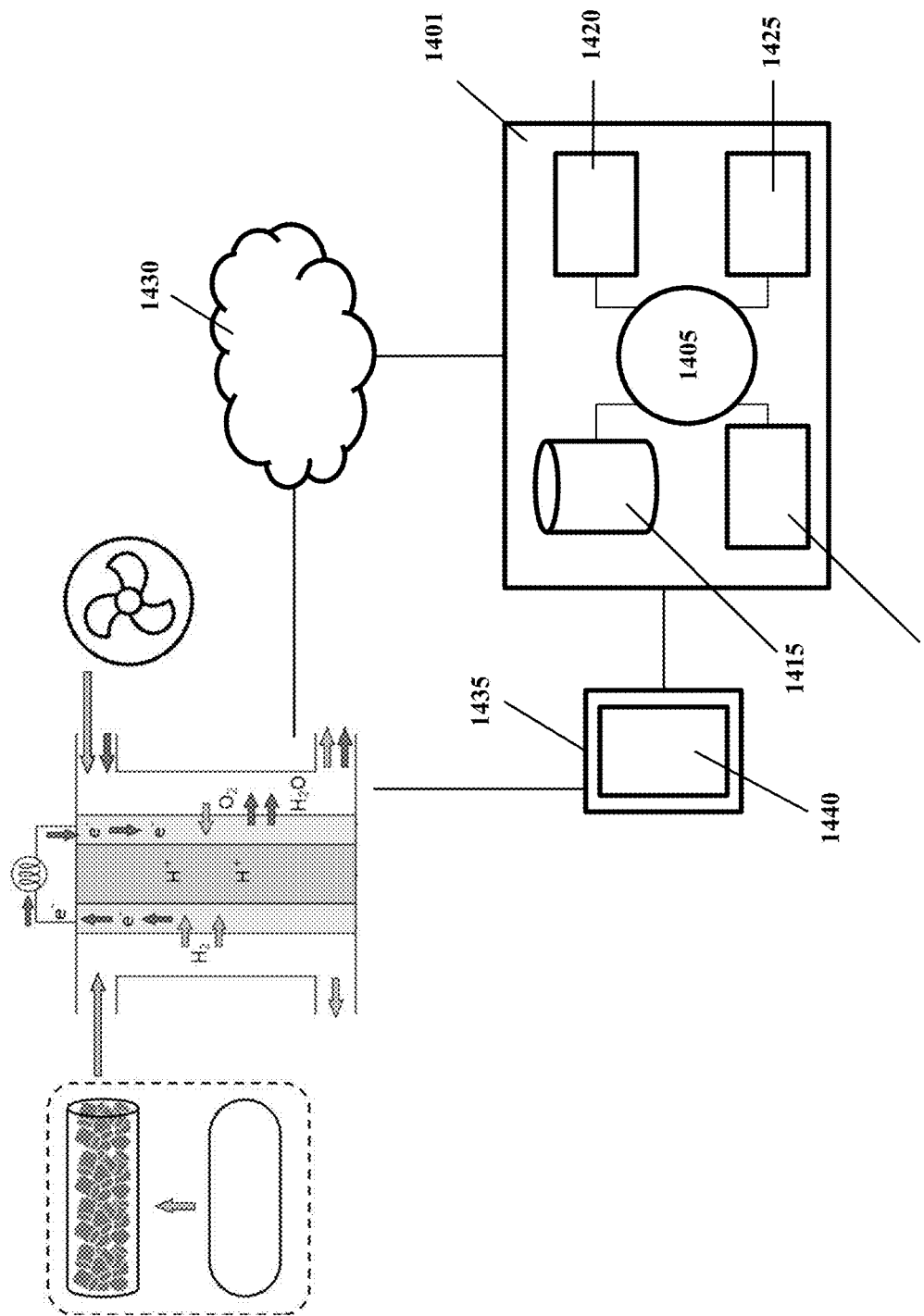
FIG. 14 schematically illustrates a computer system that is programmed or otherwise configured to implement methods provided herein.

In an aspect, the present disclosure provides computer systems that are programmed or otherwise configured to implement methods of the disclosure. FIG. 14 shows a computer system 1401 that is programmed or otherwise configured to implement a method for processing hydrogen and/or mixtures of hydrogen and nitrogen. In some embodiments, the computer system is configured to operate the fuel cell to allow purging of nitrogen from the fuel cell while the fuel cell is generating electricity. In some embodiments, the computer system is configured to operate the fuel cell to allow continuous purging of nitrogen. The computer system 1401 may be configured to, for example, (i) control a flow of a source material comprising hydrogen and nitrogen to one or more fuel cells and (ii) control an operation of the one or more fuel cells to process the source material to generate electricity (e.g., an electrical current). The computer system 1401 can be an electronic device of a user or a computer system that is remotely located with respect to the electronic device. The electronic device can be a mobile electronic device.

The computer system 1401 may include a central processing unit (CPU, also "processor" and "computer processor" herein) 1405, which can be a single core or multi core processor, or a plurality of processors for parallel processing. The computer system 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The computer system 1401 can be operatively coupled to a computer network ("network") 1430 with the aid of the communication interface 1420. The network 1430 can be the Internet, an internet and/or extranet, or an intranet and/or extranet that is in communication with the Internet. The network 1430 in some cases is a telecommunication and/or data network. The network 1430 can include one or more computer servers, which can enable distributed computing, such as cloud computing. The network 1430, in some cases with the aid of the computer system 1401, can implement a peer-to-peer network, which may enable devices coupled to the computer system 1401 to behave as a client or a server.

The CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and writeback.

The CPU 1405 can be part of a circuit, such as an integrated circuit. One or more other components of the system 1401 can be included in the circuit. In some cases, the circuit is an application specific integrated circuit (ASIC).

The storage unit 1415 can store files, such as drivers, libraries and saved programs. The storage unit 1415 can store user data, e.g., user preferences and user programs. The computer system 1401 in some cases can include one or more additional data storage units that are located external to the computer system 1401 (e.g., on a remote server that is in communication with the computer system 1401 through an intranet or the Internet).

The computer system 1401 can communicate with one or more remote computer systems through the network 1430. For instance, the computer system 1401 can communicate with a remote computer system of a user (e.g., an individual operating a reactor from which the source material comprising hydrogen and nitrogen is produced, an entity monitoring the operation of the reactor or one or more fuel cells operatively coupled to the reactor, or an end user operating a device or a vehicle that can be powered using electrical energy derived or produced from the source material using the one or more fuel cells). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1401 via the network 1430.

Methods as described herein can be implemented by way of machine (e.g., computer processor) executable code stored on an electronic storage location of the computer system 1401, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1401 can include or be in communication with an electronic display 1435 that comprises a user interface (UI) 1440 for providing, for example, a portal for a user to monitor or track an operation or a performance of the one or more fuel cells. In some cases, the performance of the one or more fuel cells may comprise, for example, a voltage of the electrical current generated using the one or more fuel cells. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1405. For example, the algorithm may be configured to control an operation of the one or more fuel cells based on one or more sensor readings (e.g., temperature measurements, flow rates, etc.), based on a power demand, or based on a performance of the one or more fuel cells. The algorithm can be configured to operate the fuel cell to allow purging of nitrogen from the fuel cell while the fuel cell is generating electricity, or to operate the fuel cell to allow continuous purging of nitrogen.

Vehicles

In some cases, the one or more fuel cells may be adapted for use on an aerial vehicle. The aerial vehicle may comprise, for example, a manned aerial vehicle, an unmanned aerial vehicle, or a drone. In some cases, the fuel cells may be integrated into a body of the aerial vehicle. In other cases, the fuel cells may be placed on top of or underneath a body of the aerial vehicle. In some cases, the fuel cells may be electrically coupled to a motor or an engine of the aerial vehicle.

In some cases, the one or more fuel cells may be adapted for use on a terrestrial vehicle, such as a car, a farming vehicle, or an automobile. The one or more fuel cells may be placed in or near a front portion of the terrestrial vehicle (e.g., in an engine bay of the vehicle). The one or more fuel cells may be placed in or near an underside region of the terrestrial vehicle. The one or more fuel cells may be placed near a rear end of the terrestrial vehicle. In some cases, the one or more fuel cells may be placed near an axle of the terrestrial vehicle (e.g., a front wheel axle and/or a rear wheel axle of the vehicle). In some cases, the fuel cells may be electrically coupled to a motor or an engine of the terrestrial vehicle.

In some cases, the one or more fuel cells may be adapted for use on a terrestrial vehicle, such as a truck or a semi-trailer truck. In some cases, the one or more fuel cells may be coupled to or integrated into a rear portion of a tractor unit of the truck. The tractor unit (also known as a prime mover, truck, semi-truck, semi-tractor, rig, big rig, or simply, a tractor) may comprise a heavy-duty towing engine that provides motive power for hauling a towed or trailered-load. In some cases, the one or more fuel cells may be positioned in or near a front portion of the tractor unit (e.g., in the engine bay of the tractor unit). In other cases, the one or more fuel cells may be placed in or near an underside region of the tractor unit. In some cases, the plurality of fuel cells may be distributed along the underside of the tractor unit. In some cases, one or more of the fuel cells may be placed near an axle (e.g., a front axle) of the tractor unit.

In some cases, the one or more fuel cells may be adapted for use in a marine vehicle. The marine vehicle may comprise, for example, a manned marine vehicle, an unmanned marine vehicle, a boat, or a ship. In some cases, the fuel cells may be integrated into a body of the marine vehicle. In other cases, the fuel cells may be placed on top of or underneath a body of the marine vehicle. In some cases, the fuel cells may be electrically coupled to a motor or an engine of the marine vehicle. In some cases, the fuel cells may provide a back-up power of the marine vehicle. In some cases, the one or more fuel cells may be adapted for use in a submarine vehicle. In some cases, the fuel cells may be electrically coupled to a motor or an engine of the submarine vehicle.

In some cases, a vehicle may comprise a plurality of fuel cells. In some cases, the plurality of fuel cell modules may be positioned adjacent to each other. In other cases, the plurality of fuel cell modules may be located remote from each other (i.e., in or on different sides, regions, or sections of a vehicle). In some cases, the plurality of fuel cell modules may be oriented in a same direction. In other cases, at least two of the plurality of fuel cell modules may be oriented in different directions. In any of the embodiments described herein, the plurality of fuel cell modules may be positioned and/or oriented appropriately to maximize volumetric efficiency and minimize a physical footprint of the plurality of fuel cell modules. In any of the embodiments described herein, the plurality of fuel cell modules may be positioned and/or oriented to conform with a size and/or a shape of the vehicle in or on which the fuel cell modules are placed or provided. In any of the embodiments described herein, the plurality of fuel cell modules may be positioned and/or oriented to conform with a size and/or a shape of the vehicle to which the fuel cell modules are coupled or mounted.

In any of the embodiments described herein, the fuel cell modules may be placed in or on different sides, regions, or sections of a vehicle. The fuel cell modules may be positioned and/or oriented appropriately to maximize volumetric efficiency and minimize a physical footprint of the fuel cell modules. The fuel cell modules may be positioned and/or oriented to conform with a size and/or a shape of the vehicle in or on which the fuel cell modules are placed or provided. The fuel cell modules may be positioned and/or oriented to conform with a size and/or a shape of the vehicle to which the fuel cell modules are coupled or mounted.

NUMBERED EMBODIMENTS

Embodiment 1. A method for generating electricity using a fuel cell, comprising: reacting, using an ammonia reformer, ammonia to generate a first continuous stream comprising nitrogen and hydrogen, wherein the ammonia reformer is in fluid communication with the fuel cell, the fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features configured to (i) increase a hydrogen consumption rate of the fuel cell, or (ii) increase an output voltage of the fuel cell at a same hydrogen consumption rate, when the first continuous stream contacts the anode compared to an equivalent fuel cell lacking the one or more features, wherein the one or more features comprise (1) one or more cuts, (2) one or more cutouts, (3) one or more grooves, or (4) any combination thereof; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power.

Embodiment 2. The method of embodiment 1, wherein the one or more features increase the hydrogen consumption rate of the fuel cell when the first continuous stream contacts the anode compared to the equivalent fuel cell lacking the one or more features.

Embodiment 3. The method of embodiment 2, wherein the one or more features increase the hydrogen consumption rate by at least 5, 10, 20, 40, 60, 80, 100, 120, 140, 160, 180, or 200%.

Embodiment 4. The method of embodiment 2 or 3, wherein the one or more features increase the hydrogen consumption rate by at most 5, 10, 20, 40, 60, 80, 100, 120, 140, 160, 180, or 200%.

Embodiment 5. The method of any one of embodiments 1-4, wherein the one or more features increase the output voltage at the same hydrogen consumption rate when the first continuous stream contacts the anode compared to the equivalent fuel cell lacking the one or more features.

Embodiment 6. The method of embodiment 5, wherein the one or more features increase the voltage by at least 5, 10, 20, 40, 60, 80, 100, 120, 140, 160, 180, or 200%.

Embodiment 7. The method of embodiment 5 or 6, wherein the one or more features increase the hydrogen consumption rate by at most 5, 10, 20, 40, 60, 80, 100, 120, 140, 160, 180, or 200%.

Embodiment 8. The method of any one of embodiments 1-7, wherein the one or more features continuously purge nitrogen out of the fuel cell.

Embodiment 9. The method of embodiment 8, wherein the nitrogen is continuously purged out of the first channel by the one or more features so that nitrogen accumulation is reduced in the first channel, thereby increasing the hydrogen consumption rate compared to the equivalent fuel cell lacking the one or more features.

Embodiment 10. The method of any one of embodiments 1-9, wherein the hydrogen consumption rate of the fuel cell when the first continuous stream contacts the anode is at least about 10, 20, 30, 40, 50, 60, 70, 80, 90, or 99% of the hydrogen in the first continuous stream.

Embodiment 11. The method of any one of embodiments 1-10, wherein the hydrogen consumption rate of the fuel cell when the first continuous stream contacts the anode is at most about 10, 20, 30, 40, 50, 60, 70, 80, 90, or 99% of the hydrogen in the first continuous stream.

Embodiment 12. The method of any one of embodiments 1-11, further comprising intermittently reducing the hydrogen consumption rate to purge out at least one of hydrogen, nitrogen, or water.

Embodiment 13. The method of any one of embodiments 1-12, further comprising reducing the hydrogen consumption rate and directing at least a part of the first continuous stream to the ammonia reformer.

Embodiment 14. The method of any one of embodiments 1-13, further comprising reducing the hydrogen consumption rate of the fuel cell to zero and directing at least a part of the first continuous stream to the ammonia reformer.

Embodiment 15. The method of embodiment 13 or 14, further comprising flaring the at least the part of the first continuous stream directed to the ammonia reformer at one or more combustion exhausts of one or more combustion heaters, wherein the one or more combustion heaters are in operable communication with the ammonia reformer for heating the ammonia reformer, and wherein the one or more combustion heaters are in fluidic communication with the fuel cell to receive the at least the part of the first continuous stream.

Embodiment 16. A method for generating electricity using a fuel cell, comprising: reacting, using an ammonia reformer, ammonia to generate a first continuous stream comprising nitrogen and hydrogen, wherein the ammonia reformer is in fluid communication with the fuel cell, the fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power; wherein the fuel cell is configured to provide a ratio of an electrical power output of the fuel cell to a projected surface area of the anode that is at least about 0.05 W/cm$^2$ when the first continuous stream comprises about 25% nitrogen and about 75% hydrogen by moles, and the second continuous stream comprises at least 20% oxygen by moles.

Embodiment 17. The method of embodiment 16, wherein the ratio is at least about 0.1, 0.15, 0.2, 0.25, 0.3, 0.35, or 0.4 W/cm$^2$.

Embodiment 18. The method of embodiment 16 or 17, wherein the ratio is at most about 0.1, 0.15, 0.2, 0.25, 0.3, 0.35, or 0.4 W/cm$^2$.

Embodiment 19. The method of any one of embodiments 16-18, wherein the ratio is based on the first continuous stream comprising a hydrogen flow rate of at least about 0.001, 0.01, 0.1, 1, 10, 100, 1000, 10000, or 100000 mole per second.

Embodiment 20. The method of any one of embodiments 16-19, wherein the ratio is based on the second continuous stream comprising an oxygen flow rate of at least about 0.0001, 0.001, 0.01, 0.1, 1, 10, 100, 1000, 10000, 100000, 1000000 mole per second.

Embodiment 21. The method of any one of embodiments 16-20, wherein the ratio is based on the second continuous stream comprising air.

Embodiment 22. The method of any one of embodiments 16-21, wherein the ratio is based on the first continuous stream comprising the hydrogen and the nitrogen from the ammonia reformer.

Embodiment 23. The method of any one of embodiments 16-22, wherein the anode projected surface area comprises the largest possible surface area of the anode projected onto a flat plane.

Embodiment 24. The method of any one of embodiments 16-23, wherein the anode projected surface area comprises a surface area of the largest surface of the anode.

Embodiment 25. A method for generating electricity using a fuel cell, comprising: reacting, using an ammonia reformer, ammonia to generate a first continuous stream comprising nitrogen and hydrogen, wherein the ammonia reformer is in fluid communication with a fuel cell, the fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power that is at least 50% of a reference electrical power, wherein the reference electrical power is generated using the fuel cell receiving a stream comprising at least 99% hydrogen by moles into the first inlet, wherein the electrical power is generated at a same current or a same hydrogen consumption rate as the reference electrical power.

Embodiment 26. The method of embodiment 25, wherein the electrical power is at least 60, 70, 80, 90, 91, 92, 93, 94, 95, 96, 97, 98, or 99% of the reference electrical power.

Embodiment 27. The method of embodiment 25 or 26, wherein the electrical power is at most 60, 70, 80, 90, 91, 92, 93, 94, 95, 96, 97, 98, or 99% of the reference electrical power.

Embodiment 28. A method for generating electricity using a fuel cell, comprising: reacting, using an ammonia reformer, ammonia to generate a first continuous stream comprising nitrogen and hydrogen, wherein the ammonia reformer is in fluid communication with a fuel cell, wherein the fuel cell comprises: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof, wherein the one or more features comprise a depth less than 10 mm; and a second channel comprising a second inlet and a second outlet, wherein the second channel is in fluid communication with the cathode; and directing the first continuous stream into the first channel via the first inlet so that the hydrogen contacts the anode; directing a second continuous stream comprising oxygen into the second channel via the second inlet so that the oxygen contacts the cathode; and reacting the hydrogen and the oxygen, using the fuel cell, to generate electrical power.

Embodiment 29. The method of embodiment 28, wherein the one or more features comprises a depth less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

Embodiment 30. The method of embodiment 28 or 29, wherein the one or more features comprises a depth greater than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

Embodiment 31. The method of any one of embodiments 28-30, wherein the depth is at least $1/32$, $1/16$, $1/8$, $1/4$, $1/2$, $3/4$, $7/8$, $15/16$, or $31/32$ of the thickness of the first channel.

Embodiment 32. The method of any one of embodiments 28-31, wherein the depth is at most $1/32$, $1/16$, $1/8$, $1/4$, $1/2$, $3/4$, $7/8$, $15/16$, or $31/32$ of the thickness of the first channel.

Embodiment 33. The method of any one of embodiments 28-32, wherein the first channel comprises a ratio of a first projected surface area of the one or more features to a second projected surface area of the first channel that is at least 0.1, 0.2, 0.3, 0.4, 0.5, 0.6, 0.7, 0.8, or 0.9.

Embodiment 34. The method of any one of embodiments 28-33, wherein the first channel comprises a ratio of a first projected surface area of the one or more features to a second projected surface area of the first channel that is at most 0.1, 0.2, 0.3, 0.4, 0.5, 0.6, 0.7, 0.8, or 0.9.

Embodiment 35. The method of any one of embodiments 1-34, wherein the one or more features comprise two or more features.

Embodiment 36. The method of embodiment 35, wherein at least a first segment of a first feature of the two or more features is substantially parallel to a second segment of a second feature of the two or more features.

Embodiment 37. The method of embodiment 35, wherein at least a first segment of a first feature of the two or more features is substantially perpendicular to a second segment of a second feature of the two or more features.

Embodiment 38. The method of embodiment 35, wherein at least a first segment of a first feature of the two or more features is at an angle to a second segment of a second feature of the two or more features, wherein the angle is between 0 and 90 degrees, between 15 and 75 degrees, between 0 and 30 degrees, or between 30 and 60 degrees.

Embodiment 39. The method of any one of embodiments 35-38, wherein the two or more features are connected.

Embodiment 40. The method of any one of embodiments 35-38, wherein the two or more features are disconnected.

Embodiment 41. The method of any one of embodiments 35-38, wherein the two or more features intersect.

Embodiment 42. The method of any one of embodiments 1-41, wherein the one or more features comprise a serpentine shape.

Embodiment 43. The method of any one of embodiments 1-42, wherein the one or more features are substantially parallel with the longest side of the first channel.

Embodiment 44. The method of any one of embodiments 1-42, wherein the one or more features are substantially parallel with the shortest side of the first channel.

Embodiment 45. The method of any one of embodiments 1-44, wherein the fuel cell comprises a plurality of channels in fluid communication with the anode, wherein the plurality of channels comprise the first channel.

Embodiment 46. The method of embodiment 45, wherein the plurality of channels comprises a stack of layers that are adjacent to one another.

Embodiment 47. The method of embodiment 45 or 46, wherein at least one channel in the plurality of channels does not comprise or lacks the one or more features comprising (i) one or more cuts, (ii) one or more cutouts, (iii) one or more grooves, or (iv) any combination thereof.

Embodiment 48. The method of any one of embodiments 1-47, wherein the one or more features are further configured to facilitate purging of a select material from the anode gas diffusion layer, wherein the select material comprises one or more of nitrogen, ammonia, water, or one or more impurities.

Embodiment 49. The method of embodiment 48, wherein the fuel cell further comprises one or more exit ports for discharging the select material and unconverted hydrogen from the fuel cell.

Embodiment 50. The method of any one of embodiments 1-49, wherein the first channel comprises a felt, a foam, a cloth, or a paper material.

Embodiment 51. The method of embodiment 50, wherein the felt, the foam, the cloth, or the paper material is a carbon-based material.

Embodiment 52. The method of any one of embodiments 1-51, wherein the one or more features extend across at least a portion of the surface of the first channel.

Embodiment 53. The method of any one of embodiments 1-52, wherein the electrolyte comprises a proton-exchange membrane.

Embodiment 54. The method of any one of embodiments 1-53, wherein the one or more features are configured to purge nitrogen from the fuel cell while the fuel cell is generating electricity.

Embodiment 55. The method of any one of embodiments 1-54, wherein a concentration of ammonia in the first continuous stream is at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

Embodiment 56. The method of any one of embodiments 1-55, wherein a concentration of ammonia in the first continuous stream is at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

Embodiment 57. The method of any one of embodiments 1-56, wherein the one or more features increase a power density of the fuel cell by at least 5, 10, 20, 40, 60, 80, 100, 120, 140, 160, 180, or 200%.

Embodiment 58. The method of any one of embodiments 1-57, wherein a power density of the fuel cell is at least about 0.1, 0.5, 1, 2, 3, 4, 5, 6, 7, 8, 9, 10, 20, or 30 kW/L.

Embodiment 59. The method of any one of embodiments 1-58, wherein a power density of the fuel cell is at most about 0.1, 0.5, 1, 2, 3, 4, 5, 6, 7, 8, 9, 10, 20, or 30 kW/L.

Embodiment 60. The method of any one of embodiments 1-59, further comprising outputting a third continuous stream comprising unconverted hydrogen from the fuel cell.

Embodiment 61. The method of embodiment 60, further comprising directing the third continuous stream comprising the unconverted hydrogen to the ammonia reformer.

Embodiment 62. The method of embodiment 61, further comprising combusting the unconverted hydrogen to heat the ammonia reformer.

Embodiment 63. The method of embodiment 61 or 62, further comprising, using one or more air supply units, providing at least oxygen to the ammonia reformer to combust the unconverted hydrogen in the third continuous stream.

Embodiment 64. The method of embodiment 62 or 63, further comprising removing water in the third continuous stream prior to combusting the unconverted hydrogen.

Embodiment 65. The method of embodiment 60, further comprising flaring the third continuous stream.

Embodiment 66. The method of any one of embodiments 1-65, wherein the first continuous stream comprises at most about 50, 60, 70, 80, 90, 95, 99, 99.1, 99.2, 99.3, 99.4, 99.5, 99.6, 99.7, 99.8, or 99.9% of hydrogen by moles.

Embodiment 67. The method of any one of embodiments 1-66, wherein the first continuous stream comprises at least about 50, 60, 70, 80, 90, 95, 99, 99.1, 99.2, 99.3, 99.4, 99.5, 99.6, 99.7, 99.8, or 99.9% of hydrogen by moles.

Embodiment 68. The method of any one of embodiments 1-67, wherein an absolute pressure of the first continuous stream is at least about 0.5, 1, 2, 3, 4, 5, 6, 7, 8, 9, 10, 15, 20, 25, 30, or 40 bar.

Embodiment 69. The method of any one of embodiments 1-68, wherein an absolute pressure of the first continuous stream is at most about 0.5, 1, 2, 3, 4, 5, 6, 7, 8, 9, 10, 15, 20, 25, 30, or 40 bar.

Embodiment 70. The method of embodiment 68 or 69, further comprising maintaining the absolute pressure of the first continuous stream within a tolerance of 1, 5, 10, 20, 30, 40, 50, 60, 70, 80, 90, 100, 110, 150, 200, 300, 400, 500, or 1000% of the absolute pressure.

Embodiment 71. The method of any one of embodiments 68-70, further comprising modulating the absolute pressure of the first continuous stream using one or more flow regulators, pressure regulators, control units, or any combination thereof.

Embodiment 72. The method of embodiment 71, wherein the one or more flow regulators, pressure regulators, control units, or any combination thereof are positioned upstream or downstream of the fuel cell.

Embodiment 73. The method of embodiment 71, further comprising modulating a flow rate of the third continuous stream using one or more flow regulators, pressure regulators, control units, or any combination thereof.

Embodiment 74. The method of embodiment 73, wherein the one or more flow regulators, pressure regulators, control units, or any combination thereof are positioned upstream or downstream of the fuel cell.

Embodiment 75. The method of embodiment 73, wherein the one or more flow regulators, pressure regulators, control units, or any combination thereof are positioned downstream of the fuel cell to prevent a back flow of the unconverted hydrogen.

Embodiment 76. The method of any one of embodiments 1-75, further comprising using the generated electrical power to power one or more electric devices.

Embodiment 77. The method of any one of embodiments 1-76, further comprising using the generated electrical power to power one or more electrical grids.

Embodiment 78. The method any one of embodiments 1-77, wherein the fuel cell comprises a plurality of fuel cells, and the ammonia reformer provides a plurality of streams comprising hydrogen and nitrogen to the plurality of the fuel cells.

Embodiment 79. The method of any one of embodiments 1-78, further comprising directing unconverted hydrogen from the plurality of fuel cells to the at least one ammonia reformer or reactor for combustion heating.

Embodiment 80. The method of embodiment 78 or 79, wherein at least one fuel cell of the plurality of fuel cells outputs a different electrical power than other fuel cells of the plurality of fuel cells.

Embodiment 81. The method of embodiment any one of embodiments 78-80, wherein at least one fuel cell of the plurality of fuel cells is configured to reduce an electrical power output.

Embodiment 82. The method of any one of embodiments 78-81, further comprising modulating the flow rates of the plurality of streams using one or more flow regulators, pressure regulators, control units, or any combination thereof.

Embodiment 83. The method of any one of embodiments 78-82, wherein at least one fuel cell of the plurality of the fuel cells receives a stream of the plurality of streams, the stream comprising a flow rate that is different from the flow rates of other streams of the plurality of streams.

Embodiment 84. The method of any one of embodiments 78-82, wherein each of the plurality of the fuel cells receives one of the plurality of streams at a flow rate that is about the same as or within a selected tolerance of other flow rates of others of the plurality of streams.

Embodiment 85. The method of embodiment 84, wherein the selected tolerance is about 10, 20, 30, 40, 50, 60, 70, 80, 90, or 100%.

Embodiment 86. The method of any one of embodiments 78-85, wherein the plurality of fuel cells comprises at least one fuel cell that is different in size, power output, hydrogen consumption rate, power density, or operating temperature from the other fuel cells.

Embodiment 87. A system comprising: an ammonia reformer configured to react ammonia to generate a first continuous stream comprising nitrogen and hydrogen; a fuel cell in fluid communication with the ammonia reformer, wherein the fuel cell comprises: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features configured to (i) increase a hydrogen consumption rate, or (ii) increase an output voltage at the same hydrogen consumption rate, when the first continuous stream contacts the anode compared to an equivalent fuel cell lacking the one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; and a controller comprising at least one processor configured to perform executable instructions, wherein instructions executable by the controller are configured to: react the ammonia, using the ammonia reformer, to generate the first continuous stream comprising hydrogen and nitrogen; direct a second continuous stream comprising oxygen to the cathode of the fuel cell; and direct the first continuous stream to the anode of the fuel cell to react the hydrogen and oxygen to generate electricity.

Embodiment 88. The system of embodiment 87, wherein the one or more features increase a hydrogen consumption rate of the fuel cell when the first continuous stream contacts the anode compared to the equivalent fuel cell lacking the one or more features.

Embodiment 89. The system of embodiment 88, wherein the one or more features increase the hydrogen consumption rate by at least 20, 40, 60, 80, 100, 120, 140, 160, 180, or 200%.

Embodiment 90. The system of embodiment 88 or 89, wherein the one or more features increase the hydrogen consumption rate by at most 20, 40, 60, 80, 100, 120, 140, 160, 180, or 200%.

Embodiment 91. The system of any one of embodiments 87-90, wherein the one or more features increase the output voltage at the same hydrogen consumption rate when the first continuous stream contacts the anode compared to the equivalent fuel cell lacking the one or more features.

Embodiment 92. The system of embodiment 91, wherein the one or more features increase the output voltage at the same hydrogen consumption rate by at least 20, 40, 60, 80, 100, 120, 140, 160, 180, or 200%.

Embodiment 93. The system of embodiment 91 or 92, wherein the one or more features increase the hydrogen consumption rate by at most 20, 40, 60, 80, 100, 120, 140, 160, 180, or 200%.

Embodiment 94. The system of any one of embodiments 87-93, wherein the one or more features continuously purge nitrogen out of the fuel cell.

Embodiment 95. The system of any one of embodiments 87-94, wherein the nitrogen is continuously directed out of the first channel by the one or more features so that nitrogen accumulation is reduced in the first channel, thereby increasing the hydrogen consumption rate compared to the equivalent fuel cell lacking the one or more features.

Embodiment 96. The system of any one of embodiments 87-95, wherein the hydrogen consumption rate of the fuel cell when contacting the first continuous stream with the anode is at least about 10, 20, 30, 40, 50, 60, 70, 80, 90, or 99% of the hydrogen in the first continuous stream.

Embodiment 97. The system of any one of embodiments 87-96, wherein the hydrogen consumption rate of the fuel cell when contacting the first continuous stream with the anode is at most about 10, 20, 30, 40, 50, 60, 70, 80, 90, or 99% of the hydrogen in the first continuous stream.

Embodiment 98. The system of any one of embodiments 87-97, wherein the instructions executable by the controller are further configured to intermittently reduce the hydrogen consumption rate to purge out at least one of hydrogen, nitrogen, or water.

Embodiment 99. The system of any one of embodiments 87-98, wherein the instructions executable by the controller are further configured to reduce the hydrogen consumption rate and direct at least a part of the first continuous stream to the ammonia reformer.

Embodiment 100. The system of any one of embodiments 87-99, wherein the instructions executable by the controller are further configured to reduce the hydrogen consumption rate of the fuel cell to zero and direct at least a part of the first continuous stream to the ammonia reformer.

Embodiment 101. The system of embodiment 99 or 100, wherein the instructions executable by the controller are further configured to flare the at least the part of the first continuous stream directed to the ammonia reformer at one or more combustion exhausts of one or more combustion heaters, wherein the one or more combustion heaters are in operable communication with the ammonia reformer for heating the ammonia reformer, and wherein the one or more combustion heaters are in fluidic communication with the fuel to receive the at least the part of the first continuous stream.

Embodiment 102. A fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof; and a second channel comprising a second inlet and a second outlet, wherein the second channel is in fluid communication with the cathode; wherein the fuel cell is configured to provide a ratio of an electrical power output of the fuel cell to a projected surface area of the anode that is at least about 0.05 $W/cm^2$ when the first inlet is supplied with a first continuous stream comprising about 25% nitrogen and about 75% hydrogen by moles, and the second inlet is supplied with a second continuous stream comprising at least 20% oxygen by moles.

Embodiment 103. The fuel cell of embodiment 102, wherein the ratio is at least about 0.1, 0.15, 0.2, 0.25, 0.3, 0.35, or 0.4 $W/cm^2$.

Embodiment 104. The fuel cell of embodiment 102 or 103, wherein the ratio is at most about 0.1, 0.15, 0.2, 0.25, 0.3, 0.35, or 0.4 $W/cm^2$.

Embodiment 105. The fuel cell of any one of embodiments 102-104, wherein the ratio is based on the first continuous stream comprising a hydrogen flow rate of at least about 0.001, 0.01, 0.1, 1, 10, 100, 1000, 10000, 100000 mole per second.

Embodiment 106. The fuel cell of any one of embodiments 102-105, wherein the ratio is based on the second continuous stream comprising an oxygen flow rate of at least about 0.0001, 0.001, 0.01, 0.1, 1, 10, 100, 1000, 10000, 100000, 1000000 mole per second.

Embodiment 107. The fuel cell of any one of embodiments 102-106, wherein the ratio is based on the second continuous stream comprising air.

Embodiment 108. The fuel cell of any one of embodiments 102-107, wherein the ratio is based on the first continuous stream comprising the hydrogen and the nitrogen from the ammonia reformer.

Embodiment 109. The fuel cell of any one of embodiments 102-108, wherein the projected surface area of the anode comprises the largest possible surface area of the anode projected onto a flat plane.

Embodiment 110. The fuel cell of any one of embodiments 102-109, wherein the projected surface area of the anode comprises a surface area of the largest surface of the anode.

Embodiment 111. A fuel cell comprising: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features; and a second channel comprising a second inlet and a second outlet, wherein the second channel is in fluid communication with the cathode; wherein the fuel cell is in fluid communication with an ammonia reformer configured to provide nitrogen and hydrogen to the fuel cell; and wherein the fuel cell is configured to generate an electrical power at least 80% of a reference electrical power, wherein the reference electrical power is generated using the fuel cell receiving a continuous stream comprising at least 99% hydrogen by moles into the first inlet, wherein the electrical power is generated at a same current or a same hydrogen consumption rate as the reference electrical power.

Embodiment 112. The fuel cell of embodiment 111, wherein the electrical power is at least 60, 70, 80, 90, 91, 92, 93, 94, 95, 96, 97, 98, or 99% of the reference electrical power.

Embodiment 113. The fuel cell of embodiment 111 or 112, wherein the electrical power is at most 60, 70, 80, 90, 91, 92, 93, 94, 95, 96, 97, 98, or 99% of the reference electrical power.

Embodiment 114. A system comprising: an ammonia reformer; a fuel cell in fluid communication with the ammonia reformer, wherein the fuel cell comprises: an electrochemical circuit comprising an anode, a cathode, and an electrolyte between the anode and the cathode; a first channel comprising a first inlet and a first outlet, wherein the first channel is in fluid communication with the anode, wherein the first channel comprises one or more features, wherein the one or more features comprise (i) one or more cuts, (ii) one or more cutouts, (iii) one or more grooves, or (iv) any combination thereof, wherein the one or more features comprise a depth less than 10 mm; and a second channel comprising a second inlet and a second outlet, wherein the second channel is in fluid communication with the cathode; and a controller comprising at least one processor configured to perform executable instructions, wherein instructions executable by the controller are configured to: direct ammonia to the ammonia reformer to generate a first continuous stream comprising hydrogen and nitrogen; direct a second continuous stream comprising oxygen to the cathode of the fuel cell; and direct the first continuous stream to the anode of the fuel cell to react the hydrogen and oxygen to generate electricity.

Embodiment 115. The system of embodiment 114, wherein the one or more features comprises a depth less than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

Embodiment 116. The system of embodiment 114 or 115, wherein the one or more features comprises a depth greater than 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 mm.

Embodiment 117. The system of any one of embodiments 114-116, wherein the depth is at least 1/32, 1/16, 1/8, 1/4, or 1/2 of the thickness of the first channel.

Embodiment 118. The system of any one of embodiments 114-117, wherein the depth is at most 1/32, 1/16, 1/8, 1/4, or 1/2 of the thickness of the first channel.

Embodiment 119. The system of any one of embodiments 114-118, wherein a ratio of a first projected surface area of the one or more features to a second projected surface area of the first channel is at least 0.1, 0.2, 0.3, 0.4, 0.5, 0.6, 0.7, 0.8, or 0.9.

Embodiment 120. The system of any one of embodiments 114-119, wherein a ratio of a first projected surface area of the one or more features to a second projected surface area of the first channel is at most 0.1, 0.2, 0.3, 0.4, 0.5, 0.6, 0.7, 0.8, or 0.9.

Embodiment 121. The system of any one of embodiments 114-120, wherein the ammonia reformer generates the first continuous stream additionally comprising at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of ammonia.

Embodiment 122. The system of any one of embodiments 114-121, wherein the ammonia reformer generates the first continuous stream additionally comprising at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of ammonia.

Embodiment 123. The system or the fuel cell of any one of embodiments 87-122, wherein the one or more features comprises two or more features.

Embodiment 124. The system or the fuel cell of embodiment 123, wherein at least a first segment of a first feature of the two or more features is substantially parallel to a second segment of a second feature of the two or more features.

Embodiment 125. The system or the fuel cell of embodiment 123, wherein at least a first segment of a first feature of the two or more features is substantially perpendicular to a second segment of a second feature of the two or more features.

Embodiment 126. The system or the fuel cell of embodiment 123, wherein at least a first segment of a first feature of the two or more features is at an angle to a second segment of a second feature of the two or more features, wherein the angle is between 0 and 90 degrees, between 15 and 75 degrees, between 0 and 30 degrees, or between 30 and 60 degrees.

Embodiment 127. The system or the fuel cell of any one of embodiments 123-126, wherein the two or more features are connected.

Embodiment 128. The system or the fuel cell of any one of embodiments 123-126, wherein the two or more features are disconnected.

Embodiment 129. The system or the fuel cell of any one of embodiments 123-126, wherein the two or more features intersect.

Embodiment 130. The system or the fuel cell of any one of embodiments 87-129, wherein the one or more features are fully enclosed by the first channel.

Embodiment 131. The system or the fuel cell of any one of embodiments 87-129, wherein the one or more features are partially enclosed by the first channel.

Embodiment 132. The system or the fuel cell of any one of embodiments 87-131, wherein the one or more features comprise a serpentine shape.

Embodiment 133. The system or the fuel cell of any one of embodiments 87-132, wherein the one or more features are substantially parallel with the longest side of the first channel.

Embodiment 134. The system or the fuel cell of any one of embodiments 87-132, wherein the one or more features are substantially parallel with the shortest side of the first channel.

Embodiment 135. The system or the fuel cell of any one of embodiments 87-134, wherein the fuel cell comprises a plurality of channels in fluid communication with the anode, wherein the plurality of channels comprises the first channel.

Embodiment 136. The system or the fuel cell of embodiment 135, wherein the plurality of channels comprises a stack of layers that are adjacent to one another.

Embodiment 137. The system or the fuel cell of embodiment 135 or 136, wherein at least one channel in the plurality of channels does not comprise or lacks the one or more features comprising (i) one or more cuts, (ii) one or more cutouts, (iii) one or more grooves, or (iv) any combination thereof.

Embodiment 138. The system or the fuel cell of any one of embodiments 87-137, wherein the one or more features are further configured to facilitate purging of a select material from the anode gas diffusion layer, wherein the select material comprises one or more of nitrogen, ammonia, water, or one or more impurities.

Embodiment 139. The system or the fuel cell of embodiment 138, wherein the fuel cell further comprises one or more exit ports for discharging the select material and unconverted hydrogen from the fuel cell.

Embodiment 140. The system or the fuel cell of any one of embodiments 87-139, wherein the first channel comprises a felt, a foam, a cloth, or a paper material.

Embodiment 141. The system or the fuel cell of embodiment 140, wherein the felt, the foam, the cloth, or the paper material is a carbon-based material.

Embodiment 142. The system or the fuel cell of any one of embodiments 87-141, wherein the one or more features extend across at least a portion of the surface of the first channel.

Embodiment 143. The system or the fuel cell of any one of embodiments 87-142, wherein the electrolyte comprises a proton-exchange membrane.

Embodiment 144. The system or the fuel cell of any one of embodiments 87-143, wherein the fuel cell is configured to allow purging of nitrogen from the fuel cell while the fuel cell is generating electricity.

Embodiment 145. The system or the fuel cell of any one of embodiments 87-144, wherein the first channel is supplied with a stream comprising a concentration of ammonia of at most 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

Embodiment 146. The system or the fuel cell of any one of embodiments 87-145, wherein the first channel is supplied with a stream comprising a concentration of ammonia of at least 1000, 900, 800, 700, 600, 500, 400, 300, 200, 100, 90, 80, 70, 60, 50, 40, 30, 20, 10, 9, 8, 7, 6, 5, 4, 3, 2, or 1 ppm.

Embodiment 147. The system or the fuel cell of any one of embodiments 87-146, wherein the one or more features increase a power density of the fuel cell by at least 5, 10, 20, 40, 60, 80, 100, 120, 140, 160, 180, or 200%.

Embodiment 148. The system or the fuel cell of any one of embodiments 87-147, wherein a power density of the fuel cell is at least about 0.1, 0.5, 1, 2, 3, 4, 5, 6, 7, 8, 9, 10, 20, or 30 kW/L.

Embodiment 149. The system or the fuel cell of any one of embodiments 87-148, wherein a power density of the fuel cell is at most about 0.1, 0.5, 1, 2, 3, 4, 5, 6, 7, 8, 9, 10, 20, or 30 kW/L.

Embodiment 150. The system or the fuel cell of embodiment 149, further comprising one or more combustion heaters for combusting an exit stream output by the fuel cell to heat the ammonia reformer, wherein the exit stream comprises unconverted hydrogen.

Embodiment 151. The system or the fuel cell of embodiment 150, further comprising one or more air supply units for providing at least oxygen to the one or more combustion heaters.

Embodiment 152. The system or the fuel cell of embodiment 149 or 150, further comprising one or more dehydrators for removing water in the exit stream in prior to combusting the unconverted hydrogen.

Embodiment 153. The system or the fuel cell of embodiment 150, wherein the system is configured to flare the unconverted hydrogen at a combustion exhaust of the one or more combustion heaters.

Embodiment 154. The system or the fuel cell of any one of embodiments 87-153, further comprising one or more flow regulators, pressure regulators, control units, or any combination thereof for modulating an absolute pressure of an input stream or an output stream of the fuel cell.

Embodiment 155. The system or the fuel cell of embodiment 154, wherein the one or more flow regulators, pressure regulators, control units, or any combination thereof are positioned upstream or downstream of the fuel cell.

Embodiment 156. The system or the fuel cell of embodiment 154 or 155, wherein the one or more flow regulators, pressure regulators, control units, or any combination thereof are positioned downstream of the fuel cell to reduce or prevent a back flow of the unconverted hydrogen.

Embodiment 157. The system or the fuel cell of any one of embodiments 87-156, further comprising an electrical load connected to the electrochemical circuit.

Embodiment 158. The system or the fuel cell of embodiment 157, wherein the electrical load comprises one or more electric devices.

Embodiment 159. The system or the fuel cell of embodiment 158, wherein the electrical load comprises one or more electrical grids.

Embodiment 160. The system or the fuel cell of embodiment 158, wherein the electrical load comprises an engine or a motor.

Embodiment 161. The system or the fuel cell of any one of embodiments 87-160, wherein the fuel cell comprises a plurality of fuel cells in operable communication with the ammonia reformer, the ammonia reformer configured to provide a plurality of streams comprising hydrogen and nitrogen to the plurality of the fuel cells.

Embodiment 162. The system or the fuel cell of embodiment 161, wherein the system is configured to direct unconverted hydrogen from the plurality of fuel cells to one or more combustors in thermal communication with the ammonia reformer.

Embodiment 163. The system or the fuel cell of embodiment 161 or 162, wherein at least one fuel cell of the plurality of fuel cells comprises a different electrical power output than other fuel cells of the plurality of fuel cells.

Embodiment 164. The system or the fuel cell of any one of embodiments 161-163, wherein at least one fuel cell of the plurality of fuel cells is configured to reduce an electrical power output.

Embodiment 165. The system or the fuel cell of any one of embodiments 161-164, wherein one or more ammonia reformers in fluid communication with the plurality of fuel cells provide to at least one fuel cell of the plurality of the fuel cells a stream that comprises a flow rate that is different from the flow rate of another stream provided to another fuel cell.

Embodiment 166. The system or the fuel cell of any one of embodiments 161-164, wherein one or more ammonia reformers in fluid communication with the plurality of fuel cells are configured to provide a plurality of streams to the plurality of fuel cells, wherein the flow rates of the plurality of streams is about the same as or within a selected tolerance of other flow rates of others of the plurality of streams.

Embodiment 167. The system or the fuel cell of embodiment 166, wherein the selected tolerance is about 10, 20, 30, 40, 50, 60, 70, 80, 90, or 100%.

Embodiment 168. The system or the fuel cell of any one of embodiment 161-167, wherein the plurality of fuel cells comprises at least one fuel cell that is different in size, power output, hydrogen consumption rate, power density, or operating temperature from the other fuel cells.

Embodiment 169. A fuel cell, comprising: an anode; a cathode; and a membrane between the anode and the cathode, wherein the anode comprises an anode gas diffusion layer with one or more channels for directing a source material comprising hydrogen and nitrogen to the anode for processing of the source material to generate an electrical current, wherein the one or more channels comprise one or more features comprising (i) one or more cuts, (ii) one or more cutouts, or (iii) one or more grooves configured to enhance diffusion and transport of the source material through the anode gas diffusion layer, and wherein the one or more features are configured to direct a flow of nitrogen from the anode gas diffusion layer to out of the fuel cell so that nitrogen does not accumulate in the anode gas diffusion layer.

Embodiment 170. The fuel cell of embodiment 169, wherein the one or more features comprise two or more features.

Embodiment 171. The fuel cell of embodiment 169 or 170, wherein the one or more features are further configured to facilitate purging of a select material from the anode gas diffusion layer, wherein the select material comprises one or more of nitrogen, ammonia, water, or one or more impurities.

Embodiment 172. The fuel cell of embodiment 171, further comprising one or more exit ports for discharging the select material and unconverted hydrogen from the fuel cell.

Embodiment 173. The fuel cell of any one of embodiments 169-172, wherein the processing of the source material comprises a dissociation of one or more hydrogen molecules of the source material into one or more protons and one or more electrons.

Embodiment 174. The fuel cell of any one of embodiments 169-173, wherein the anode gas diffusion layer comprises a felt, a foam, a cloth, or a paper material.

Embodiment 175. The fuel cell of embodiment 174, wherein the felt, the foam, the cloth, or the paper material is a carbon-based material.

Embodiment 176. The fuel cell of any one of embodiments 169-175, wherein the one or more features extend across at least a portion of the surface of the one or more channels.

Embodiment 177. The fuel cell of any one of embodiments 170-176, wherein the two or more features are parallel to each other.

Embodiment 178. The fuel cell of any one of embodiments 170-177, wherein the two or more features are perpendicular to each other.

Embodiment 179. The fuel cell of any one of embodiments 170-178, wherein the two or more features are disposed at an angle relative to each other, wherein the angle ranges from 0 degrees to 90 degrees.

Embodiment 180. The fuel cell of any one of embodiments 170-179, wherein the two or more features intersect with each other.

Embodiment 181. The fuel cell of any one of embodiments 170-180, wherein the two or more features do not intersect.

Embodiment 182. The fuel cell of any one of embodiments 169-181, wherein the anode gas diffusion layer comprises a plurality of layers.

Embodiment 183. The fuel cell of any one of embodiments 169-182, wherein at least one layer of the plurality of layers comprises the one or more channels comprising the one or more features.

Embodiment 184. The fuel cell of embodiment 183, wherein the plurality of layers comprises a first layer comprising a first set of features and a second layer comprising a second set of features.

Embodiment 185. The fuel cell of embodiment 184, wherein the first set of features and the second set of features comprise a same or similar set of features.

Embodiment 186. The fuel cell of embodiment 184 or 185, wherein the first set of features and the second set of features comprise different sets of features having different shapes, dimensions, positions, or orientations.

Embodiment 187. The fuel cell of any one of embodiments 184-186, wherein the first set of features and the second set of features overlap or partially overlap.

Embodiment 188. The fuel cell of any one of embodiments 184-186, wherein the first set of features and the second set of features do not overlap.

Embodiment 189. The fuel cell of any one of embodiments 169-188, wherein at least one feature of the one or more features has a depth ranging from about 0.01 millimeter (mm) to about 10 mm.

Embodiment 190. A fuel cell system, comprising: a plurality of fuel cells comprising the fuel cell of any one of embodiments 169-189, at least one ammonia reformer or reactor in fluid communication with the plurality of fuel cells, wherein the at least one ammonia reformer or reactor is configured to (i) generate the source material and (ii) provide the source material to the fuel cell.

Embodiment 191. The fuel cell system of embodiment 190, wherein the plurality of fuel cells are arranged (i) adjacent to each other in a lateral configuration or (ii) on top of each other in a stacked configuration.

Embodiment 192. The fuel cell system of embodiment 190 or 191, wherein the plurality of fuel cells comprises at least one proton-exchange membrane fuel cell (PEMFC).

Embodiment 193. A fuel cell system comprising the fuel cell of any one of embodiments 169-192, wherein the fuel cell system comprises a controller configured to operate the fuel cell to allow purging of nitrogen from the fuel cell while the fuel cell is generating electricity.

Embodiment 194. The fuel cell system of any one of embodiments 190-193, further comprising a controller configured to operate the fuel cell to allow purging of nitrogen from the fuel cell while the fuel cell is generating electricity.

Embodiment 195. The fuel cell system of any one of embodiments 190-194, wherein at least one feature of the one or more features has a depth ranging from about 0.01 millimeter (mm) to about 10 mm.

Embodiment 196. The fuel cell system of any one of embodiments 190-195, wherein the fuel cell system further comprises one or more inlet ports configured to receive the source material, wherein ammonia concentration in the source material is less than 1 ppm.

Embodiment 197. The fuel cell system of any one of embodiments 190-196, wherein the fuel cell system further comprises one or more exit ports configured to direct unconverted hydrogen from the plurality of fuel cells to the at least one ammonia reformer or reactor, wherein the unconverted hydrogen is combusted to heat the ammonia reformer or reactor.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system comprising:
   (a) an ammonia reformer configured to convert ammonia into a first stream comprising nitrogen and hydrogen;
   (b) a fuel cell in fluid communication with the ammonia reformer, wherein the fuel cell comprises:
      i. an electrochemical circuit comprising an anode, a cathode, and an electrolyte between the anode and the cathode; and
      ii. a channel in fluid communication with the anode, wherein the channel comprises an inlet configured to receive the first stream comprising nitrogen and hydrogen, wherein the channel further comprises one or more features which are configured to purge nitrogen from the fuel cell while the fuel cell is generating electricity;
         wherein the channel comprises an anode gas diffusion layer comprising a carbon-based material; and
   (c) a controller comprising at least one processor configured to perform executable instructions, wherein the executable instructions are configured to:
      i. use the ammonia reformer to generate the first stream comprising hydrogen and nitrogen, wherein a volume fraction of the hydrogen in the first stream comprises at most about 85%, wherein a volume fraction of the nitrogen in the first stream comprises at least about 15%;
      ii. direct a second stream comprising oxygen to the cathode;
      iii. direct the first stream through the channel to the anode to react the hydrogen with the oxygen, thereby generating electricity; and
      iv. purge nitrogen out of the fuel cell.

2. The system of claim 1, wherein nitrogen is purged out of the fuel cell for at least about 20% of a total operational time that the fuel cell is generating electricity.

3. The system of claim 1, wherein the one or more features are configured to purge nitrogen out of the channel so that nitrogen accumulation is reduced in the channel, thereby increasing a hydrogen consumption rate of the fuel cell compared to an equivalent fuel cell lacking the one or more features.

4. The system of claim 1, wherein the one or more features are further configured to (i) increase a hydrogen consumption rate of the fuel cell, (ii) increase an output voltage of the fuel cell, or (iii) increase both the hydrogen consumption rate and the output voltage of the fuel cell compared to an equivalent fuel cell lacking the one or more features.

5. The system of claim 1, wherein the one or more features are configured to increase an output voltage of the fuel cell at a same hydrogen consumption rate compared with an equivalent fuel cell lacking the one or more features.

6. The system of claim 1, wherein the one or more features comprise (i) one or more cuts, (ii) one or more cutouts, (iii) one or more grooves, or (iv) any combination thereof.

7. The system of claim 6, wherein the one or more features increase a hydrogen consumption rate of the fuel cell by at least about 20%, iii) an output voltage of the fuel cell by at least about 10%, or (iii) a combination thereof.

8. The system of claim 1, wherein a hydrogen consumption rate of the fuel cell is at least about 20% of the hydrogen in the first stream.

9. The system of claim 1, wherein the executable instructions are further configured to intermittently reduce a hydrogen consumption rate of the fuel cell to purge out at least one of hydrogen, nitrogen, or water.

10. The system of claim 1, wherein the executable instructions are further configured to reduce a hydrogen consumption rate of the fuel cell and direct at least a part of the first stream to the ammonia reformer.

11. The system of claim 10, wherein the executable instructions are further configured to flare or vent the at least the part of the first stream directed to the ammonia reformer at a combustion exhaust of a combustion heater, wherein the combustion heater is in thermal communication with the ammonia reformer and configured to heat the ammonia reformer, and wherein the combustion heater is in fluidic communication with the fuel cell to receive the at least the part of the first stream.

12. The system of claim 1, wherein the fuel cell comprises a plurality of channels in fluid communication with the anode, wherein the plurality of channels comprises the channel.

13. The system of claim 1, wherein the channel comprises a plurality of layers that are adjacent to one another.

14. The system of claim 1, wherein the fuel cell is configured to output unconverted hydrogen from the fuel cell.

15. The system of claim 14, wherein the executable instructions are further configured to combust the unconverted hydrogen and heat the ammonia reformer.

16. The system of claim 14, wherein the executable instructions are further configured to flare the unconverted hydrogen.

17. The system of claim 1, wherein the executable instructions are further configured to modulate an absolute pressure of the first stream using one or more flow regulators, pressure regulators, control units, or any combination thereof.

18. The system of claim 1, wherein the fuel cell comprises a plurality of fuel cells, wherein at least one fuel cell of the plurality of fuel cells is configured to reduce an electrical power output while others of the plurality of fuel cells maintain their respective power outputs.

19. The system of claim 1, wherein the fuel cell comprises a plurality of fuel cells, wherein the plurality of fuel cells comprises at least one fuel cell that is different in size, power output, hydrogen consumption rate, power density, or operating temperature from the other fuel cells.

20. The system of claim 1, wherein the fuel cell is configured to generate an electrical power that is at least about 80% of a reference electrical power, wherein the reference electrical power is generated using the fuel cell receiving a stream comprising at least about 99% hydrogen by moles into the inlet, wherein the electrical power is generated at a same current or a same hydrogen consumption rate as the reference electrical power.

21. The system of claim 1, wherein the executable instructions are further configured to direct at least part of the first stream to a combustion heater to reduce a portion of the hydrogen in the first stream that is reacted in the fuel cell, thereby reducing a hydrogen consumption rate of the fuel cell, reducing the electricity generated by the fuel cell, and purging nitrogen out of the fuel cell, wherein the combustion heater is in thermal communication with the ammonia reformer, wherein the at least part of the first stream is directed to the combustion heater based at least in part on a temperature of the ammonia reformer.

22. The system of claim 1, wherein the executable instructions are configured to intermittently reduce a hydrogen consumption rate of the fuel cell to purge out hydrogen, nitrogen, and water.

23. The system of claim 6, wherein the one or more features are parallel to each other.

24. The system of claim 6, wherein the one or more features are perpendicular to each other.

25. The system of claim 6, wherein the one or more features are disposed at an angle relative to each other, wherein the angle ranges from about 0 degree to about 90 degrees.

26. The system of claim 6, wherein the one or more features intersect with each other.

27. The system of claim 6, wherein the one or more features do not intersect.

28. The system of claim 6, wherein the one or more features have a depth ranging from about 0.01 millimeter (mm) to about 10 mm.

29. The system of claim 1, wherein an ammonia concentration in the first stream is less than about 1 parts-per-million (ppm).

30. The system of claim 1, wherein the one or more features are further configured to facilitate purging of a select material from the anode gas diffusion layer, wherein the select material comprises one or more of nitrogen, ammonia, water, or one or more impurities.

* * * * *